US011121812B2

(12) United States Patent
Shin et al.

(10) Patent No.: US 11,121,812 B2
(45) Date of Patent: Sep. 14, 2021

(54) APPARATUS AND METHOD FOR SENDING AND RECEIVING BROADCAST SIGNALS

(71) Applicant: LG ELECTRONICS INC., Seoul (KR)

(72) Inventors: Jongwoong Shin, Seoul (KR); Woosuk Ko, Seoul (KR); Jaehyung Kim, Seoul (KR); Jongseob Baek, Seoul (KR); Sungryong Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 29 days.

(21) Appl. No.: 16/789,745

(22) Filed: Feb. 13, 2020

(65) Prior Publication Data
US 2020/0186287 A1 Jun. 11, 2020

Related U.S. Application Data

(63) Continuation of application No. 15/971,238, filed on May 4, 2018, now Pat. No. 10,587,367, which is a
(Continued)

(51) Int. Cl.
*H04L 1/00* (2006.01)
*H04L 27/26* (2006.01)
(Continued)

(52) U.S. Cl.
CPC .......... *H04L 1/0071* (2013.01); *H04B 1/10* (2013.01); *H04J 11/004* (2013.01); *H04L 1/007* (2013.01);
(Continued)

(58) Field of Classification Search
CPC ................ H04L 1/0041; H04L 1/0071; H04L 21/234327; H04L 52/322
See application file for complete search history.

(56) References Cited

U.S. PATENT DOCUMENTS

2008/0235742 A1\* 9/2008 Osaki ................... H04N 21/835
725/100
2010/0260268 A1 10/2010 Cowan et al.
(Continued)

FOREIGN PATENT DOCUMENTS

CN 103634077 A 3/2014
EP 3253062 A1 12/2017
(Continued)

OTHER PUBLICATIONS

Angueira et al., "Layered Division Multiplexing: A technique to make flexible use of the broadcast spectrum", XP055376807, Oct. 2014, pp. 1-71.
(Continued)

*Primary Examiner* — Steve N Nguyen
(74) *Attorney, Agent, or Firm* — Birch, Stewart, Kolasch & Birch, LLP

(57) ABSTRACT

A broadcast signal transmitter includes a first bit interleaver to bit interleave core layer data of at least one core layer Physical Layer Pipe (PLP) for a core layer; a second bit interleaver to bit interleave enhanced layer data of at least one enhanced layer PLP for an enhanced layer; an injection level controller to control power ratio between the bit-interleaved core layer data and the bit-interleaved enhanced layer data; a combiner to combine the core layer data and the enhanced layer data which the power ratio is controlled and to output Layered Division Multiplexing (LDM) data; a power normalizer to normalize power of the LDM data; a time interleaver to perform time-interleaving on the LDM data which the power is normalized; a framer to generate a signal frame comprising a preamble and the time-interleaved LDM data; and a modulator to perform Orthogonal Frequency Division Multiplexing modulation on the signal frame.

18 Claims, 45 Drawing Sheets

Related U.S. Application Data continuation of application No. 15/091,404, filed on Apr. 5, 2016, now Pat. No. 9,985,748.

(60) Provisional application No. 62/197,586, filed on Jul. 28, 2015, provisional application No. 62/169,516, filed on Jun. 1, 2015, provisional application No. 62/143,823, filed on Apr. 7, 2015, provisional application No. 62/143,783, filed on Apr. 6, 2015.

(51) Int. Cl.
| | |
|---|---|
| *H04B 1/10* | (2006.01) |
| *H04L 12/18* | (2006.01) |
| *H04J 11/00* | (2006.01) |
| *H04L 1/04* | (2006.01) |
| *H04L 5/00* | (2006.01) |

(52) U.S. Cl.
CPC ......... *H04L 1/0041* (2013.01); *H04L 1/0045* (2013.01); *H04L 1/0052* (2013.01); *H04L 1/0075* (2013.01); *H04L 1/04* (2013.01); *H04L 12/18* (2013.01); *H04L 27/2613* (2013.01); *H04L 27/2627* (2013.01); *H04L 27/2649* (2013.01); *H04L 5/005* (2013.01); *H04L 5/0023* (2013.01); *H04L 27/2647* (2013.01)

(56) References Cited

U.S. PATENT DOCUMENTS

| | | |
|---|---|---|
| 2011/0103300 A1 | 5/2011 | Vare et al. |
| 2012/0092452 A1 | 4/2012 | Tourapis et al. |
| 2012/0106482 A1 | 5/2012 | Pajukoski et al. |
| 2014/0010154 A1 | 1/2014 | Hong et al. |
| 2014/0314177 A1 | 10/2014 | Choi et al. |
| 2015/0085951 A1 | 3/2015 | Shin et al. |
| 2015/0341052 A1 | 11/2015 | Jeong et al. |
| 2015/0341053 A1* | 11/2015 | Kim .................. H03M 13/2707 714/776 |
| 2016/0127522 A1 | 5/2016 | Yang et al. |
| 2016/0134532 A1 | 5/2016 | Hwang et al. |
| 2016/0197826 A1 | 7/2016 | Yang et al. |
| 2016/0212458 A1* | 7/2016 | Kwon ............ H04N 21/234327 |
| 2017/0012811 A1* | 1/2017 | Park ...................... H04L 1/0071 |
| 2017/0019207 A1 | 1/2017 | Park et al. |
| 2017/0094480 A1* | 3/2017 | Kwon .................. H04L 1/0057 |

FOREIGN PATENT DOCUMENTS

| | | | |
|---|---|---|---|
| EP | 3267644 A1 | 1/2018 | |
| EP | 3273630 A | 1/2018 | |
| EP | 3273655 A1 | 1/2018 | |
| JP | 2014-96814 A | 5/2014 | |
| KR | 10-2009-0094592 A | 9/2009 | |
| KR | 10-2016-0024798 A | 3/2016 | |
| WO | WO 2015/130077 A1 | 9/2015 | |
| WO | WO-2015130077 A1 * | 9/2015 | ............... H04L 1/00 |

OTHER PUBLICATIONS

Lee et al., "Performance Evaluation of Lower Layer System in Cloud Transmission for Terrestrial DTV Broadcasting", 2014 IEEE International Symposium on Broadband Multimedia Systems and Broadcasting, Jun. 25-27, 2014, 4 pages.

Montalbán et al., "Cloud Transmission: System Performance and Application Scenarios", IEEE Transactions on Broadcasting, vol. 60, No. 2, Jun. 2014 (Publication date: Feb. 20, 2014), pp. 170-187 (1 page), abstract provided only.

Sanchez, "Solutions for New Terrestrial Broadcasting Systems Offering Simultaneously Stationary and Mobile Services," Ph.D. Thesis, Dec. 2014, 241 pages.

Zhang et al., "Channel Capacity Distribution of Layer-Division-Multiplexing System for Next Generation Digital Broadcasting Transmission", XP032635829A, 2014 IEEE International Symposium on Broadband Multimedia Systems and Broadcasting, Jun. 25, 2014, 6 pages.

* cited by examiner

[Figure 1]
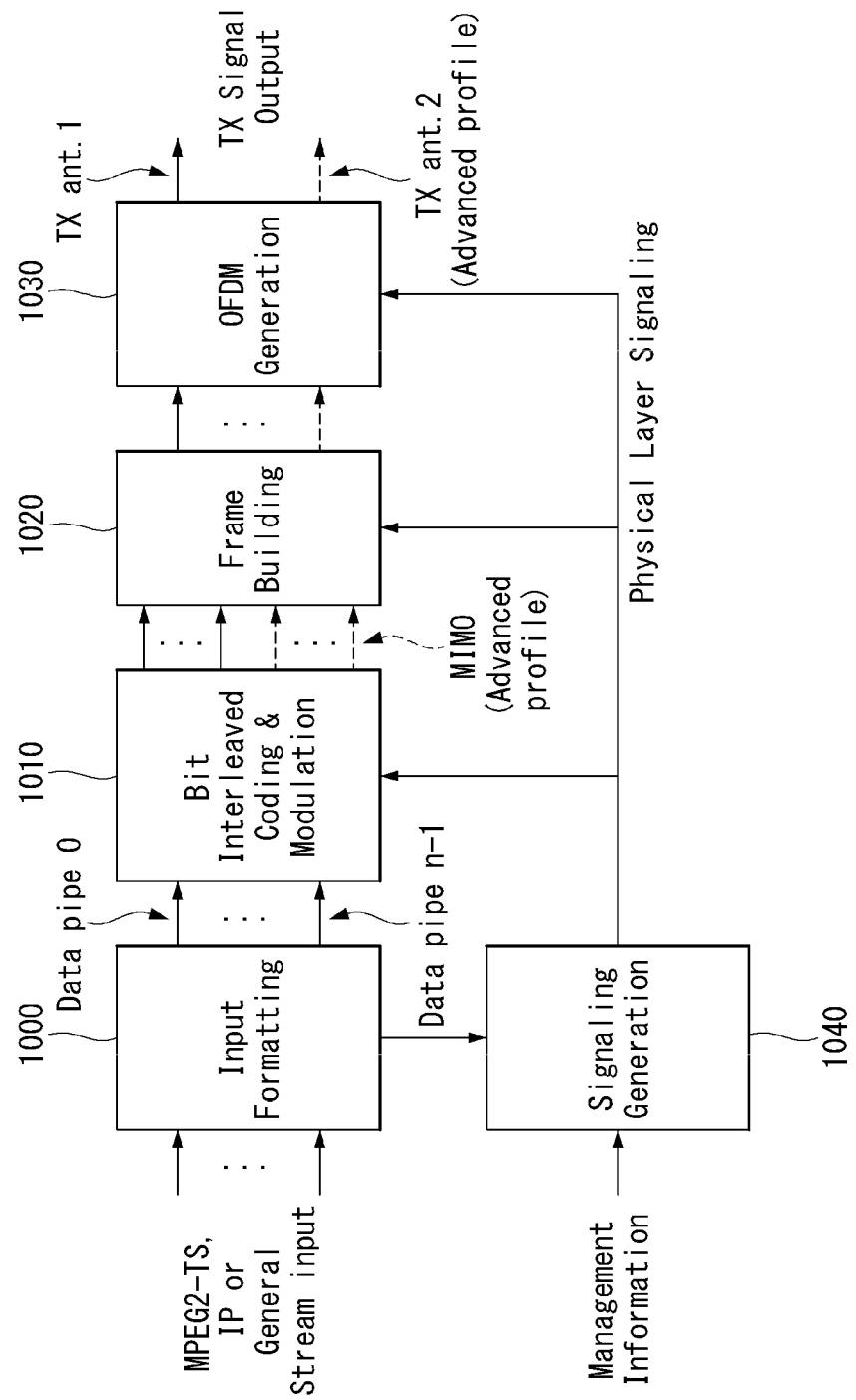

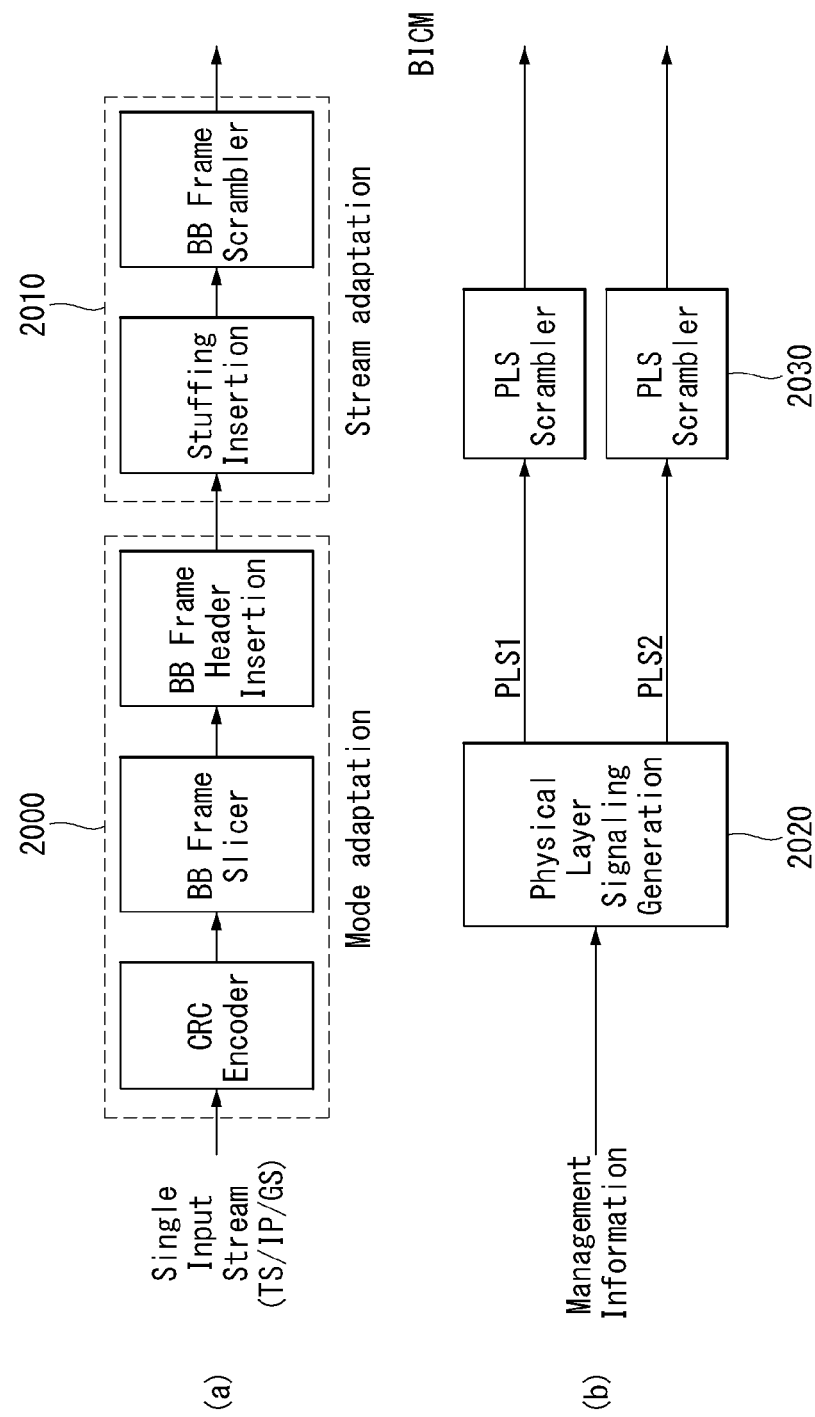

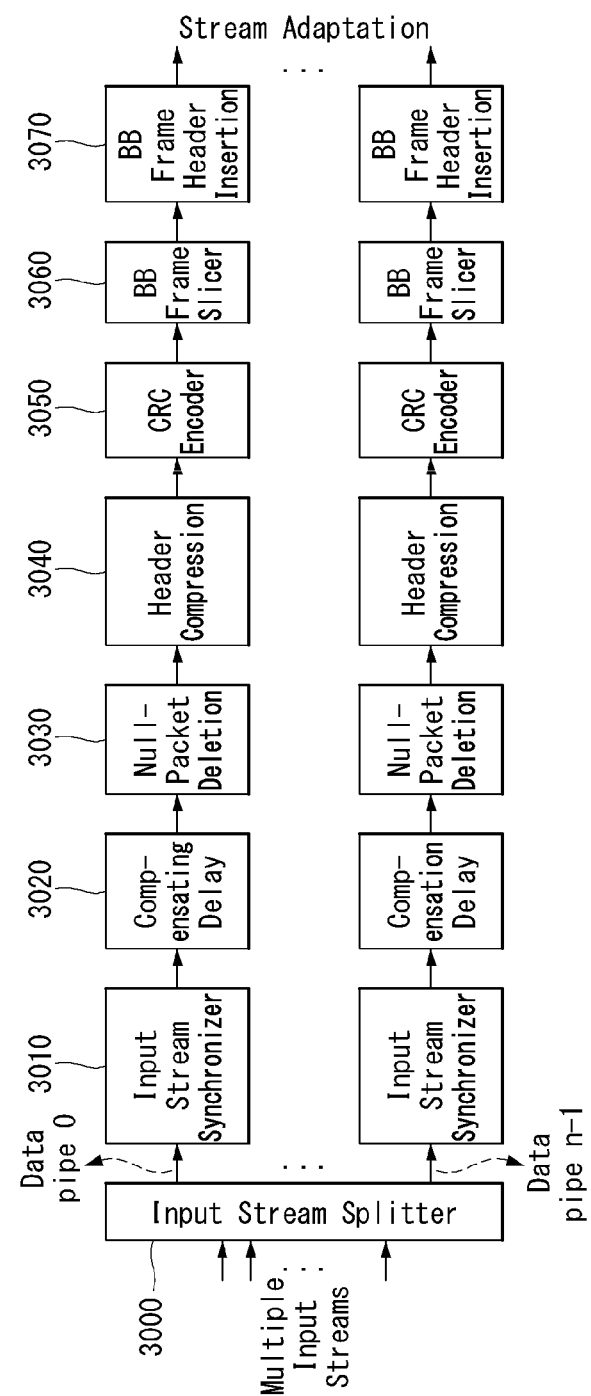
[Figure 3]

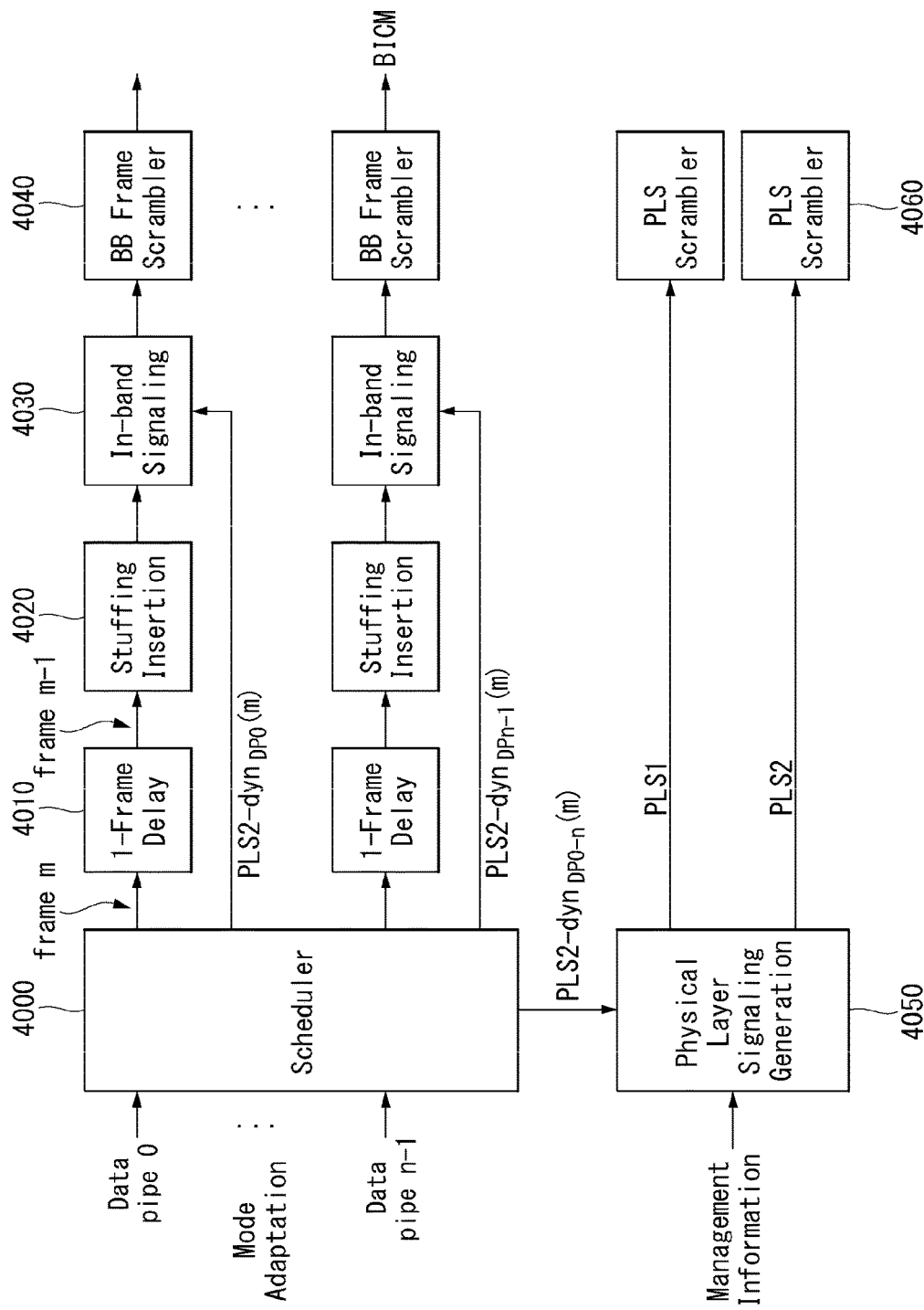
[Figure 4]

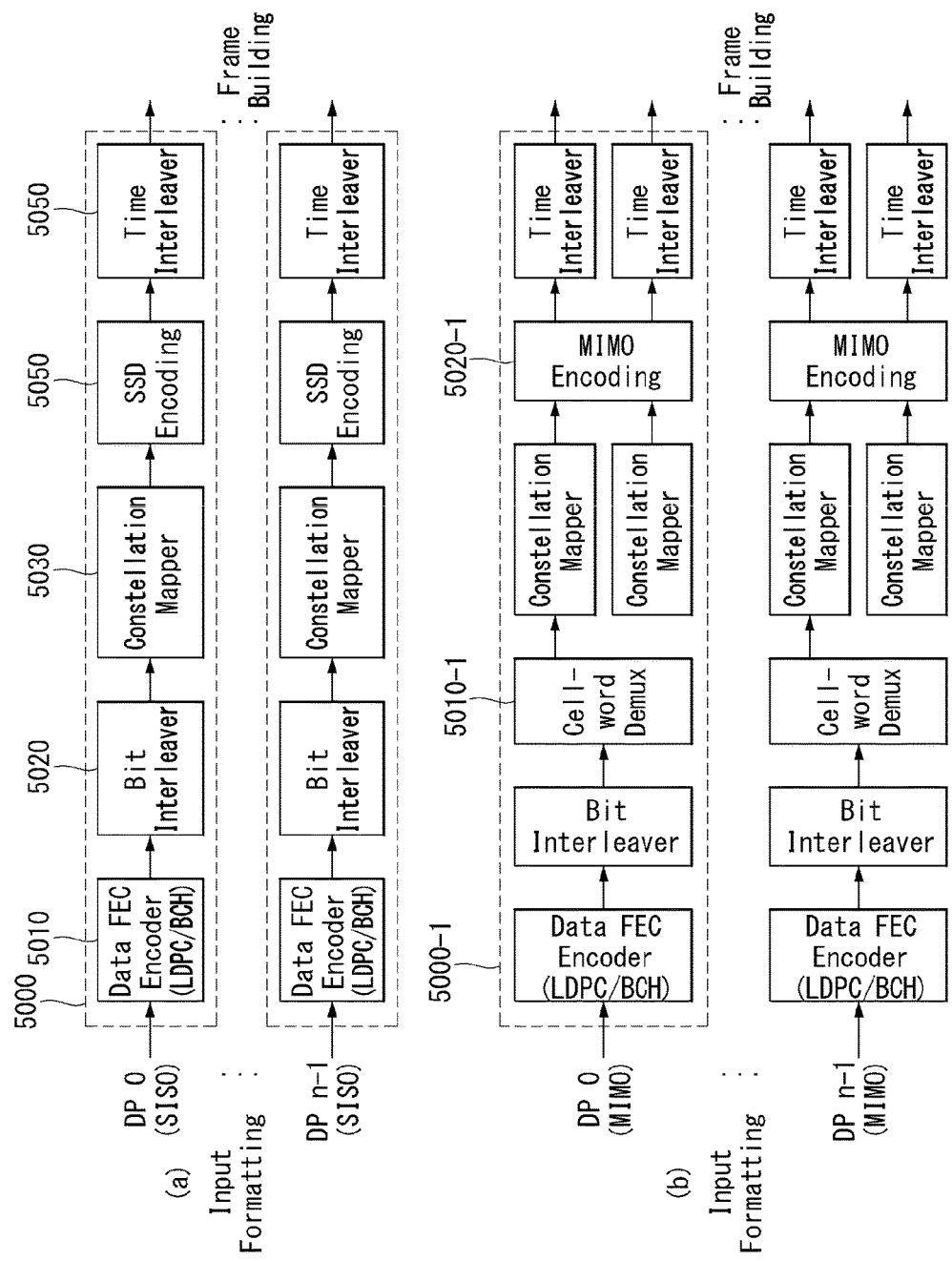
[Figure 5]

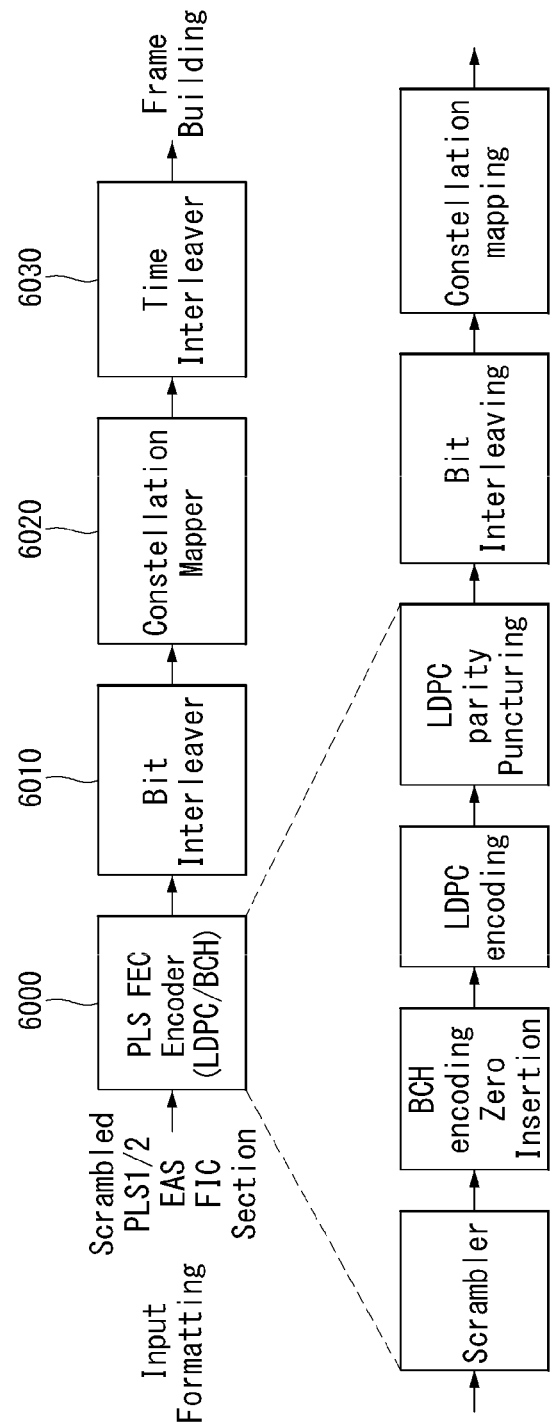
[Figure 6]

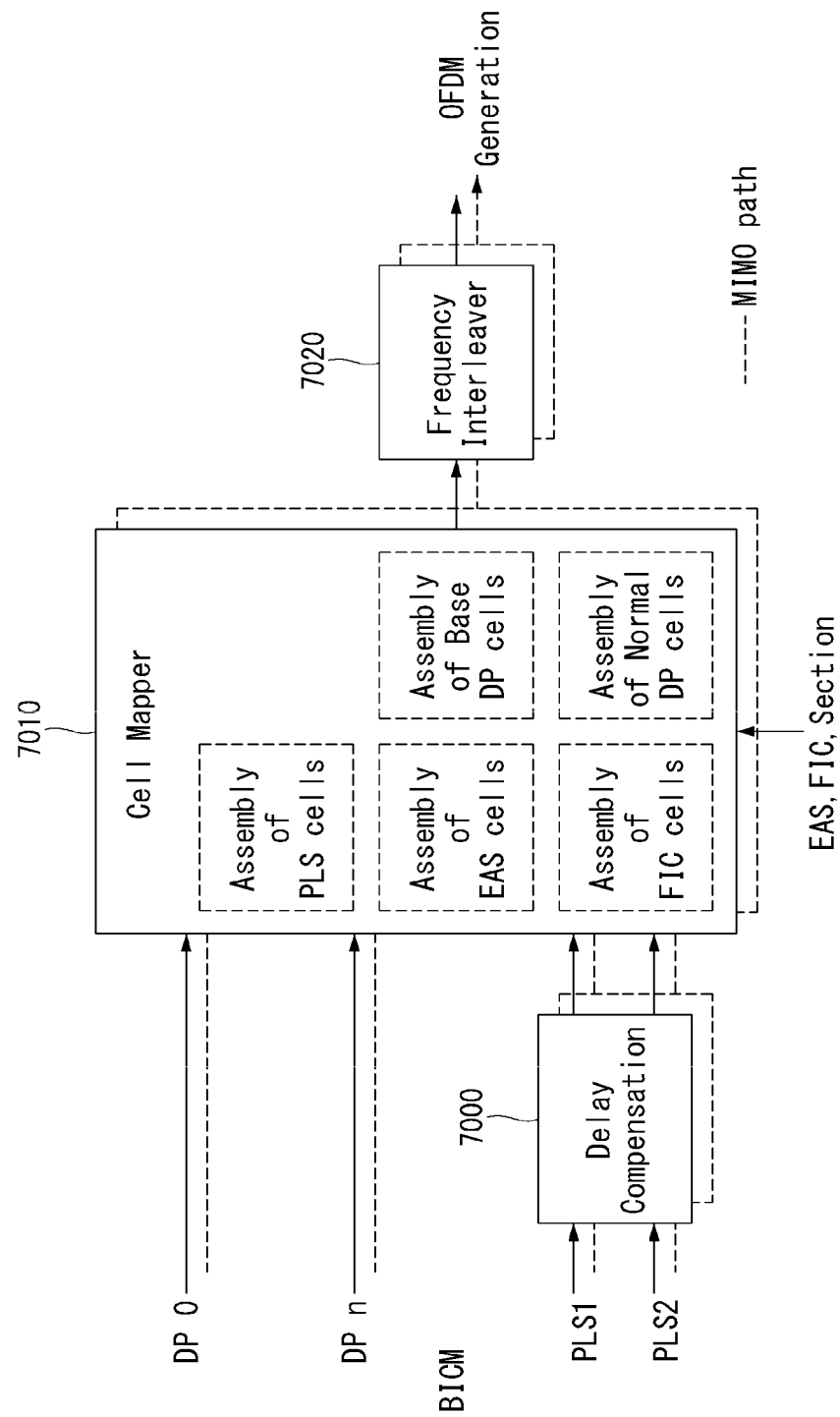
[Figure 7]

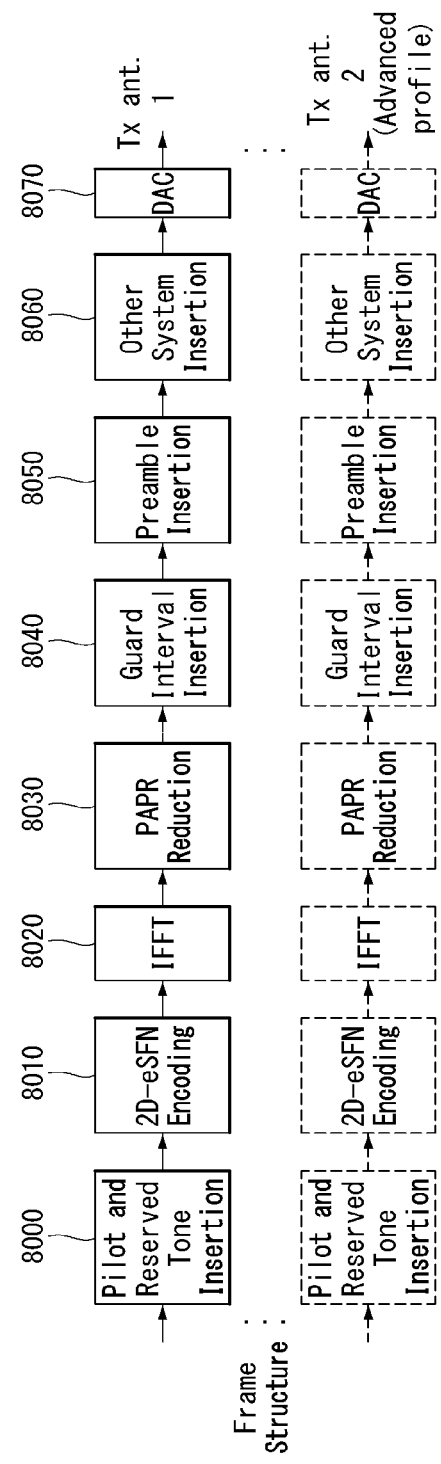
[Figure 8]

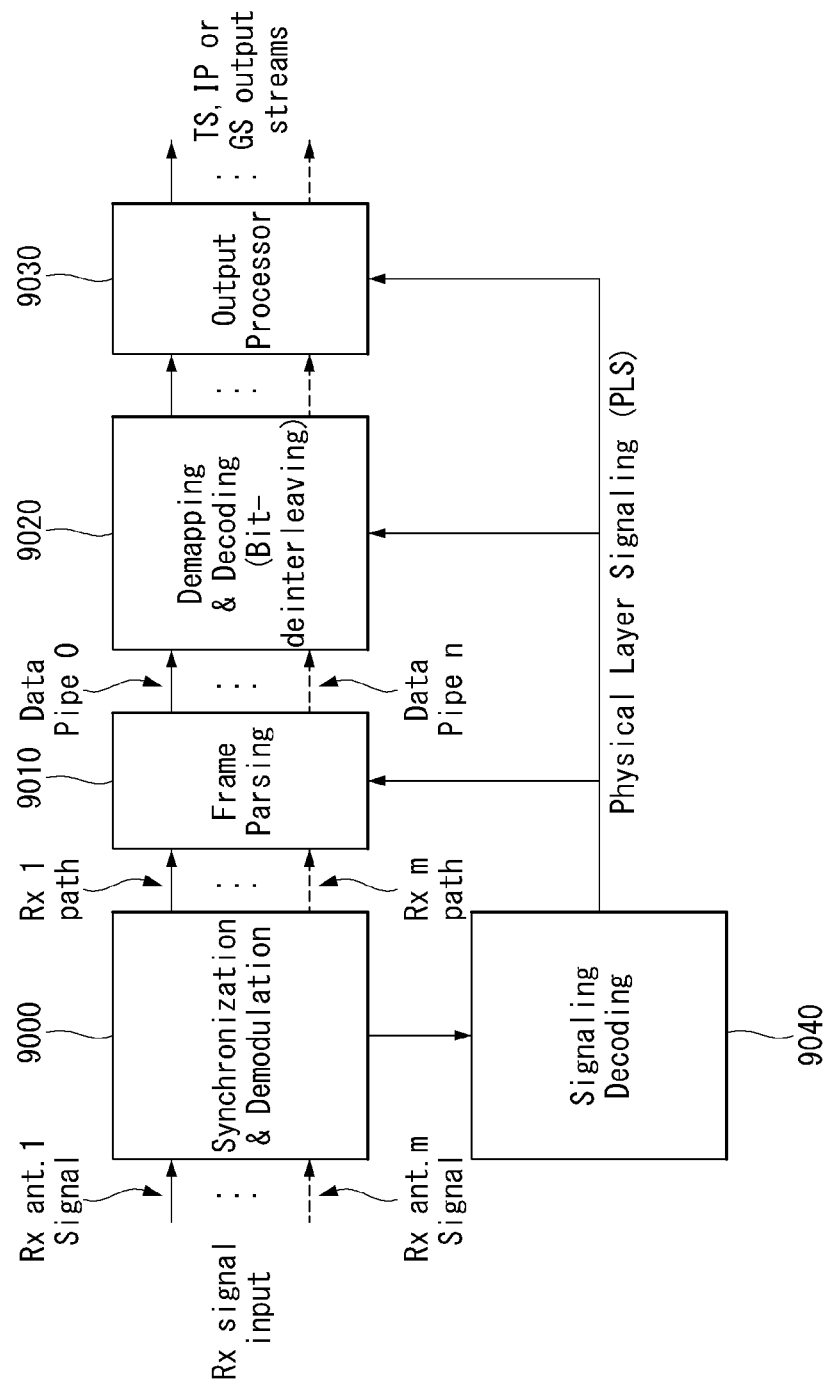
[Figure 9]

[Figure 10]
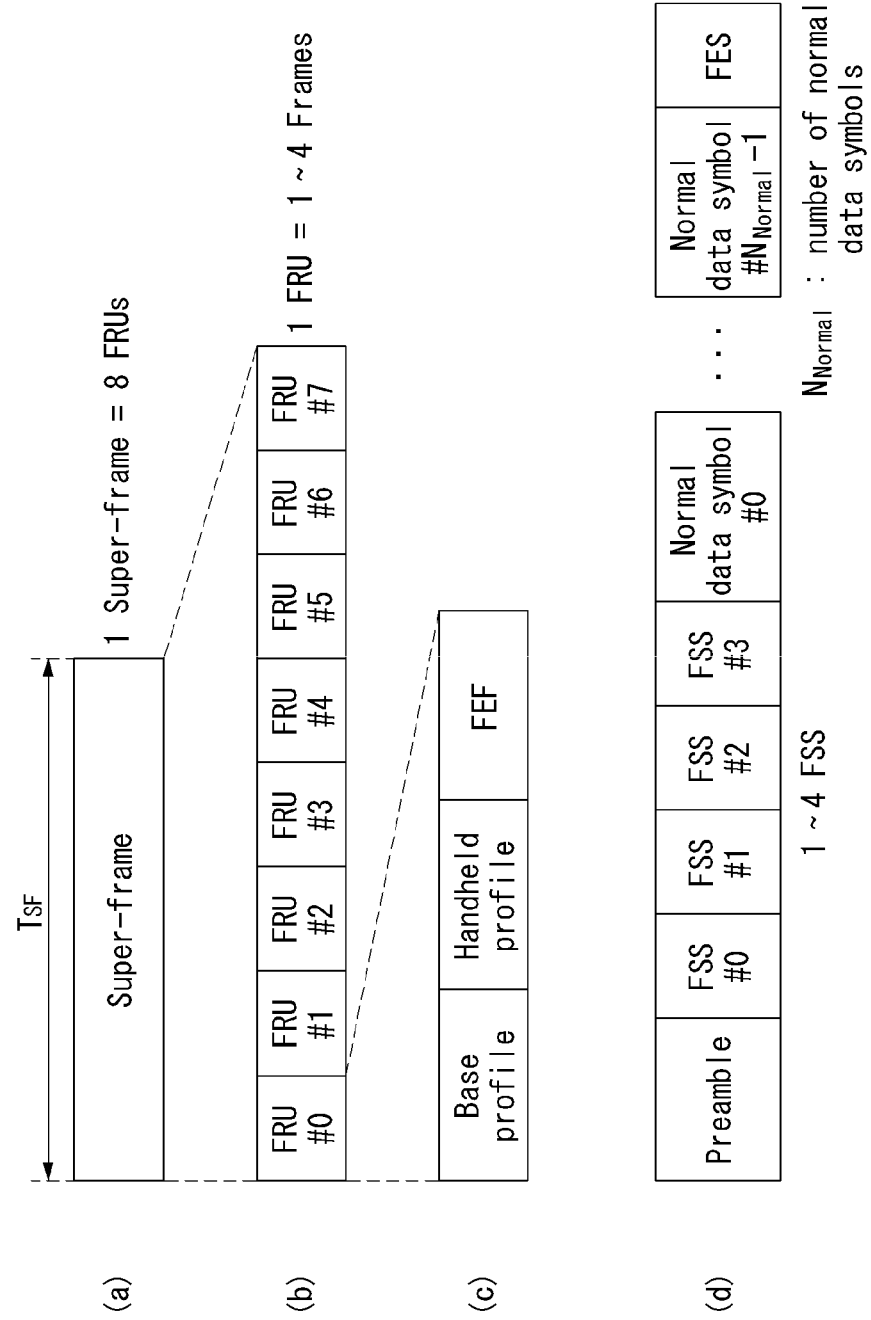

[Figure 11]
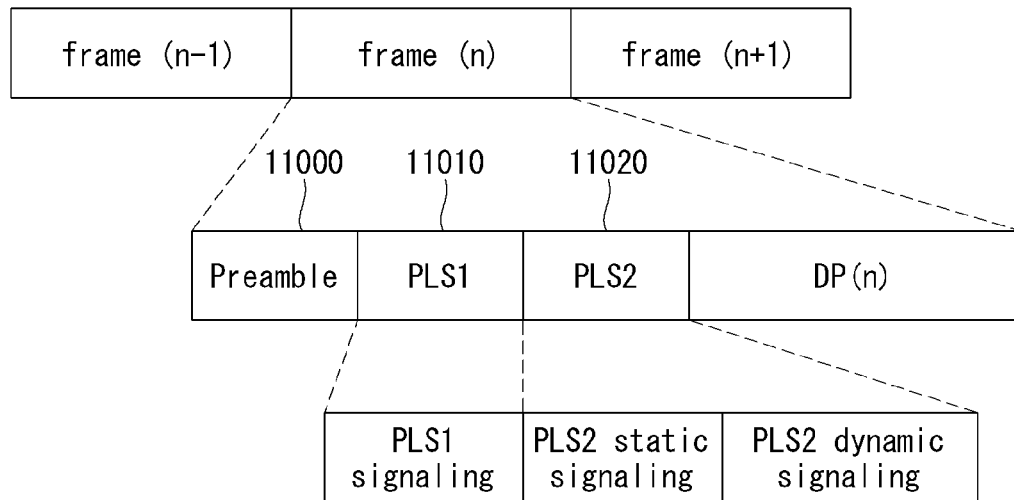
[Figure 12]
| Content | Bits |
|---|---|
| PHY_PROFILE | 3 |
| FFT_SIZE | 2 |
| GI_FRACTION | 3 |
| EAC_FLAG | 1 |
| POLOT_MODE | 1 |
| PAPR_FLAG | 1 |
| FRU_CONFIGURE | 3 |
| RESERVED | 7 |

[Figure 13]

| Content | Bits |
|---|---|
| PREAMBLE_DATA | 20 |
| NUM_FRAME_FRU | 2 |
| PAYLOAD_TYPE | 3 |
| NUM_FSS | 2 |
| SYSTEM_VERSION | 8 |
| CELL_ID | 16 |
| NETWORK_ID | 16 |
| SYSTEM_ID | 16 |
| for i = 0:3 | |
|   FRU_PHY_PROFILE | 3 |
|   FRU_FRAME_LENGTH | 2 |
|   FRU_GI_FRACTION | 3 |
|   RESERVED | 4 |
| end | |
| PLS2_FEC_TYPE | 2 |
| PLS2_MOD | 3 |
| PLS2_SIZE_CELL | 15 |
| PLS2_STAT_SIZE_BIT | 14 |
| PLS2_DYN_SIZE_BIT | 14 |
| PLS2_REP_FLAG | 1 |
| PLS2_REP_SIZE_CELL | 15 |
| PLS2_NEXT_FEC_TYPE | 2 |
| PLS2_NEXT_MOD | 3 |
| PLS2_NEXT_REP_FLAG | 1 |
| PLS2_NEXT_REP_SIZE_CELL | 15 |
| PLS2_NEXT_REP_STAT_SIZE_BIT | 14 |
| PLS2_NEXT_REP_DYN_SIZE_BIT | 14 |
| PLS2_AP_MODE | 2 |
| PLS2_AP_SIZE_CELL | 15 |
| PLS2_NEXT_AP_MODE | 2 |
| PLS2_NEXT_AP_SIZE_CELL | 15 |
| RESERVED | 32 |
| CRC 32 | 32 |

[Figure 14]

| Content | Bit |
|---|---|
| FIC_FLAG | 1 |
| AUX_FLAG | 1 |
| NUM_DP | 6 |
| for i = NUM_DP | |
| DP_ID | 6 |
| DP_TYPE | 3 |
| DP_GROUP_ID | 8 |
| BASE_DP_ID | 6 |
| DP_FEC_TYPE | 2 |
| DP_COD | 4 |
| DP_MOD | 4 |
| DP_SSD_FLAG | 1 |
| if PHY_PROFILE = '010' | |
| DP_MIMO | 3 |
| end | |
| DP_TI_TYPE | 1 |
| DP_TI_LENGTH | 2 |
| DP_TI_BYPASS | 1 |
| DP_FRAME_INTERVAL | 2 |
| DP_FIRST_FRAME_IDX | 5 |
| DP_NUM_BLOCK_MAX | 10 |
| DP_PAYLOAD_TYPE | 2 |
| DP_INBAND_MODE | 2 |
| DP_PROTOCAL_TYPE | 2 |
| DP_CRC_MODE | 2 |

| Content | Bit |
|---|---|
| if DP_PAYLOAD_TYPE==TS ('00') | |
| DNP_MODE | 2 |
| ISSY_MODE | 2 |
| HC_MODE_TS | 2 |
| if HC_MODE_TS=='01' or '10' | |
| PID | 13 |
| end | |
| if DP_PAYLOAD_TYPE==IP ('01') | |
| HC_MODE_IP | 2 |
| end | |
| RESERVED | 8 |
| end | |
| if FIC_FLAG == 1 | |
| FIC_VERSION | 8 |
| FIC_LENGTH_BYTE | 13 |
| RESERVED | 8 |
| end | |
| if AUX_FLAG == 1 | |
| NUM_AUX | 4 |
| AUX_CONFIG_RFU | 8 |
| for i=1:NUM_AUX | |
| AUX_STREAM_TYPE | 4 |
| AUX_PRIVATE_CONF | 28 |
| end | |
| end | |

[Figure 15]

| Content | Bit |
|---|---|
| FRAME_INDEX | 5 |
| PLS_CHANGE_COUNTER | 4 |
| FIC_CHANGE_COUNTER | 4 |
| RESERVED | 16 |
| for i = 1:NUM_DP | |
|     DP_ID | 6 |
|     DP_START | 15(or 13) |
|     DP_NUM_BLOCK | 10 |
|     RESERVED | 8 |
| end | |
| EAC_FLAG | 1 |
| EAS_WAKE_UP_VERSION_NUM | 8 |
| if EAC_FLAG == 1 | |
|     EAC_LENGTH_BYTE | 12 |
| else | |
|     EAC_COUNTER | 12 |
| end | |
| for i = 1:NUM_AUX | |
|     AUX_PRIVATE_DYN | 48 |
| end | |
| CRC 32 | 32 |

[Figure 16]
| Preamble | PLS1 | PLS2 | EAC | FIC | DPs | Auxiliary streams | Dummy |
[Figure 17]
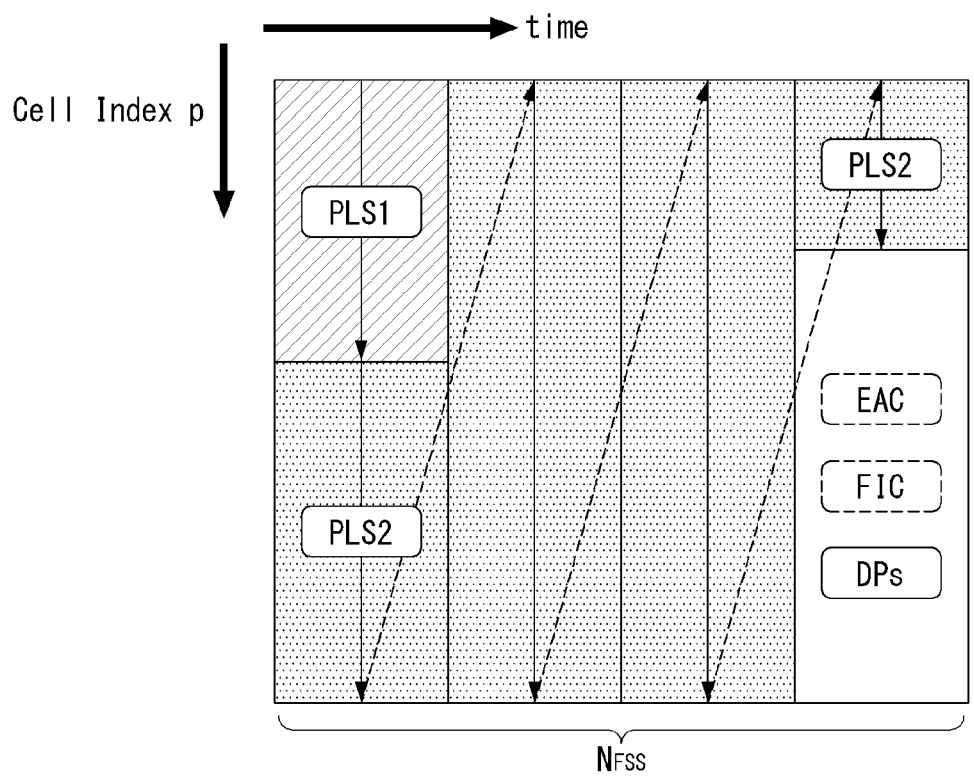

[Figure 18]
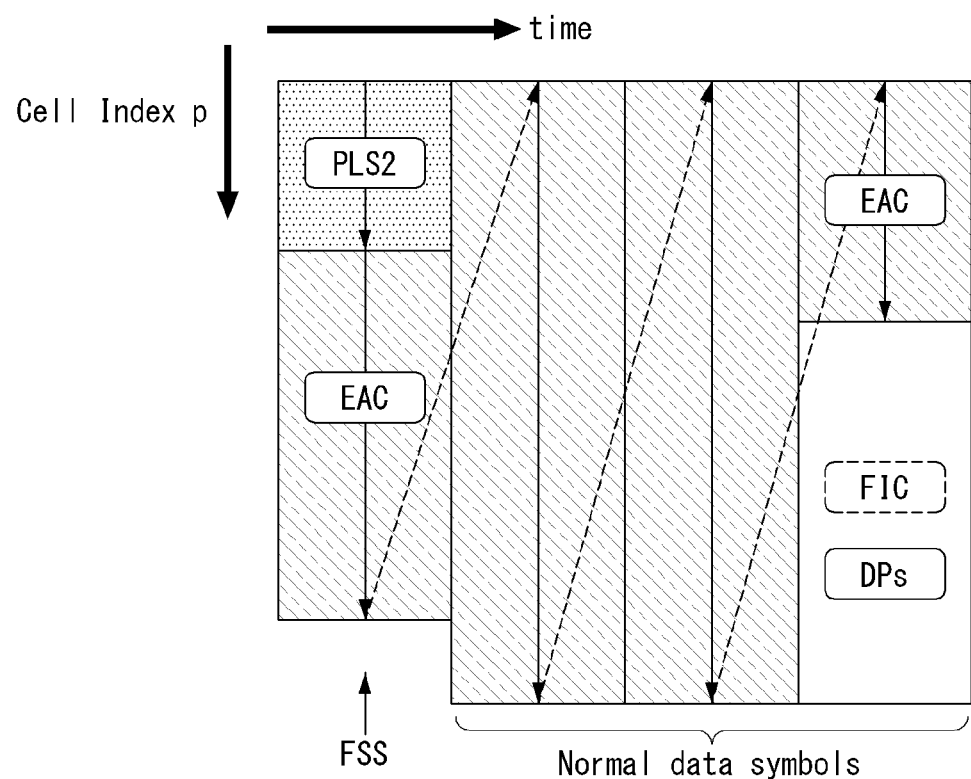

[Figure 19]
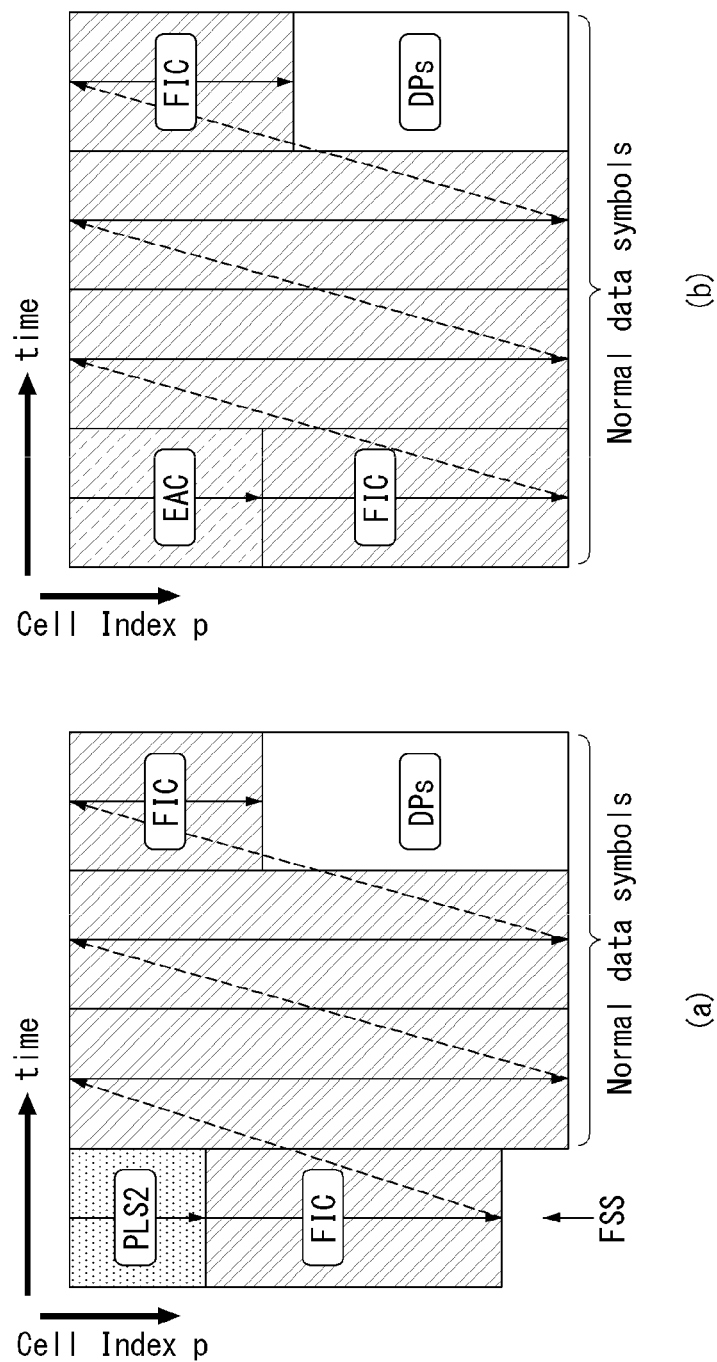

[Figure 20]
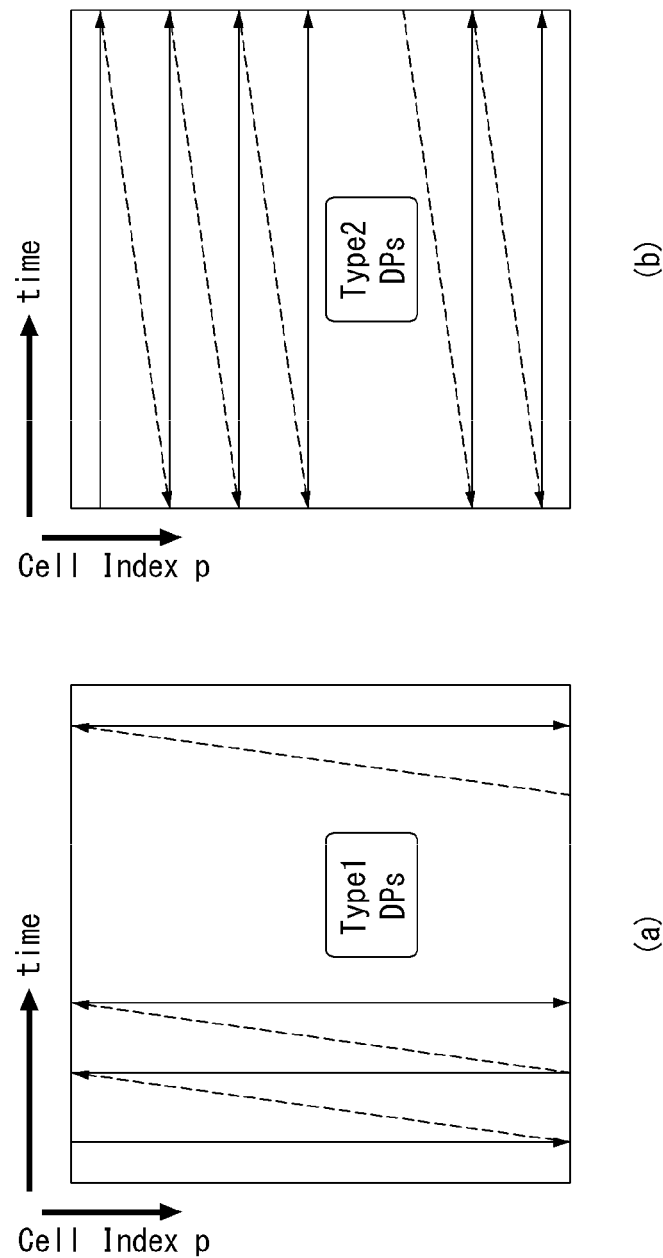

[Figure 21]
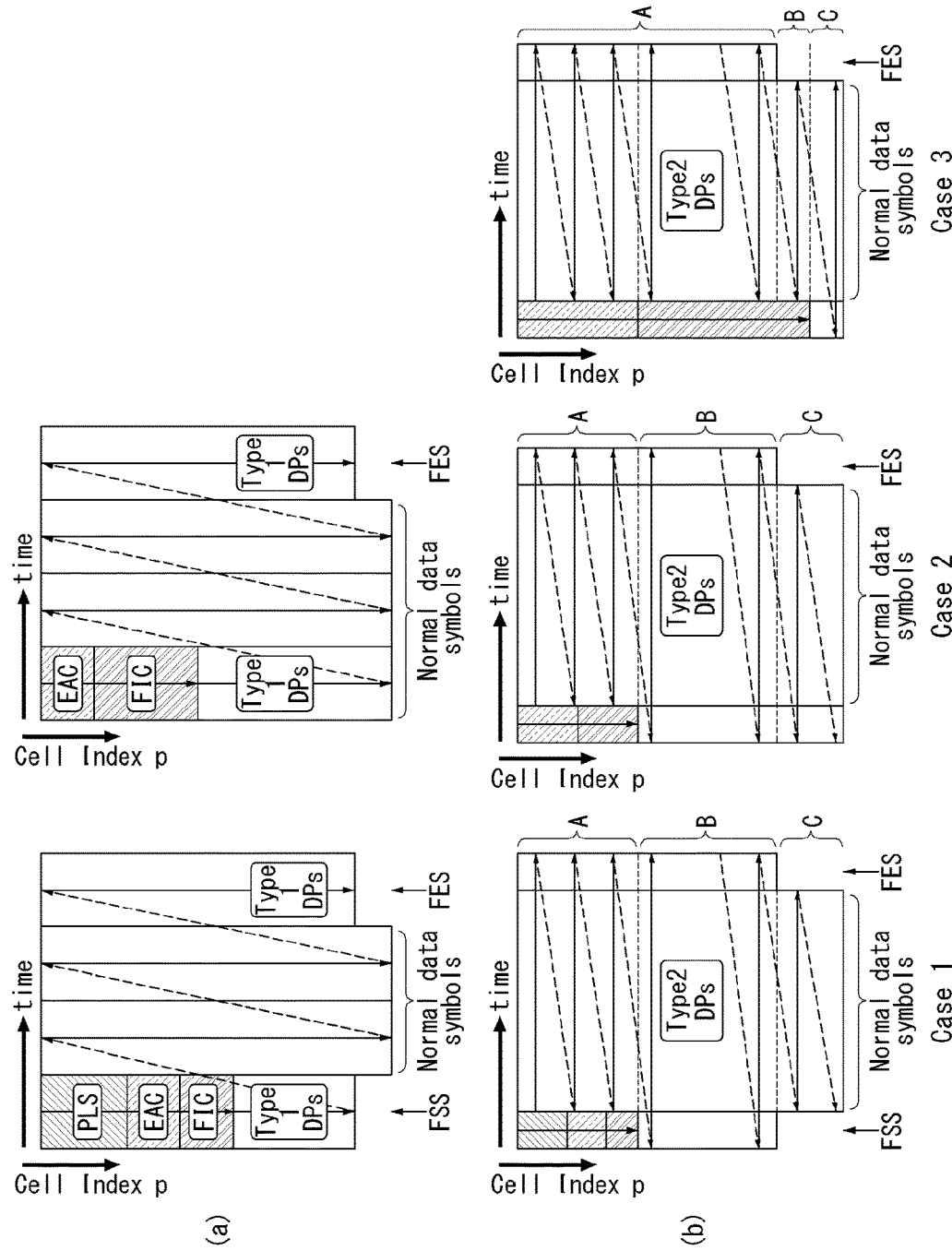

[Figure 22]
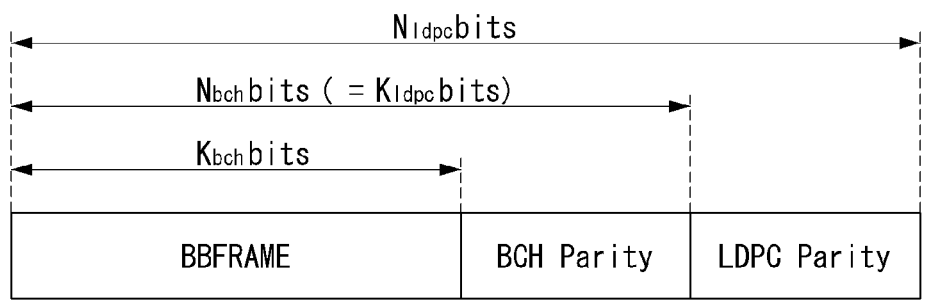

[Figure 23]
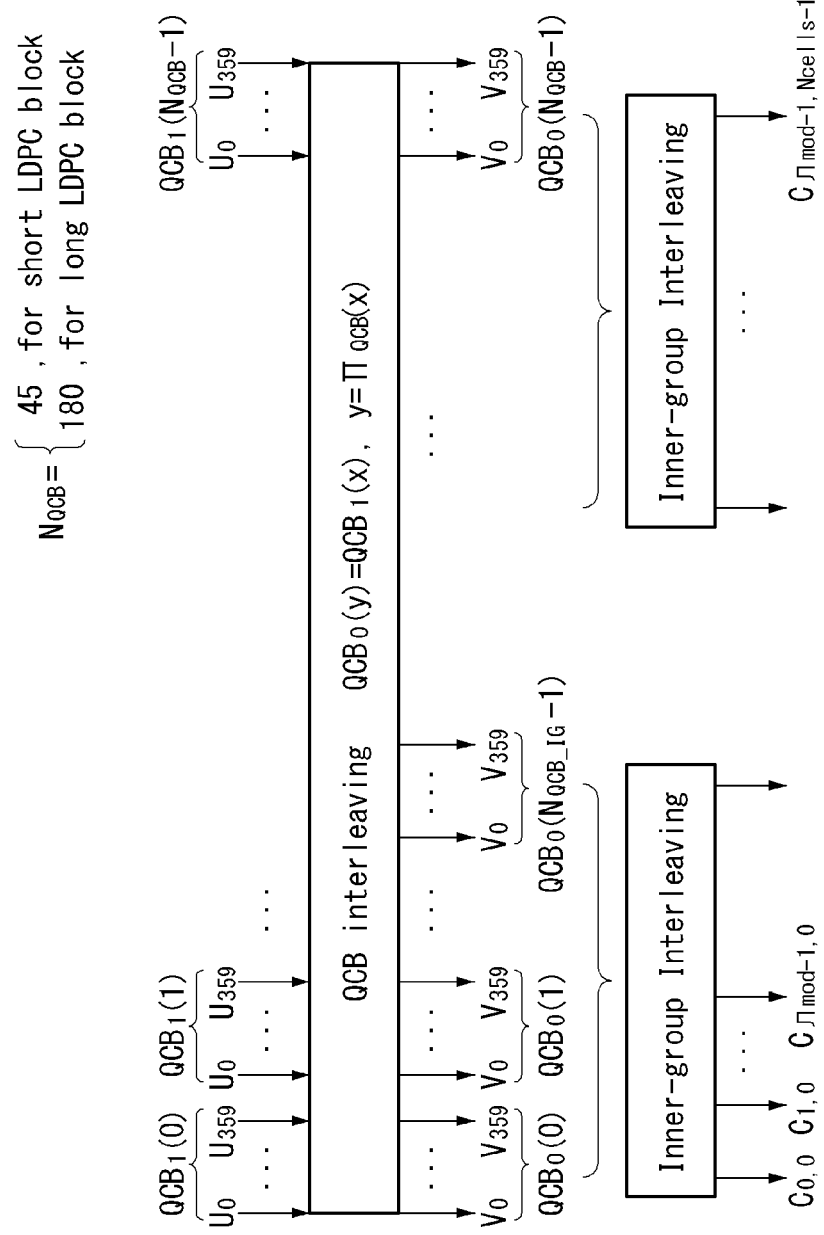

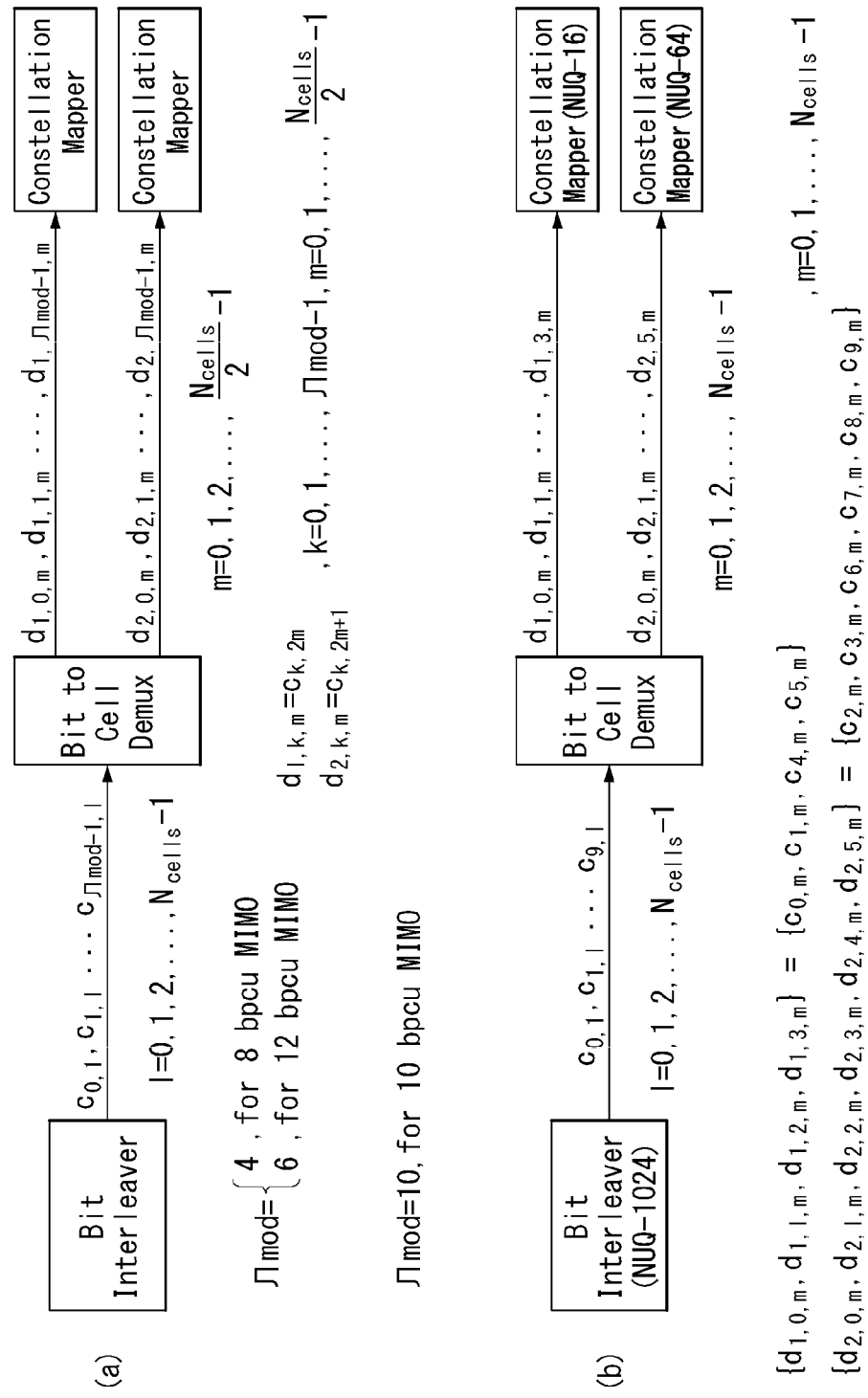
[Figure 24]

[Figure 25]
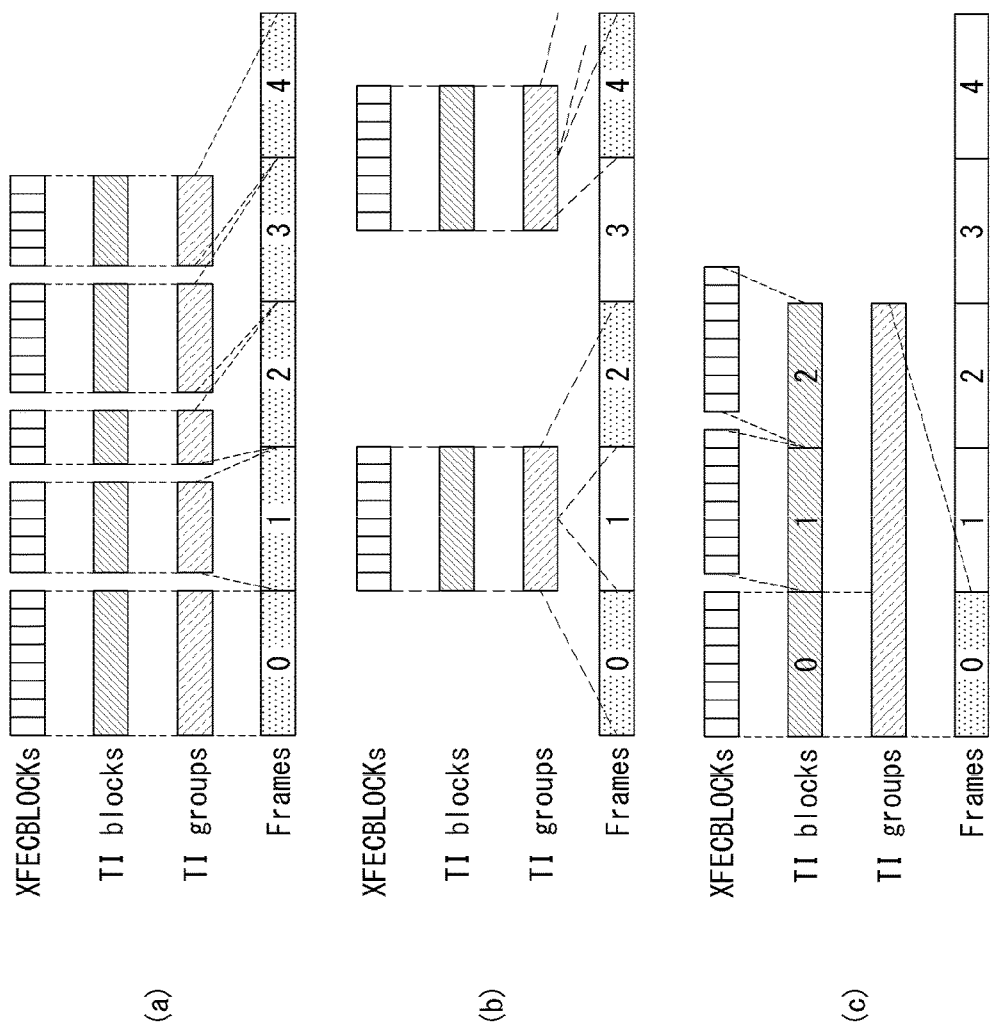

[Figure 26]
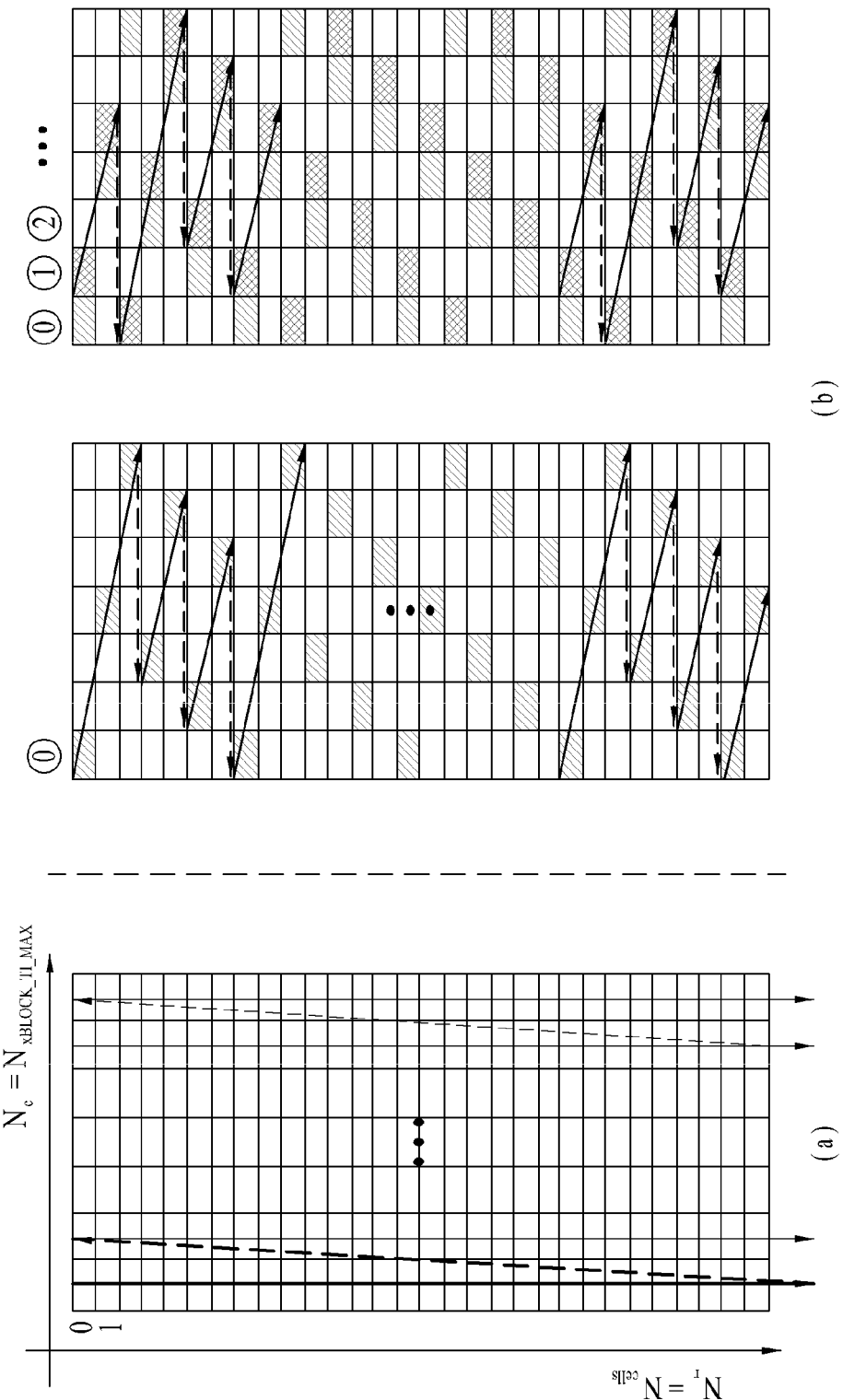

[Figure 27]
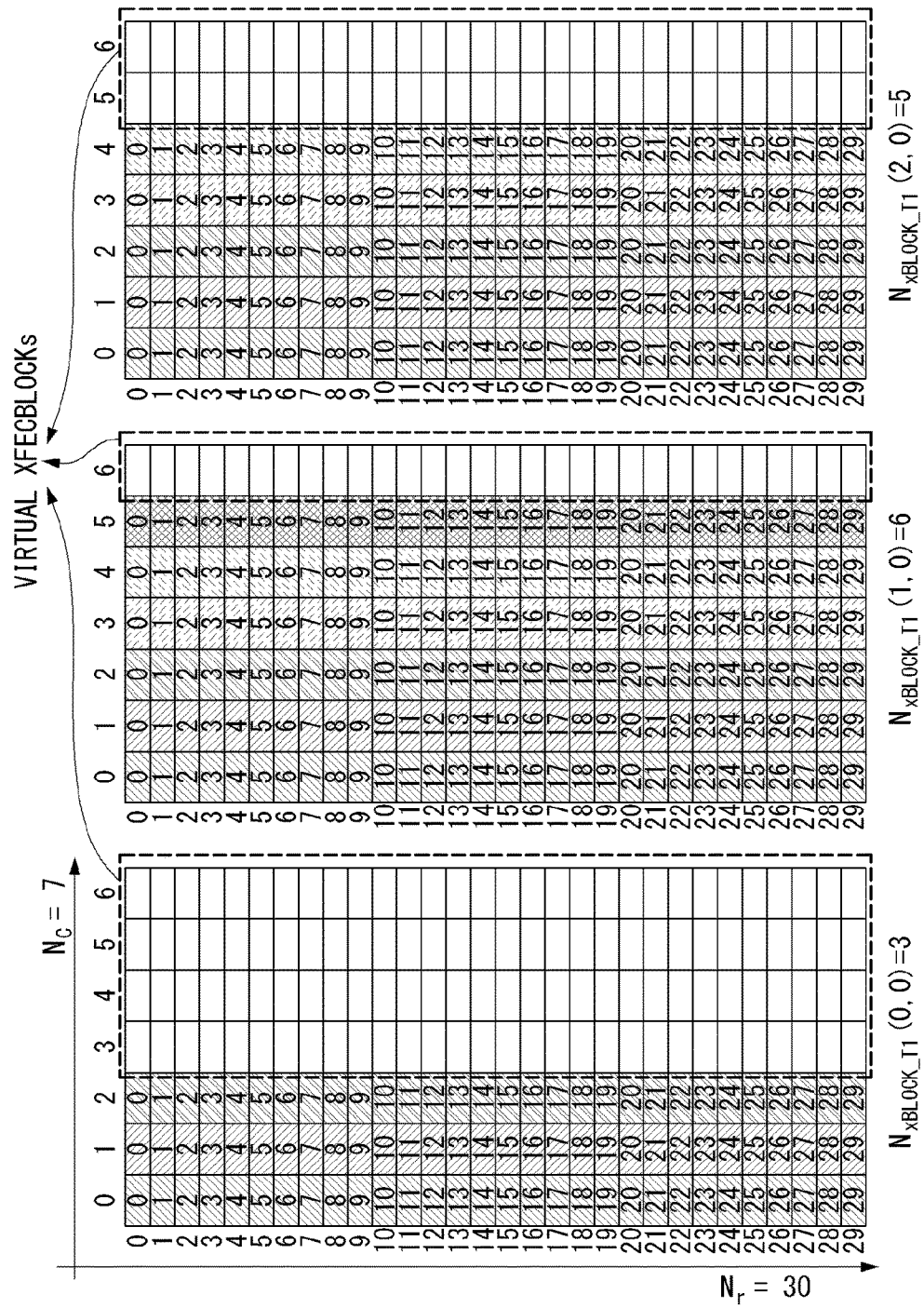

[Figure 28]
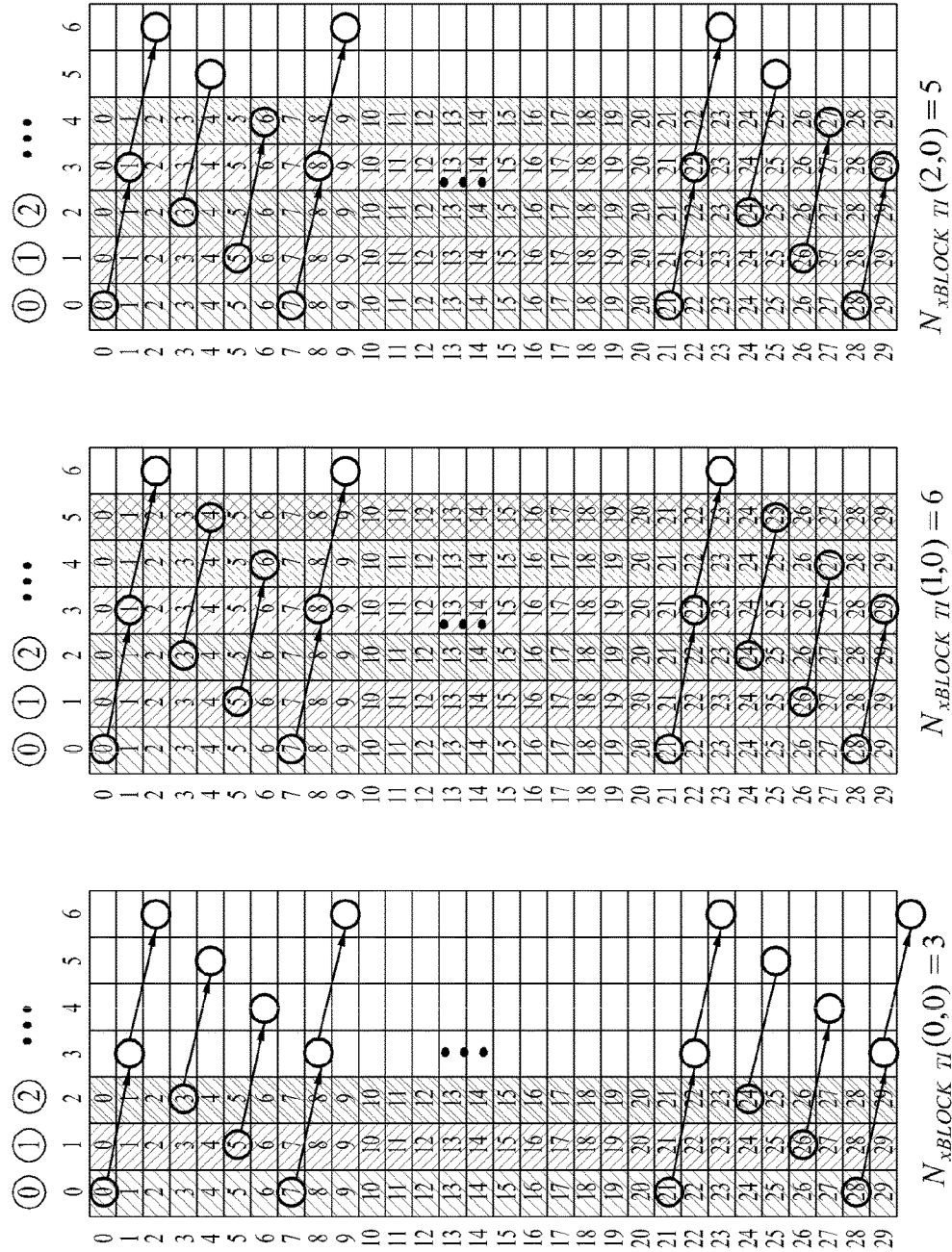

[Figure 29]

[Figure 30]
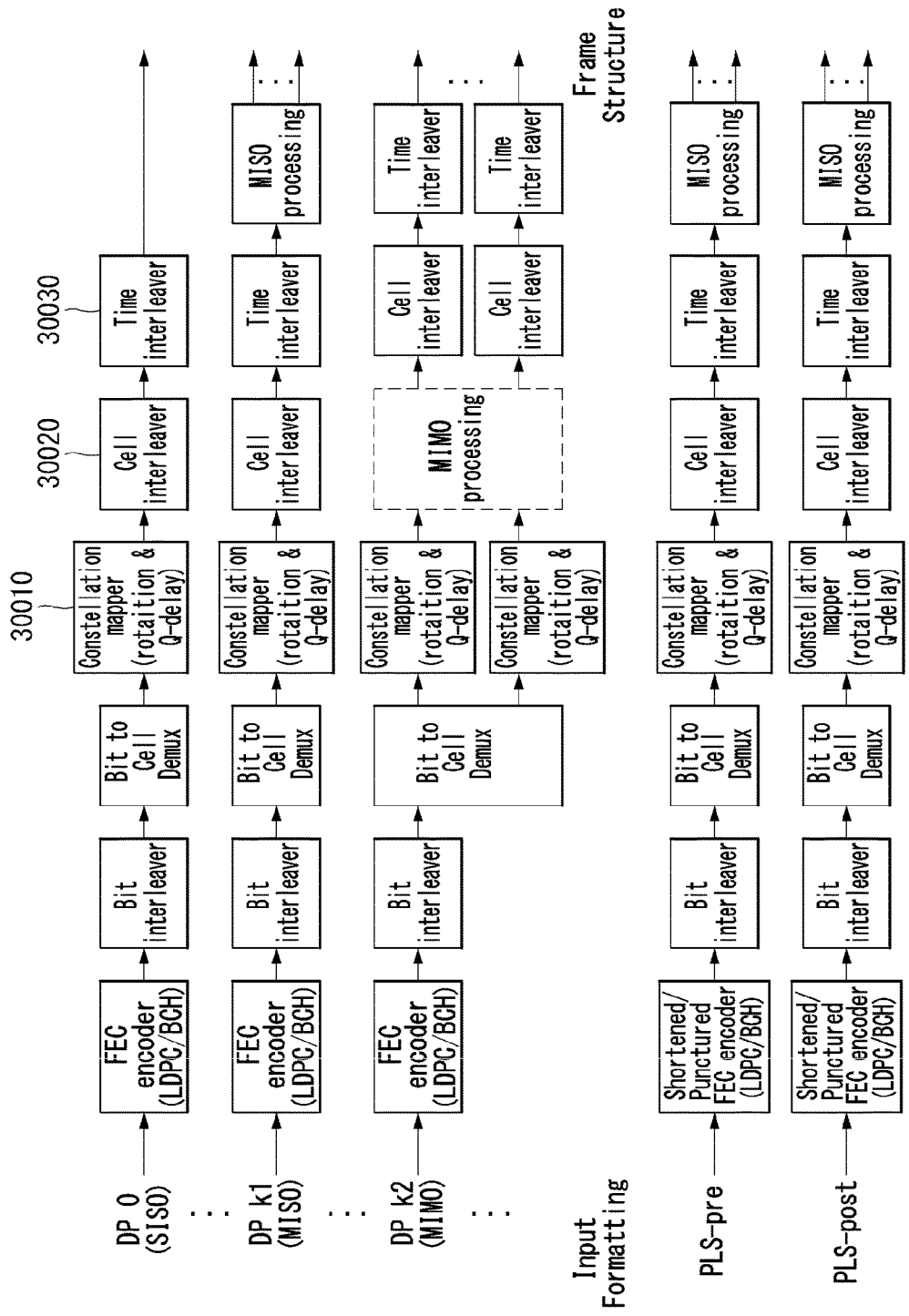

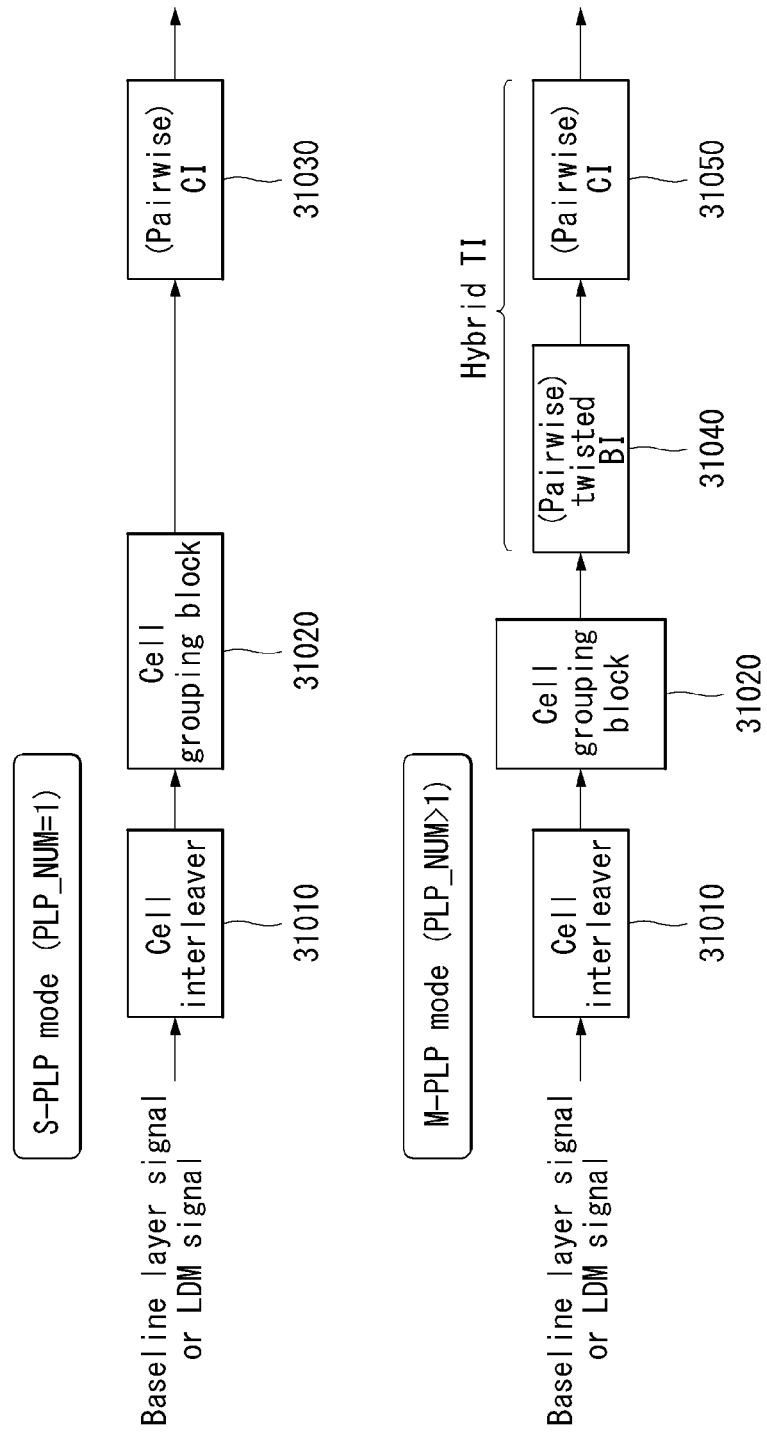
[Figure 31]

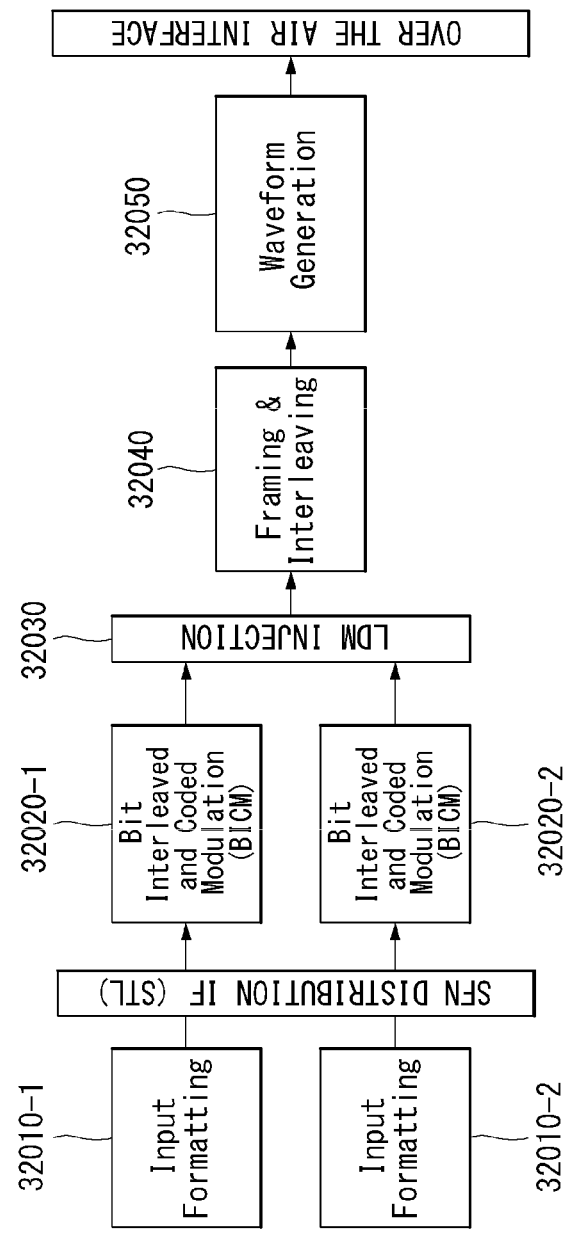
[Figure 32]

[Figure 33]
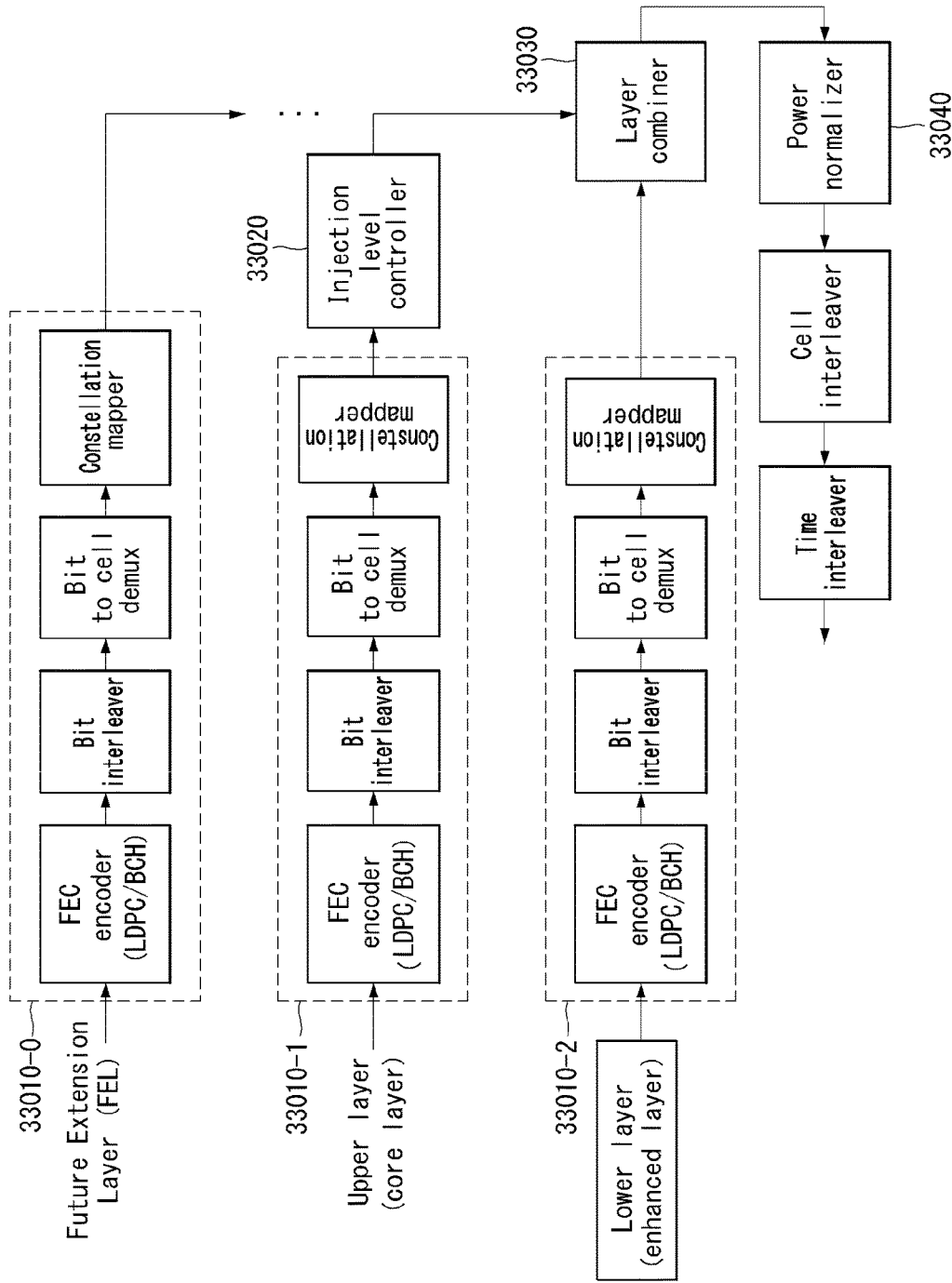

[Figure 34]
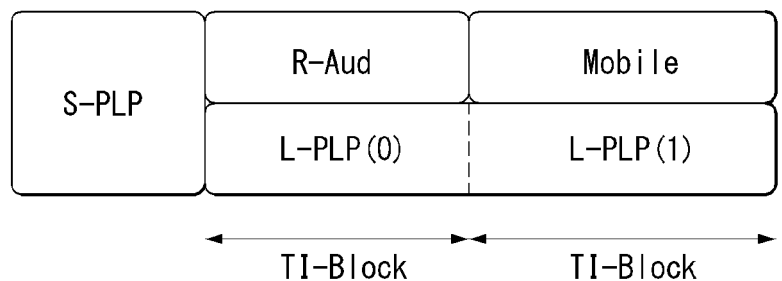
[Figure 35]
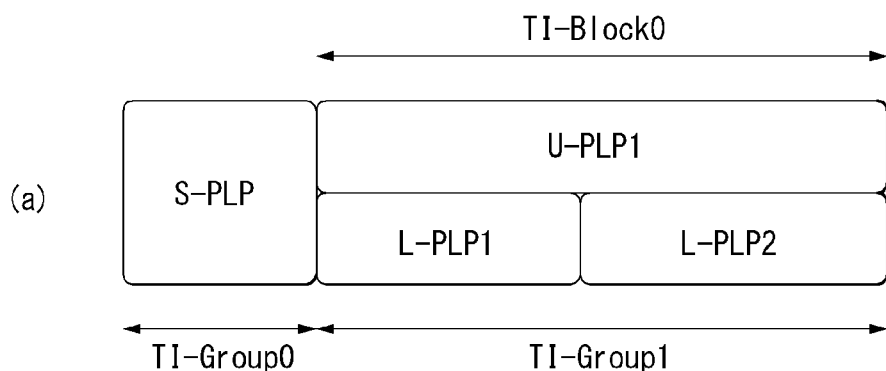
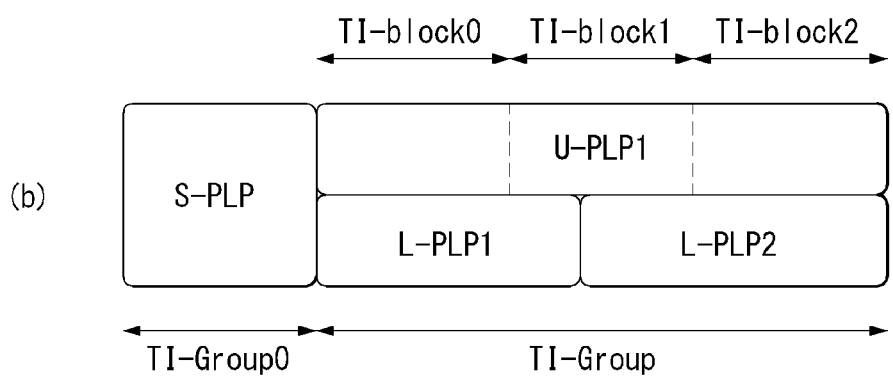

[Figure 36]
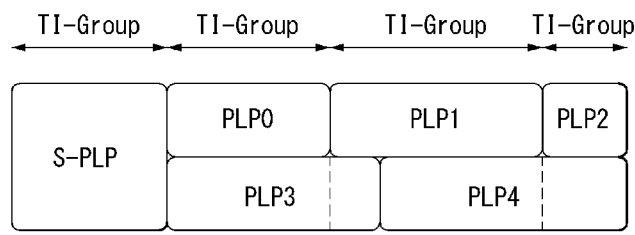
[Figure 37]
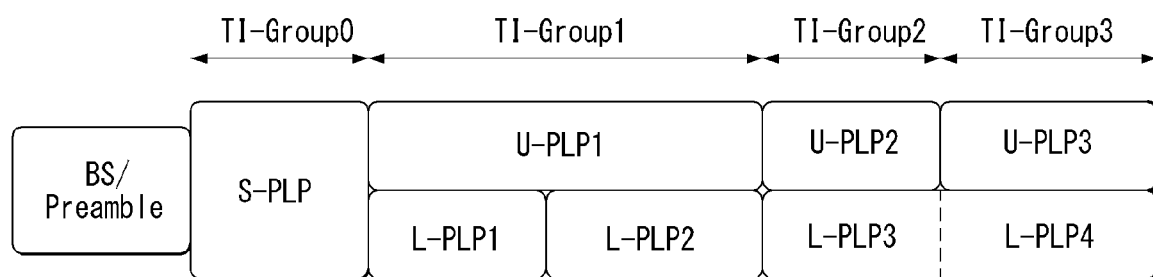

[Figure 38]
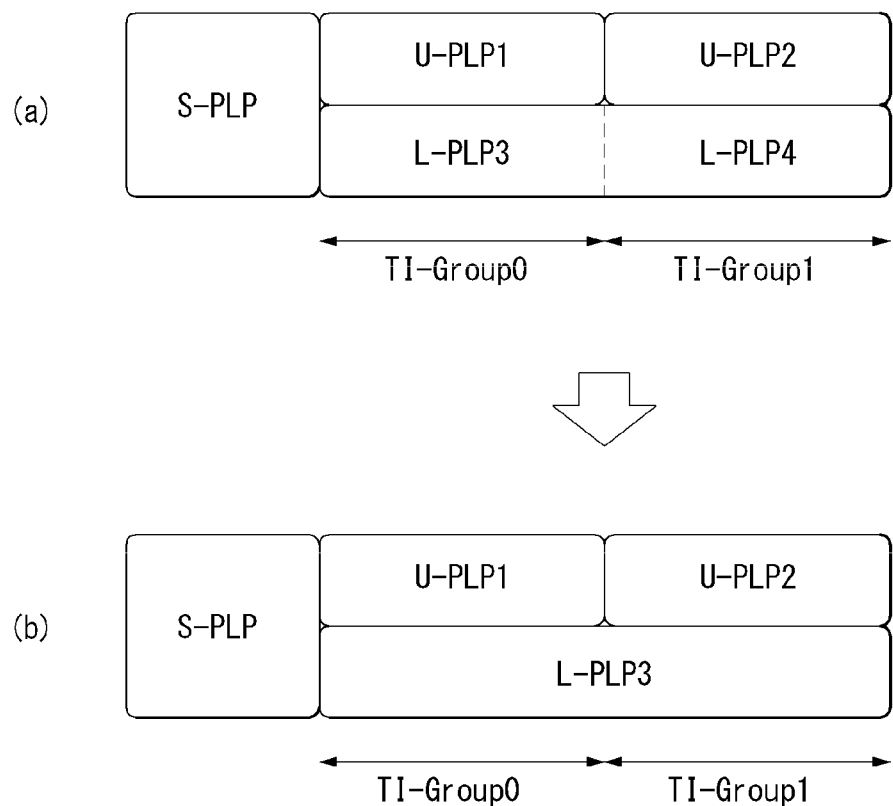

[Figure 39]

- NUM_TIGROUP
- for i=0:NUM_TIGROUP -1
    NUM_LAYER
    for j=0:NUM_LAYER -1
        NUM_PLPinLAYER
        for k=0:NUM_PLPinLAYER -1
            PLP_ID
            PLP_START
            PLP_NUM_BLOCK
            ~~LDM_GROUP_ID~~
            PLP_MODCOD
            OUTER_TYPE
            SCRAMBLER_TYPE
            ...
        end
        ...
    end
    TI_MODE
    ...
- end (a)

- NUM_TIGROUP
- for i=0:NUM_TIGROUP -1
    NUM_PLPs
    for j=0:NUM_PLPs -1
        PLP_ID
        PLP_LDM_TYPE
        PLP_START
        PLP_NUM_BLOCK
        ~~LDM_GROUP_ID~~
        PLP_MODCOD
        OUTER_TYPE
        SCRAMBLER_TYPE
        ...
    end
    TI_MODE
    ...
- end (b)

[Figure 40]

- NUM_PLP
  for i=0:NUM_PLP -1
    TI_Parameters
    PLP_ID_MAIN
    PLP_TYPE
    PLP_STARTING_POSITION
    NUM_LAYER
    for j=0:NUM_LAYER -1
        NUM_SEGMENT
        for k=0:NUM_SEGMENT -1
            PLP_ID_LAYER
            PLP_START
            PLP_NUM_BLOCK
            LDM_GROUP_ID
            PLP_MODCOD
            OUTER_TYPE
            SCRAMBLER_TYPE
            ...
        end
        if(j>0)
            EL_INJECTION_LEVEL
        end
        ...
    end
- end

[Figure 41]

- NUM_PLP
  for i=0:NUM_PLP -1
     TI_Parameters
     PLP_ID_MAIN
     PLP_SIZE
     PLP_TYPE
     PLP_STARTING_POSITION
     NUM_PLP_LAYER(or NUM_LAYER)
     for j=0:NUM_PLP_LAYER -1
           PLP_ID_LAYER
           PLP_NUM_FECBLOCK
           PLP_MODCOD
           OUTER_TYPE
           SCRAMBLER_TYPE ...
           LDM_GROUP_ID
           if(j > 0)
                EL_INJECTION_LEVEL
                PLP_START_OFFSET
           end
       end
     ...
     end
  ...
- end

[Figure 42]

- NUM_PLP
  for i=0:NUM_PLP -1
     TI_Parameters
     PLP_ID_MAIN
     PLP_SIZE
     PLP_TYPE
     PLP_STARTING_POSITION
     NUM_PLP_LAYER(NUM_LAYER)
     for j=0:NUM_PLP_LAYER -1
           PLP_ID_LAYER
           PLP_NUM_FECBLOCK
           PLP_MODCOD
           OUTER_TYPE
           SCRAMBLER_TYPE ...
           LDM_GROUP_ID
           if(PLP_ID_LAYER /= 0)
                EL_INJECTION_LEVEL
                PLP_START_OFFSET
           end
       end
     ...
     end
  ...
- end

[Figure 43]
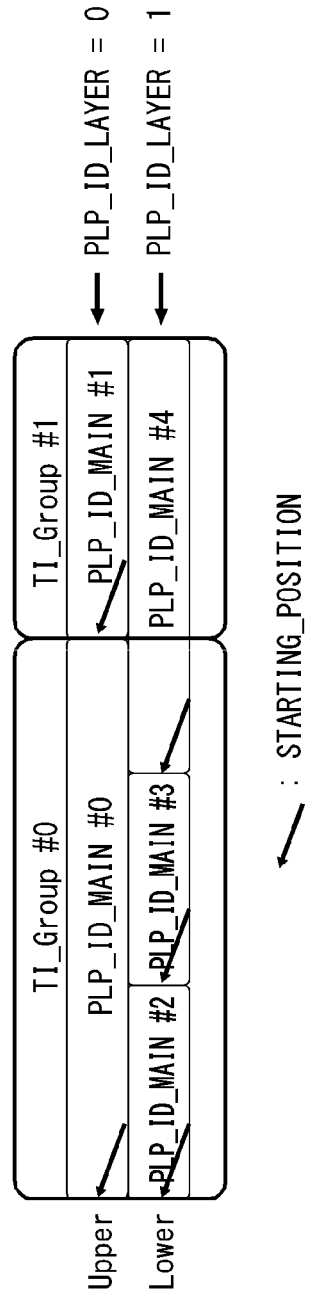

[Figure 44]

| Syntax | No. of bits |
|---|---|
| NUM_PLP | 6 bits |
| for j=0…NUM_PLP { | |
|   PLP_ID_MAIN | 6bits |
|   … | |
|   PLP_SIZE (PLP_NUM_BLOCK) | 24 bits(10bits) |
|   STARTING_POSITION | 24 bits |
|   PLP_ID_LAYER | 2 bits |
|   … | |
|   FEC_TYPE | 4 bits |
|   if FEC_TYPE ε {0,1,2,3,4,5} { | |
|     CODE_RATE | 4 bits |
|     MODULATION | 3 bits |
|   } | |
|   if(PLP_ID_LAYER== 0) { | |
|     PLP_TYPE | 1bit |
|     If PLP_TYPE = 1{ | |
|       NUM_SUB_SLICES | 14 bits |
|       SUB_SLICE_INTERVAL | 24 bits |
|     } | |
|     Time Interleaver Type | X bits |
|     Time Interleaver Depth | X bits |
|   }elseif (PLP_ID_LAYER> 0) { | |
|     INJECTION_LEVEL | 4 bits |
|   } | |
| } | |

[Figure 45]
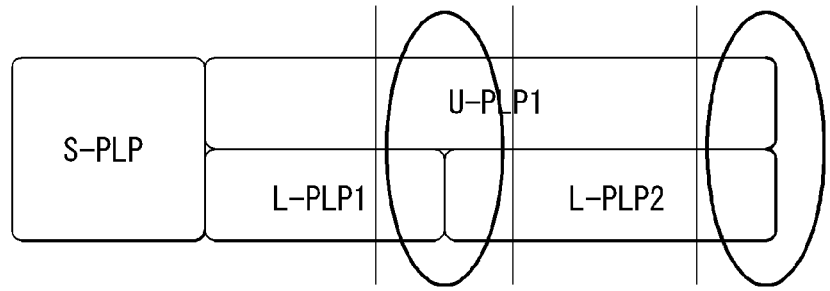
[Figure 46]
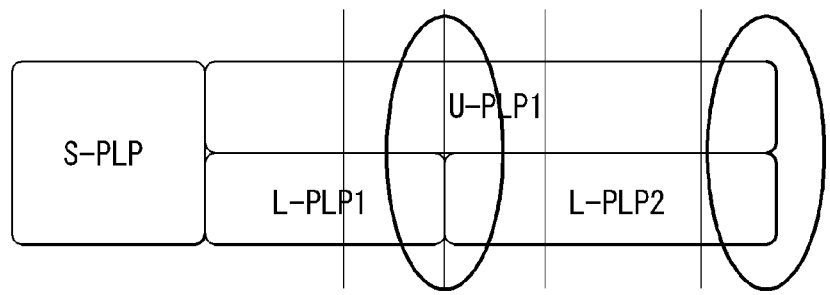
[Figure 47]
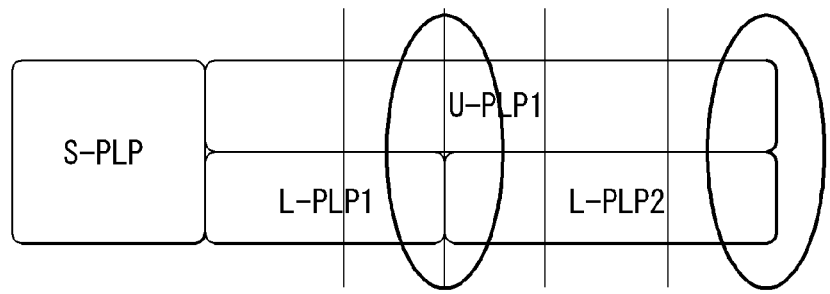

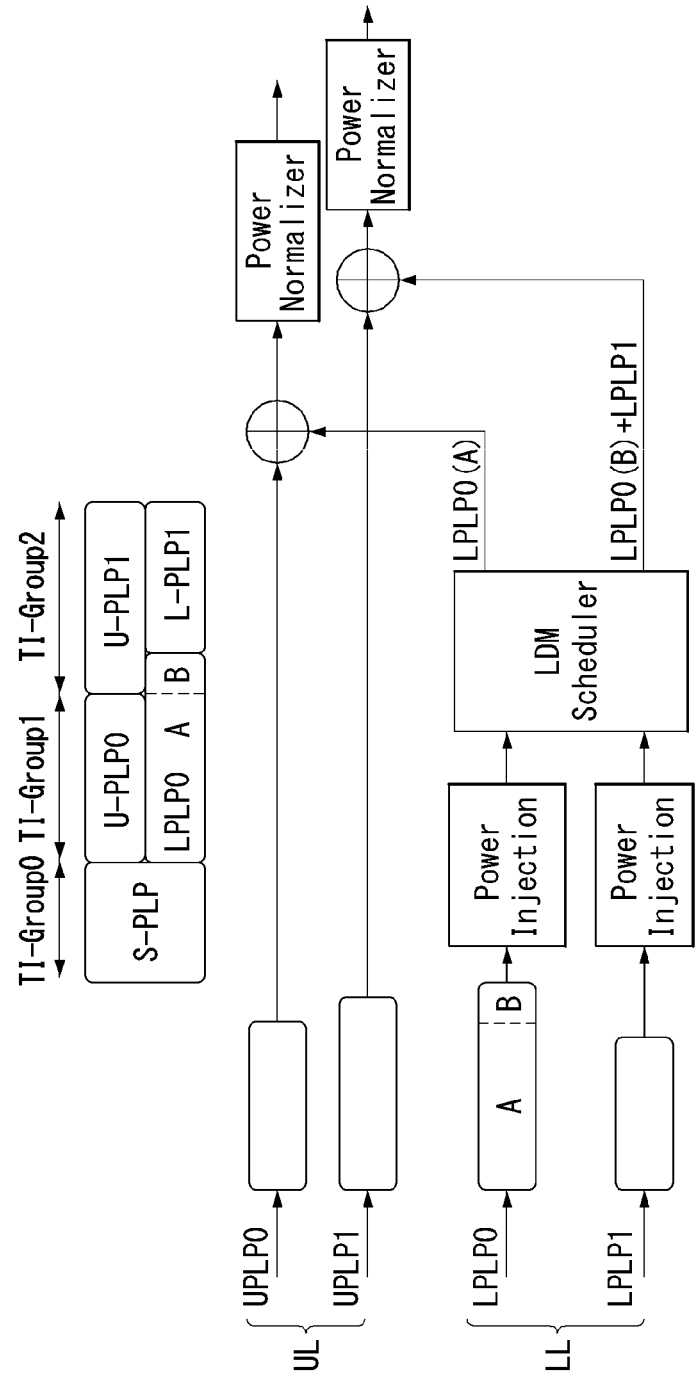
[Figure 48]

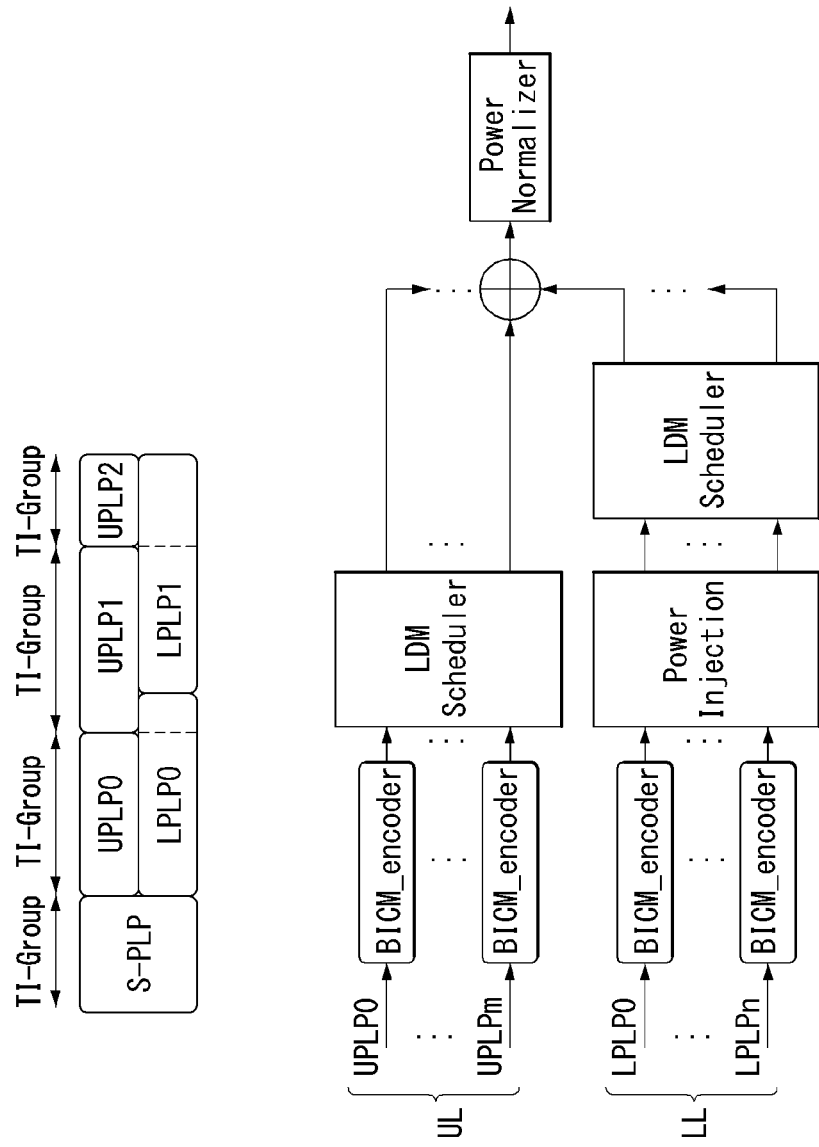
[Figure 49]

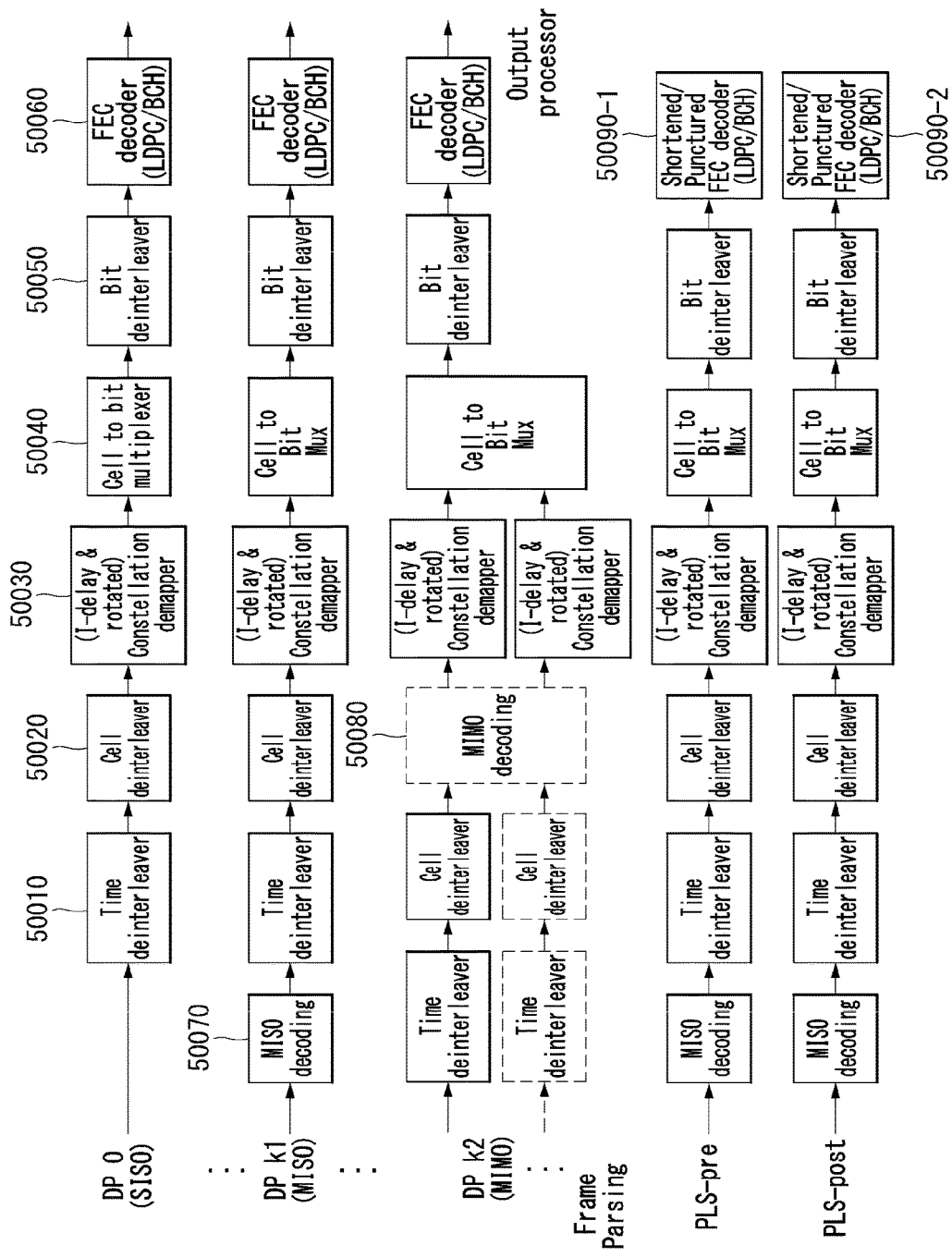
[Figure 50]

[Figure 51]
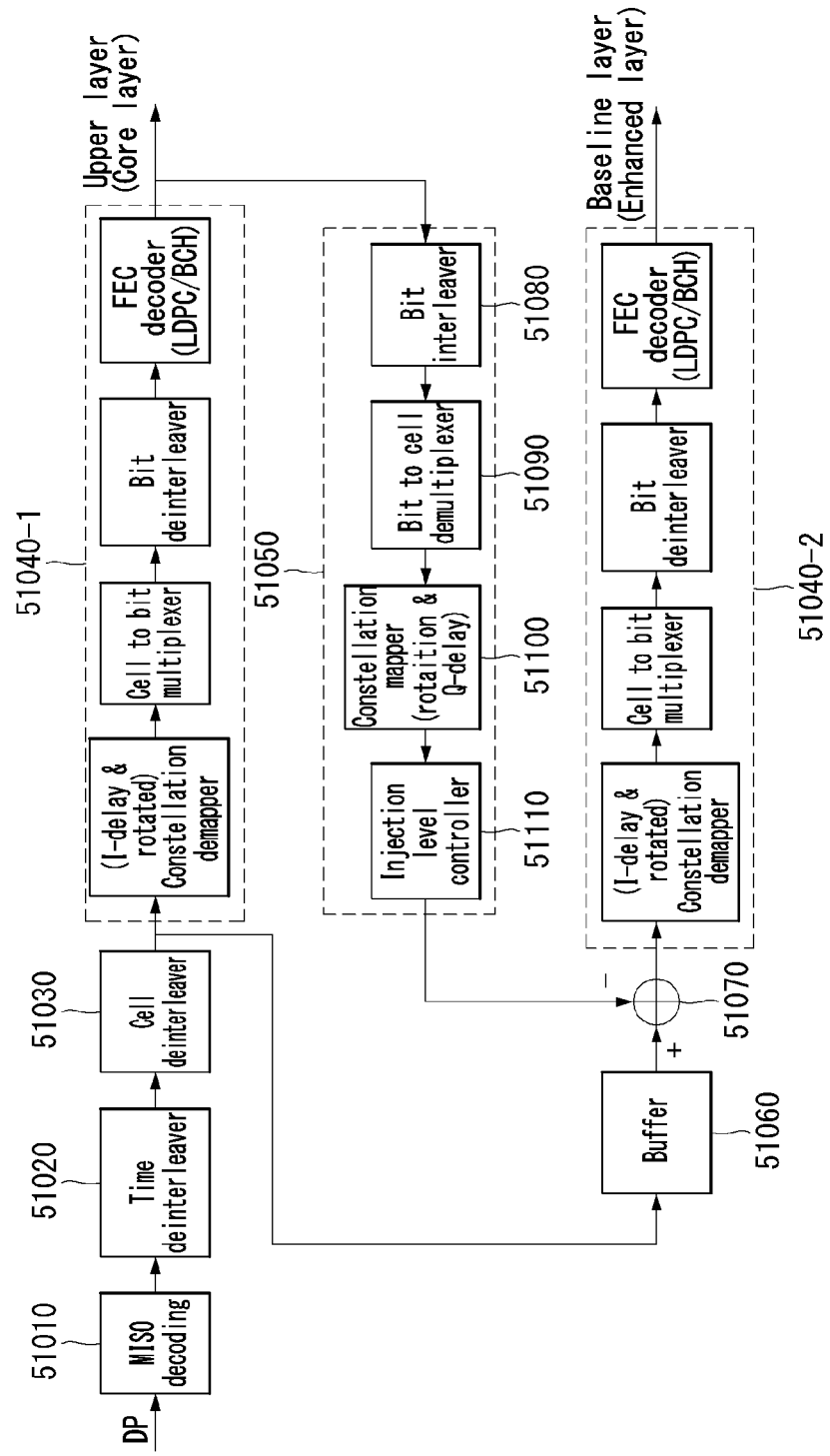

[Figure 52]
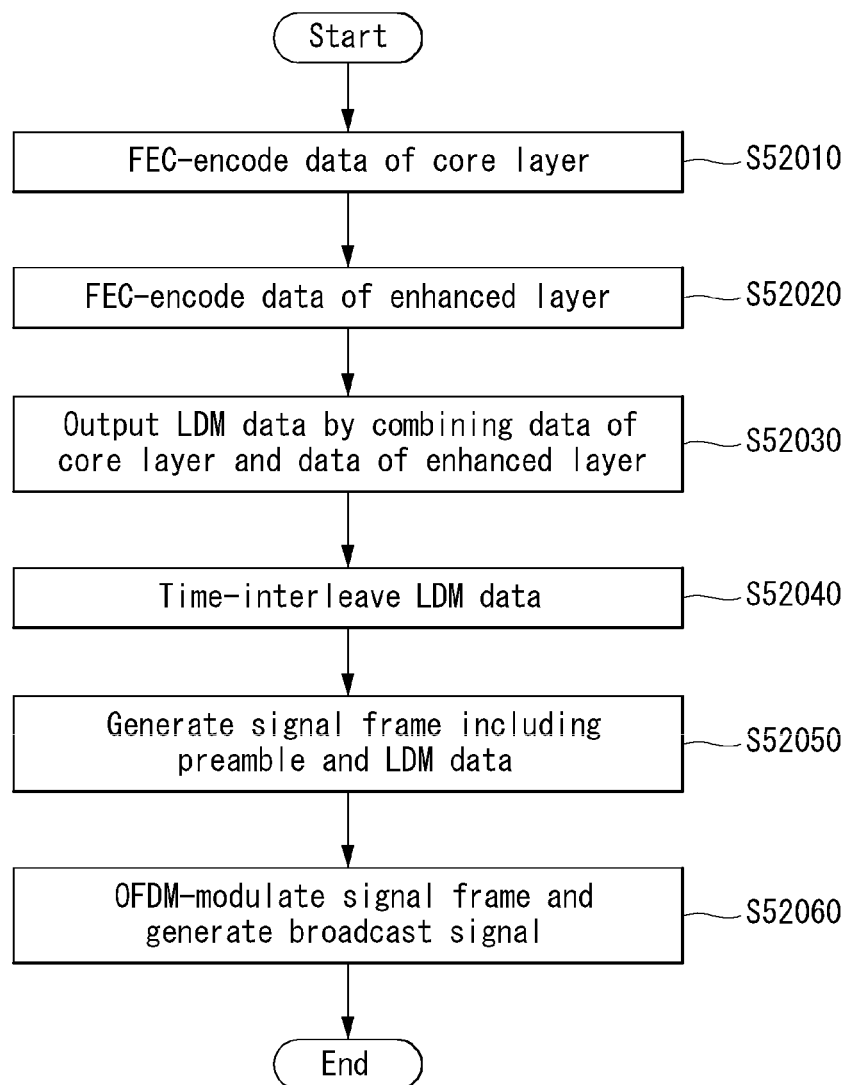

[Figure 53]
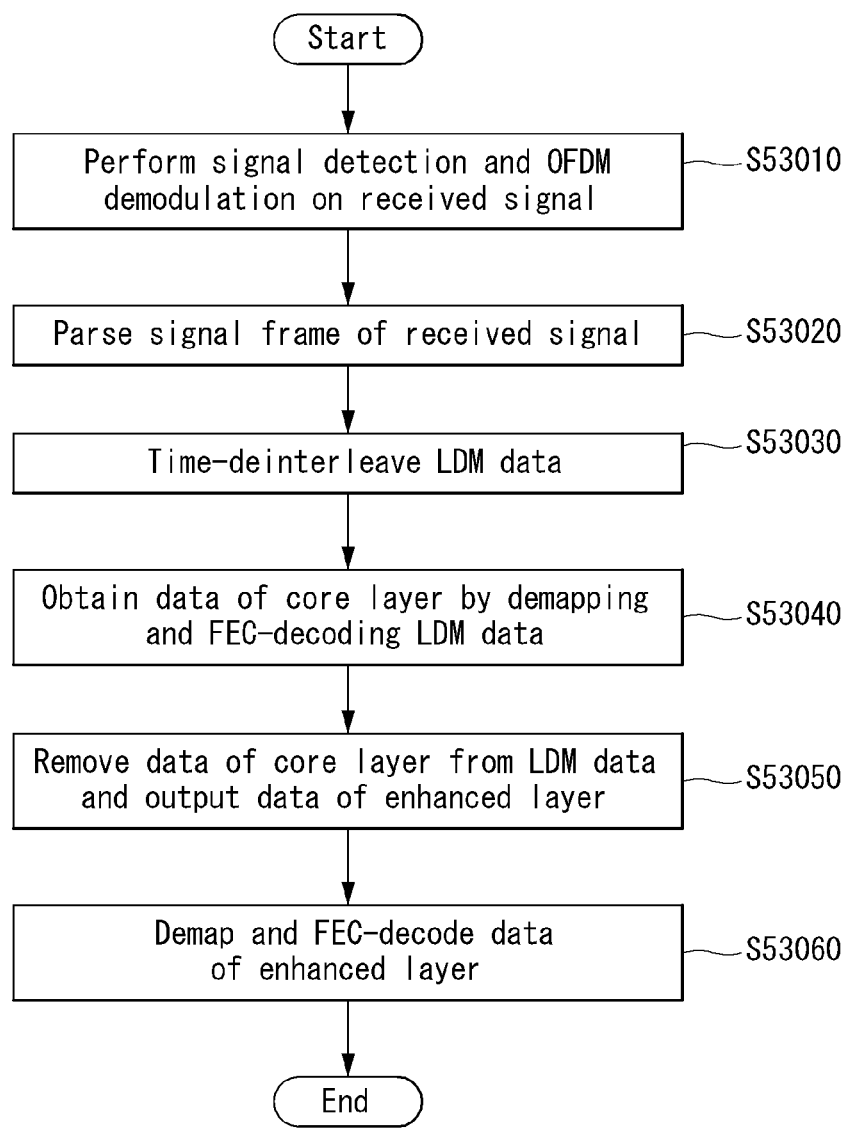

APPARATUS AND METHOD FOR SENDING AND RECEIVING BROADCAST SIGNALS

CROSS-REFERENCE TO RELATED APPLICATIONS

This application is a Continuation of U.S. patent application Ser. No. 15/971,238 filed May 4, 2018, which is a Continuation of U.S. patent application Ser. No. 15/091,404 filed on Apr. 5, 2016 (now U.S. Pat. No. 9,985,748 issued May 29, 2018), which claims the priority benefit under 35 U.S.C. § 119(e) to U.S. Provisional Application Nos. 62/197,586 filed on Jul. 28, 2015, 62/169,516 filed on Jun. 1, 2015, 62/143,823 filed on Apr. 7, 2015 and 62/143,783 filed on Apr. 6, 2015, where all of these applications are hereby expressly incorporated by reference into the present application.

BACKGROUND OF THE INVENTION

Field of the Invention

The present invention relates to an apparatus for transmitting broadcast signals, an apparatus for receiving broadcast signals and methods for transmitting and receiving broadcast signals.

Discussion of the Related Art

As analog broadcast signal transmission comes to an end, various technologies for transmitting/receiving digital broadcast signals are being developed. A digital broadcast signal may include a larger amount of video/audio data than an analog broadcast signal and further include various types of additional data in addition to the video/audio data.

That is, a digital broadcast system can provide HD (high definition) images, multi-channel audio and various additional services. However, data transmission efficiency for transmission of large amounts of data, robustness of transmission/reception networks and network flexibility in consideration of mobile reception equipment need to be improved for digital broadcast.

SUMMARY OF THE INVENTION

A broadcast signal transmitter for processing a broadcast signal including signaling information according to an embodiment of the present invention includes a first Bit Interleaved Coded Modulation (BICM) unit configured to Forward Error Correction (FEC)-encode the data of a core layer, a second BICM unit configured to FEC-encode enhanced layer data, a Layered Division Multiplexing (LDM) data injection unit configured to combine the core layer data and the enhanced layer data and to output LDM data, a time interleaver configured to time-interleave the LDM data, a framing unit configured to generate a signal frame including a preamble for carrying signaling information and the LDM data, and a waveform generating unit configured to generate a broadcast signal by performing Orthogonal Frequency Division Multiplexing (OFDM) modulation on the signal frame. More power is distributed to the core layer data than to the enhanced layer data, the core layer data of the signal frame includes at least one Physical Layer Pipe (PLP) of the core layer, and the enhanced layer data of the signal frame includes at least one Enhanced layer plp.

In the broadcast signal transmitter according to an embodiment of the present invention, the Core layer plp corresponds to a single time interleaver group, and the time interleaving of the LDM data is performed based on the Core layer plp.

In the broadcast signal transmitter according to an embodiment of the present invention, the signaling information includes PLP layer information indicating whether a PLP included in the signal frame is the Core layer plp or the Enhanced layer plp.

In the broadcast signal transmitter according to an embodiment of the present invention, if the PLP layer information indicates that the PLP is the Core layer plp, the signaling information includes time interleaving parameter information about the PLP.

In the broadcast signal transmitter according to an embodiment of the present invention, if the PLP layer information indicates that the PLP is the Enhanced layer plp, the signaling information includes injection level information indicating a transmission power distribution between the core layer data and the enhanced layer data.

In the broadcast signal transmitter according to an embodiment of the present invention, the signaling information includes PLP ID information identifying the PLP, PLP size information indicating the data size of the PLP, and PLP start information indicating the starting position of the PLP in the signal frame.

Furthermore, a method of transmitting a broadcast signal according to an embodiment of the present invention includes Forward Error Correction (FEC)-encoding the data of a core layer, FEC-encoding enhanced layer data, combining the core layer data and the enhanced layer data and outputting LDM data, time-interleaving the LDM data, generating a signal frame including a preamble for carrying signaling information and the LDM data, and generating a broadcast signal by performing Orthogonal Frequency Division Multiplexing (OFDM) modulation on the signal frame. More power is distributed to the core layer data than to the enhanced layer data, the core layer data of the signal frame includes at least one Physical Layer Pipe (PLP) of the core layer, and the enhanced layer data of the signal frame includes at least one Enhanced layer plp.

The present invention can process data according to service characteristics to control QoS (Quality of Services) for each service or service component, thereby providing various broadcast services.

The present invention can achieve transmission flexibility by transmitting various broadcast services through the same RF signal bandwidth.

The present invention can improve data transmission efficiency and increase robustness of transmission/reception of broadcast signals using a MIMO system.

According to the present invention, it is possible to provide broadcast signal transmission and reception methods and apparatus capable of receiving digital broadcast signals without error even with mobile reception equipment or in an indoor environment.

Further aspects and effects of the present invention will be described more detail with embodiments in belows.

BRIEF DESCRIPTION OF THE DRAWINGS

FIG. 1 illustrates a structure of an apparatus for transmitting broadcast signals for future broadcast services according to an embodiment of the present invention.

FIG. 2 illustrates an input formatting block according to one embodiment of the present invention.

FIG. 3 illustrates an input formatting block according to another embodiment of the present invention.

FIG. 4 illustrates an input formatting block according to another embodiment of the present invention.

FIG. 5 illustrates a BICM block according to an embodiment of the present invention.

FIG. 6 illustrates a BICM block according to another embodiment of the present invention.

FIG. 7 illustrates a frame building block according to one embodiment of the present invention.

FIG. 8 illustrates an OFDM generation block according to an embodiment of the present invention.

FIG. 9 illustrates a structure of an apparatus for receiving broadcast signals for future broadcast services according to an embodiment of the present invention.

FIG. 10 illustrates a frame structure according to an embodiment of the present invention.

FIG. 11 illustrates a signaling hierarchy structure of the frame according to an embodiment of the present invention.

FIG. 12 illustrates preamble signaling data according to an embodiment of the present invention.

FIG. 13 illustrates PLS1 data according to an embodiment of the present invention.

FIG. 14 illustrates PLS2 data according to an embodiment of the present invention.

FIG. 15 illustrates PLS2 data according to another embodiment of the present invention.

FIG. 16 illustrates a logical structure of a frame according to an embodiment of the present invention.

FIG. 17 illustrates PLS mapping according to an embodiment of the present invention.

FIG. 18 illustrates EAC mapping according to an embodiment of the present invention.

FIG. 19 illustrates FIC mapping according to an embodiment of the present invention.

FIG. 20 illustrates a type of DP according to an embodiment of the present invention.

FIG. 21 illustrates DP mapping according to an embodiment of the present invention.

FIG. 22 illustrates an FEC structure according to an embodiment of the present invention.

FIG. 23 illustrates a bit interleaving according to an embodiment of the present invention.

FIG. 24 illustrates a cell-word demultiplexing according to an embodiment of the present invention.

FIG. 25 illustrates a time interleaving according to an embodiment of the present invention.

FIG. 26 illustrates a basic operation of a twisted row-column block interleaver according to an exemplary embodiment of the present invention.

FIG. 27 illustrates an operation of a twisted row-column block interleaver according to another exemplary embodiment of the present invention.

FIG. 28 illustrates a diagonal reading pattern of the twisted row-column block interleaver according to the exemplary embodiment of the present invention.

FIG. 29 illustrates XFECBLOCK interleaved from each interleaving array according to an exemplary embodiment of the present invention.

FIG. 30 shows a detailed block diagram of a BICM block according to another embodiment of the present invention.

FIG. 31 shows a time interleaver according to an embodiment of the present invention.

FIG. 32 shows the configuration of a broadcast signal transmitter according to an embodiment of the present invention.

FIG. 33 shows the configuration of part of the broadcast signal transmitter according to an embodiment of the present invention.

FIG. 34 shows an embodiment of an LDM-processed signal frame according to an embodiment of the present invention.

FIG. 35 shows an embodiment of an LDM-processed signal frame according to another embodiment of the present invention.

FIG. 36 shows an embodiment of an LDM-processed signal frame according to another embodiment of the present invention.

FIG. 37 shows an embodiment of an LDM-processed signal frame according to another embodiment of the present invention.

FIG. 38 shows an embodiment of an LDM-processed signal frame according to an embodiment of the present invention.

FIG. 39 shows a signaling loop according to an embodiment of the present invention.

FIG. 40 shows a signaling loop according to another embodiment of the present invention.

FIG. 41 shows a signaling loop according to another embodiment of the present invention.

FIG. 42 shows a signaling loop according to another embodiment of the present invention.

FIG. 43 shows an embodiment of an LDM-processed signal frame according to another embodiment of the present invention.

FIG. 44 shows a signaling loop according to another embodiment of the present invention.

FIG. 45 shows a first embodiment of the synchronization of FEC blocks.

FIG. 46 shows a second embodiment of the synchronization of FEC blocks.

FIG. 47 shows a third embodiment of the synchronization of FEC blocks.

FIGS. 48 and 49 show LDM schedulers according to embodiments of the present invention and shows part of the configurations of broadcast signal transmitters according to the LDM schedulers.

FIG. 50 shows a detailed block diagram of the demapping/decoding block of a broadcast signal receiver according to an embodiment of the present invention.

FIG. 51 shows the configuration of part of a broadcast signal receiver according to an embodiment of the present invention.

FIG. 52 shows a method of transmitting a broadcast signal according to an embodiment of the present invention.

FIG. 53 shows a method of receiving a broadcast signal according to an embodiment of the present invention.

DETAILED DESCRIPTION OF THE EMBODIMENTS

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details.

Although most terms used in the present invention have been selected from general ones widely used in the art, some terms have been arbitrarily selected by the applicant and their meanings are explained in detail in the following description as needed. Thus, the present invention should be understood based upon the intended meanings of the terms rather than their simple names or meanings. Also, the term block and module are used similarly to indicate logical/functional unit of particular signal/data processing.

The present invention provides apparatuses and methods for transmitting and receiving broadcast signals for future broadcast services. Future broadcast services according to an embodiment of the present invention include a terrestrial broadcast service, a mobile broadcast service, a UHDTV service, etc. The present invention may process broadcast signals for the future broadcast services through non-MIMO (Multiple Input Multiple Output) or MIMO according to one embodiment. A non-MIMO scheme according to an embodiment of the present invention may include a MISO (Multiple Input Single Output) scheme, a SISO (Single Input Single Output) scheme, etc.

While MISO or MIMO uses two antennas in the following for convenience of description, the present invention is applicable to systems using two or more antennas.

The present invention may defines three physical layer (PL) profiles—base, handheld and advanced profiles—each optimized to minimize receiver complexity while attaining the performance required for a particular use case. The physical layer (PHY) profiles are subsets of all configurations that a corresponding receiver should implement.

The three PHY profiles share most of the functional blocks but differ slightly in specific blocks and/or parameters. Additional PHY profiles can be defined in the future. For the system evolution, future profiles can also be multiplexed with the existing profiles in a single RF channel through a future extension frame (FEF). The details of each PHY profile are described below.

1. Base Profile

The base profile represents a main use case for fixed receiving devices that are usually connected to a roof-top antenna. The base profile also includes portable devices that could be transported to a place but belong to a relatively stationary reception category. Use of the base profile could be extended to handheld devices or even vehicular by some improved implementations, but those use cases are not expected for the base profile receiver operation.

Target SNR range of reception is from approximately 10 to 20 dB, which includes the 15 dB SNR reception capability of the existing broadcast system (e.g. ATSC A/53). The receiver complexity and power consumption is not as critical as in the battery-operated handheld devices, which will use the handheld profile. Key system parameters for the base profile are listed in below table 1.

TABLE 1

| LDPC codeword length | 16K, 64K bits |
|---|---|
| Constellation size | 4~10 bpcu (bits per channel use) |
| Time de-interleaving memory size | ≤$2^{19}$ data cells |
| Pilot patterns | Pilot pattern for fixed reception |
| FFT size | 16K, 32K points |

2. Handheld Profile

The handheld profile is designed for use in handheld and vehicular devices that operate with battery power. The devices can be moving with pedestrian or vehicle speed. The power consumption as well as the receiver complexity is very important for the implementation of the devices of the handheld profile. The target SNR range of the handheld profile is approximately 0 to 10 dB, but can be configured to reach below 0 dB when intended for deeper indoor reception.

In addition to low SNR capability, resilience to the Doppler Effect caused by receiver mobility is the most important performance attribute of the handheld profile. Key system parameters for the handheld profile are listed in the below table 2.

TABLE 2

| LDPC codeword length | 16 Kbits |
|---|---|
| Constellation size | 2~8 bpcu |
| Time de-interleaving memory size | ≤$2^{18}$ data cells |
| Pilot patterns | Pilot patterns for mobile and indoor reception |
| FFT size | 8K, 16K points |

3. Advanced Profile

The advanced profile provides highest channel capacity at the cost of more implementation complexity. This profile requires using MIMO transmission and reception, and UHDTV service is a target use case for which this profile is specifically designed. The increased capacity can also be used to allow an increased number of services in a given bandwidth, e.g., multiple SDTV or HDTV services.

The target SNR range of the advanced profile is approximately 20 to 30 dB. MIMO transmission may initially use existing elliptically-polarized transmission equipment, with extension to full-power cross-polarized transmission in the future. Key system parameters for the advanced profile are listed in below table 3.

TABLE 3

| LDPC codeword length | 16K, 64Kbits |
|---|---|
| Constellation size | 8~12 bpcu |
| Time de-interleaving memory size | ≤$2^{19}$ data cells |
| Pilot patterns | Pilot pattern for fixed reception |
| FFT size | 16K, 32K points |

In this case, the base profile can be used as a profile for both the terrestrial broadcast service and the mobile broadcast service. That is, the base profile can be used to define a concept of a profile which includes the mobile profile. Also, the advanced profile can be divided advanced profile for a base profile with MIMO and advanced profile for a handheld profile with MIMO. Moreover, the three profiles can be changed according to intention of the designer.

The following terms and definitions may apply to the present invention. The following terms and definitions can be changed according to design.

auxiliary stream: sequence of cells carrying data of as yet undefined modulation and coding, which may be used for future extensions or as required by broadcasters or network operators.

base data pipe: data pipe that carries service signaling data.

baseband frame (or BBFRAME): set of Kbch bits which form the input to one FEC encoding process (BCH and LDPC encoding).

cell: modulation value that is carried by one carrier of the OFDM transmission.

coded block: LDPC-encoded block of PLS1 data or one of the LDPC-encoded blocks of PLS2 data.

data pipe: logical channel in the physical layer that carries service data or related metadata, which may carry one or multiple service(s) or service component(s).

data pipe unit: a basic unit for allocating data cells to a DP in a frame.

data symbol: OFDM symbol in a frame which is not a preamble symbol (the frame signaling symbol and frame edge symbol is included in the data symbol).

DP_ID: this 8-bit field identifies uniquely a DP within the system identified by the SYSTEM_ID.

dummy cell: cell carrying a pseudo-random value used to fill the remaining capacity not used for PLS signaling, DPs or auxiliary streams.

emergency alert channel: part of a frame that carries EAS information data.

frame: physical layer time slot that starts with a preamble and ends with a frame edge symbol.

frame repetition unit: a set of frames belonging to same or different physical layer profile including a FEF, which is repeated eight times in a super-frame.

fast information channel: a logical channel in a frame that carries the mapping information between a service and the corresponding base DP.

FECBLOCK: set of LDPC-encoded bits of a DP data.

FFT size: nominal FFT size used for a particular mode, equal to the active symbol period Ts expressed in cycles of the elementary period T.

frame signaling symbol: OFDM symbol with higher pilot density used at the start of a frame in certain combinations of FFT size, guard interval and scattered pilot (sp) pattern, which carries a part of the PLS data.

frame edge symbol: OFDM symbol with higher pilot density used at the end of a frame in certain combinations of FFT size, guard interval and scattered pilot pattern.

frame-group: the set of all the frames having the same PHY profile type in a super-frame.

future extension frame: physical layer time slot within the super-frame that could be used for future extension, which starts with a preamble.

Futurecast UTB system: proposed physical layer broadcasting system, of which the input is one or more MPEG2-TS or IP or general stream(s) and of which the output is an RF signal.

input stream: A stream of data for an ensemble of services delivered to the end users by the system.

normal data symbol: data symbol excluding the frame signaling symbol and the frame edge symbol.

PHY profile: subset of all configurations that a corresponding receiver should implement.

PLS: physical layer signaling data consisting of PLS1 and PLS2.

PLS1: a first set of PLS data carried in the FSS symbols having a fixed size, coding and modulation, which carries basic information about the system as well as the parameters needed to decode the PLS2.

NOTE: PLS1 data remains constant for the duration of a frame-group.

PLS2: a second set of PLS data transmitted in the FSS symbol, which carries more detailed PLS data about the system and the DPs.

PLS2 dynamic data: PLS2 data that may dynamically change frame-by-frame.

PLS2 static data: PLS2 data that remains static for the duration of a frame-group.

preamble signaling data: signaling data carried by the preamble symbol and used to identify the basic mode of the system.

preamble symbol: fixed-length pilot symbol that carries basic PLS data and is located in the beginning of a frame.

NOTE: The preamble symbol is mainly used for fast initial band scan to detect the system signal, its timing, frequency offset, and FFT-size.

reserved for future use: not defined by the present document but may be defined in future.

super-frame: set of eight frame repetition units.

time interleaving block (TI block): set of cells within which time interleaving is carried out, corresponding to one use of the time interleaver memory.

TI group: unit over which dynamic capacity allocation for a particular DP is carried out, made up of an integer, dynamically varying number of XFECBLOCKs.

NOTE: The TI group may be mapped directly to one frame or may be mapped to multiple frames. It may contain one or more TI blocks.

Type 1 DP: DP of a frame where all DPs are mapped into the frame in TDM fashion.

Type 2 DP: DP of a frame where all DPs are mapped into the frame in FDM fashion.

XFECBLOCK: set of Ncells cells carrying all the bits of one LDPC FECBLOCK.

FIG. 1 illustrates a structure of an apparatus for transmitting broadcast signals for future broadcast services according to an embodiment of the present invention.

The apparatus for transmitting broadcast signals for future broadcast services according to an embodiment of the present invention can include an input formatting block 1000, a BICM (Bit interleaved coding & modulation) block 1010, a frame structure block 1020, an OFDM (Orthogonal Frequency Division Multiplexing) generation block 1030 and a signaling generation block 1040. A description will be given of the operation of each module of the apparatus for transmitting broadcast signals.

IP stream/packets and MPEG2-TS are the main input formats, other stream types are handled as General Streams. In addition to these data inputs, Management Information is input to control the scheduling and allocation of the corresponding bandwidth for each input stream. One or multiple TS stream(s), IP stream(s) and/or General Stream(s) inputs are simultaneously allowed.

The input formatting block 1000 can demultiplex each input stream into one or multiple data pipe(s), to each of which an independent coding and modulation is applied. The data pipe (DP) is the basic unit for robustness control, thereby affecting quality-of-service (QoS). One or multiple service(s) or service component(s) can be carried by a single DP. Details of operations of the input formatting block 1000 will be described later.

The data pipe is a logical channel in the physical layer that carries service data or related metadata, which may carry one or multiple service(s) or service component(s).

Also, the data pipe unit: a basic unit for allocating data cells to a DP in a frame.

In the BICM block 1010, parity data is added for error correction and the encoded bit streams are mapped to complex-value constellation symbols. The symbols are interleaved across a specific interleaving depth that is used for the corresponding DP. For the advanced profile, MIMO encoding is performed in the BICM block 1010 and the additional data path is added at the output for MIMO transmission. Details of operations of the BICM block 1010 will be described later.

The Frame Building block 1020 can map the data cells of the input DPs into the OFDM symbols within a frame. After mapping, the frequency interleaving is used for frequency-domain diversity, especially to combat frequency-selective fading channels. Details of operations of the Frame Building block 1020 will be described later.

After inserting a preamble at the beginning of each frame, the OFDM Generation block 1030 can apply conventional OFDM modulation having a cyclic prefix as guard interval. For antenna space diversity, a distributed MISO scheme is applied across the transmitters. In addition, a Peak-to-Average Power Reduction (PAPR) scheme is performed in the time domain. For flexible network planning, this proposal provides a set of various FFT sizes, guard interval lengths and corresponding pilot patterns. Details of operations of the OFDM Generation block 1030 will be described later.

The Signaling Generation block 1040 can create physical layer signaling information used for the operation of each functional block. This signaling information is also transmitted so that the services of interest are properly recovered at the receiver side. Details of operations of the Signaling Generation block 1040 will be described later.

FIGS. 2, 3 and 4 illustrate the input formatting block 1000 according to embodiments of the present invention. A description will be given of each figure.

FIG. 2 illustrates an input formatting block according to one embodiment of the present invention. FIG. 2 shows an input formatting module when the input signal is a single input stream.

The input formatting block illustrated in FIG. 2 corresponds to an embodiment of the input formatting block 1000 described with reference to FIG. 1.

The input to the physical layer may be composed of one or multiple data streams. Each data stream is carried by one DP. The mode adaptation modules slice the incoming data stream into data fields of the baseband frame (BBF). The system supports three types of input data streams: MPEG2-TS, Internet protocol (IP) and Generic stream (GS). MPEG2-TS is characterized by fixed length (188 byte) packets with the first byte being a sync-byte (0x47). An IP stream is composed of variable length IP datagram packets, as signaled within IP packet headers. The system supports both IPv4 and IPv6 for the IP stream. GS may be composed of variable length packets or constant length packets, signaled within encapsulation packet headers.

(a) shows a mode adaptation block 2000 and a stream adaptation 2010 for signal DP and (b) shows a PLS generation block 2020 and a PLS scrambler 2030 for generating and processing PLS data. A description will be given of the operation of each block.

The Input Stream Splitter splits the input TS, IP, GS streams into multiple service or service component (audio, video, etc.) streams. The mode adaptation module 2010 is comprised of a CRC Encoder, BB (baseband) Frame Slicer, and BB Frame Header Insertion block.

The CRC Encoder provides three kinds of CRC encoding for error detection at the user packet (UP) level, i.e., CRC-8, CRC-16, and CRC-32. The computed CRC bytes are appended after the UP. CRC-8 is used for TS stream and CRC-32 for IP stream. If the GS stream doesn't provide the CRC encoding, the proposed CRC encoding should be applied.

BB Frame Slicer maps the input into an internal logical-bit format. The first received bit is defined to be the MSB. The BB Frame Slicer allocates a number of input bits equal to the available data field capacity. To allocate a number of input bits equal to the BBF payload, the UP packet stream is sliced to fit the data field of BBF.

BB Frame Header Insertion block can insert fixed length BBF header of 2 bytes is inserted in front of the BB Frame. The BBF header is composed of STUFFI (1 bit), SYNCD (13 bits), and RFU (2 bits). In addition to the fixed 2-Byte BBF header, BBF can have an extension field (1 or 3 bytes) at the end of the 2-byte BBF header.

The stream adaptation 2010 is comprised of stuffing insertion block and BB scrambler.

The stuffing insertion block can insert stuffing field into a payload of a BB frame. If the input data to the stream adaptation is sufficient to fill a BB-Frame, STUFFI is set to '0' and the BBF has no stuffing field. Otherwise STUFFI is set to '1' and the stuffing field is inserted immediately after the BBF header. The stuffing field comprises two bytes of the stuffing field header and a variable size of stuffing data.

The BB scrambler scrambles complete BBF for energy dispersal. The scrambling sequence is synchronous with the BBF. The scrambling sequence is generated by the feedback shift register.

The PLS generation block 2020 can generate physical layer signaling (PLS) data. The PLS provides the receiver with a means to access physical layer DPs. The PLS data consists of PLS1 data and PLS2 data.

The PLS1 data is a first set of PLS data carried in the FSS symbols in the frame having a fixed size, coding and modulation, which carries basic information about the system as well as the parameters needed to decode the PLS2 data. The PLS1 data provides basic transmission parameters including parameters required to enable the reception and decoding of the PLS2 data. Also, the PLS1 data remains constant for the duration of a frame-group.

The PLS2 data is a second set of PLS data transmitted in the FSS symbol, which carries more detailed PLS data about the system and the DPs. The PLS2 contains parameters that provide sufficient information for the receiver to decode the desired DP. The PLS2 signaling further consists of two types of parameters, PLS2 Static data (PLS2-STAT data) and PLS2 dynamic data (PLS2-DYN data). The PLS2 Static data is PLS2 data that remains static for the duration of a frame-group and the PLS2 dynamic data is PLS2 data that may dynamically change frame-by-frame.

Details of the PLS data will be described later.

The PLS scrambler 2030 can scramble the generated PLS data for energy dispersal.

The above-described blocks may be omitted or replaced by blocks having similar or identical functions.

FIG. 3 illustrates an input formatting block according to another embodiment of the present invention.

The input formatting block illustrated in FIG. 3 corresponds to an embodiment of the input formatting block 1000 described with reference to FIG. 1.

FIG. 3 shows a mode adaptation block of the input formatting block when the input signal corresponds to multiple input streams.

The mode adaptation block of the input formatting block for processing the multiple input streams can independently process the multiple input streams.

Referring to FIG. 3, the mode adaptation block for respectively processing the multiple input streams can include an input stream splitter 3000, an input stream synchronizer 3010, a compensating delay block 3020, a null packet deletion block 3030, a head compression block 3040, a CRC encoder 3050, a BB frame slicer 3060 and a BB header insertion block 3070. Description will be given of each block of the mode adaptation block.

Operations of the CRC encoder 3050, BB frame slicer 3060 and BB header insertion block 3070 correspond to those of the CRC encoder, BB frame slicer and BB header insertion block described with reference to FIG. 2 and thus description thereof is omitted.

The input stream splitter 3000 can split the input TS, IP, GS streams into multiple service or service component (audio, video, etc.) streams.

The input stream synchronizer 3010 may be referred as ISSY. The ISSY can provide suitable means to guarantee Constant Bit Rate (CBR) and constant end-to-end transmission delay for any input data format. The ISSY is always used for the case of multiple DPs carrying TS, and optionally used for multiple DPs carrying GS streams.

The compensating delay block 3020 can delay the split TS packet stream following the insertion of ISSY information to allow a TS packet recombining mechanism without requiring additional memory in the receiver.

The null packet deletion block 3030, is used only for the TS input stream case. Some TS input streams or split TS streams may have a large number of null-packets present in order to accommodate VBR (variable bit-rate) services in a CBR TS stream. In this case, in order to avoid unnecessary transmission overhead, null-packets can be identified and not transmitted. In the receiver, removed null-packets can be re-inserted in the exact place where they were originally by reference to a deleted null-packet (DNP) counter that is inserted in the transmission, thus guaranteeing constant bit-rate and avoiding the need for time-stamp (PCR) updating.

The head compression block 3040 can provide packet header compression to increase transmission efficiency for TS or IP input streams. Because the receiver can have a priori information on certain parts of the header, this known information can be deleted in the transmitter.

For Transport Stream, the receiver has a-priori information about the sync-byte configuration (0x47) and the packet length (188 Byte). If the input TS stream carries content that has only one PID, i.e., for only one service component (video, audio, etc.) or service sub-component (SVC base layer, SVC enhancement layer, MVC base view or MVC dependent views), TS packet header compression can be applied (optionally) to the Transport Stream. IP packet header compression is used optionally if the input steam is an IP stream.

The above-described blocks may be omitted or replaced by blocks having similar or identical functions.

FIG. 4 illustrates an input formatting block according to another embodiment of the present invention.

The input formatting block illustrated in FIG. 4 corresponds to an embodiment of the input formatting block 1000 described with reference to FIG. 1.

FIG. 4 illustrates a stream adaptation block of the input formatting module when the input signal corresponds to multiple input streams.

Referring to FIG. 4, the mode adaptation block for respectively processing the multiple input streams can include a scheduler 4000, an I-Frame delay block 4010, a stuffing insertion block 4020, an in-band signaling 4030, a BB Frame scrambler 4040, a PLS generation block 4050 and a PLS scrambler 4060. Description will be given of each block of the stream adaptation block.

Operations of the stuffing insertion block 4020, the BB Frame scrambler 4040, the PLS generation block 4050 and the PLS scrambler 4060 correspond to those of the stuffing insertion block, BB scrambler, PLS generation block and the PLS scrambler described with reference to FIG. 2 and thus description thereof is omitted.

The scheduler 4000 can determine the overall cell allocation across the entire frame from the amount of FEC-BLOCKs of each DP. Including the allocation for PLS, EAC and FIC, the scheduler generate the values of PLS2-DYN data, which is transmitted as in-band signaling or PLS cell in FSS of the frame. Details of FECBLOCK, EAC and FIC will be described later.

The 1-Frame delay block 4010 can delay the input data by one transmission frame such that scheduling information about the next frame can be transmitted through the current frame for in-band signaling information to be inserted into the DPs.

The in-band signaling 4030 can insert un-delayed part of the PLS2 data into a DP of a frame.

The above-described blocks may be omitted or replaced by blocks having similar or identical functions.

FIG. 5 illustrates a BICM block according to an embodiment of the present invention.

The BICM block illustrated in FIG. 5 corresponds to an embodiment of the BICM block 1010 described with reference to FIG. 1.

As described above, the apparatus for transmitting broadcast signals for future broadcast services according to an embodiment of the present invention can provide a terrestrial broadcast service, mobile broadcast service, UHDTV service, etc.

Since QoS (quality of service) depends on characteristics of a service provided by the apparatus for transmitting broadcast signals for future broadcast services according to an embodiment of the present invention, data corresponding to respective services needs to be processed through different schemes. Accordingly, the a BICM block according to an embodiment of the present invention can independently process DPs input thereto by independently applying SISO, MISO and MIMO schemes to the data pipes respectively corresponding to data paths. Consequently, the apparatus for transmitting broadcast signals for future broadcast services according to an embodiment of the present invention can control QoS for each service or service component transmitted through each DP.

(a) shows the BICM block shared by the base profile and the handheld profile and (b) shows the BICM block of the advanced profile.

The BICM block shared by the base profile and the handheld profile and the BICM block of the advanced profile can include plural processing blocks for processing each DP.

A description will be given of each processing block of the BICM block for the base profile and the handheld profile and the BICM block for the advanced profile.

A processing block 5000 of the BICM block for the base profile and the handheld profile can include a Data FEC encoder 5010, a bit interleaver 5020, a constellation mapper 5030, an SSD (Signal Space Diversity) encoding block 5040 and a time interleaver 5050.

The Data FEC encoder 5010 can perform the FEC encoding on the input BBF to generate FECBLOCK procedure using outer coding (BCH), and inner coding (LDPC). The outer coding (BCH) is optional coding method. Details of operations of the Data FEC encoder 5010 will be described later.

The bit interleaver 5020 can interleave outputs of the Data FEC encoder 5010 to achieve optimized performance with combination of the LDPC codes and modulation scheme while providing an efficiently implementable structure. Details of operations of the bit interleaver 5020 will be described later.

The constellation mapper 5030 can modulate each cell word from the bit interleaver 5020 in the base and the handheld profiles, or cell word from the Cell-word demultiplexer 5010-1 in the advanced profile using either QPSK, QAM-16, non-uniform QAM (NUQ-64, NUQ-256, NUQ-1024) or non-uniform constellation (NUC-16, NUC-64, NUC-256, NUC-1024) to give a power-normalized constellation point, el. This constellation mapping is applied only for DPs. Observe that QAM-16 and NUQs are square shaped, while NUCs have arbitrary shape. When each constellation is rotated by any multiple of 90 degrees, the rotated constellation exactly overlaps with its original one. This "rotation-sense" symmetric property makes the capacities and the average powers of the real and imaginary components equal to each other. Both NUQs and NUCs are defined specifically for each code rate and the particular one used is signaled by the parameter DP_MOD filed in PLS2 data.

The SSD encoding block 5040 can precode cells in two (2D), three (3D), and four (4D) dimensions to increase the reception robustness under difficult fading conditions.

The time interleaver 5050 can operates at the DP level. The parameters of time interleaving (TI) may be set differently for each DP. Details of operations of the time interleaver 5050 will be described later.

A processing block 5000-1 of the BICM block for the advanced profile can include the Data FEC encoder, bit interleaver, constellation mapper, and time interleaver. However, the processing block 5000-1 is distinguished from the processing block 5000 further includes a cell-word demultiplexer 5010-1 and a MIMO encoding block 5020-1.

Also, the operations of the Data FEC encoder, bit interleaver, constellation mapper, and time interleaver in the processing block 5000-1 correspond to those of the Data FEC encoder 5010, bit interleaver 5020, constellation mapper 5030, and time interleaver 5050 described and thus description thereof is omitted.

The cell-word demultiplexer 5010-1 is used for the DP of the advanced profile to divide the single cell-word stream into dual cell-word streams for MIMO processing. Details of operations of the cell-word demultiplexer 5010-1 will be described later.

The MIMO encoding block 5020-1 can processing the output of the cell-word demultiplexer 5010-1 using MIMO encoding scheme. The MIMO encoding scheme was optimized for broadcasting signal transmission. The MIMO technology is a promising way to get a capacity increase but it depends on channel characteristics. Especially for broadcasting, the strong LOS component of the channel or a difference in the received signal power between two antennas caused by different signal propagation characteristics makes it difficult to get capacity gain from MIMO. The proposed MIMO encoding scheme overcomes this problem using a rotation-based pre-coding and phase randomization of one of the MIMO output signals.

MIMO encoding is intended for a 2×2 MIMO system requiring at least two antennas at both the transmitter and the receiver. Two MIMO encoding modes are defined in this proposal; full-rate spatial multiplexing (FR-SM) and full-rate full-diversity spatial multiplexing (FRFD-SM). The FR-SM encoding provides capacity increase with relatively small complexity increase at the receiver side while the FRFD-SM encoding provides capacity increase and additional diversity gain with a great complexity increase at the receiver side. The proposed MIMO encoding scheme has no restriction on the antenna polarity configuration.

MIMO processing is required for the advanced profile frame, which means all DPs in the advanced profile frame are processed by the MIMO encoder. MIMO processing is applied at DP level. Pairs of the Constellation Mapper outputs NUQ (e1,i and e2,i) are fed to the input of the MIMO Encoder. Paired MIMO Encoder output (g1,i and g2,i) is transmitted by the same carrier k and OFDM symbol l of their respective TX antennas.

The above-described blocks may be omitted or replaced by blocks having similar or identical functions.

FIG. 6 illustrates a BICM block according to another embodiment of the present invention.

The BICM block illustrated in FIG. 6 corresponds to an embodiment of the BICM block 1010 described with reference to FIG. 1.

FIG. 6 illustrates a BICM block for protection of physical layer signaling (PLS), emergency alert channel (EAC) and fast information channel (FIC). EAC is a part of a frame that carries EAS information data and FIC is a logical channel in a frame that carries the mapping information between a service and the corresponding base DP. Details of the EAC and FIC will be described later.

Referring to FIG. 6, the BICM block for protection of PLS, EAC and FIC can include a PLS FEC encoder 6000, a bit interleaver 6010, a constellation mapper 6020 and time interleaver 6030.

Also, the PLS FEC encoder 6000 can include a scrambler, BCH encoding/zero insertion block, LDPC encoding block and LDPC parity puncturing block. Description will be given of each block of the BICM block.

The PLS FEC encoder 6000 can encode the scrambled PLS 1/2 data, EAC and FIC section.

The scrambler can scramble PLS1 data and PLS2 data before BCH encoding and shortened and punctured LDPC encoding.

The BCH encoding/zero insertion block can perform outer encoding on the scrambled PLS 1/2 data using the shortened BCH code for PLS protection and insert zero bits after the BCH encoding. For PLS1 data only, the output bits of the zero insertion may be permutted before LDPC encoding.

The LDPC encoding block can encode the output of the BCH encoding/zero insertion block using LDPC code. To generate a complete coded block, Cldpc, parity bits, Pldpc are encoded systematically from each zero-inserted PLS information block, Ildpc and appended after it.

$$C_{ldpc} = [I_{ldpc} P_{ldpc}] = [i_0, i_1, \ldots, i_{K_{ldpc}-1}, p_0, p_1, \ldots, p_{N_{ldpc}-K_{ldpc}-1}]$$ [Equation 1]

The LDPC code parameters for PLS1 and PLS2 are as following table 4.

TABLE 4

| Signaling Type | Ksig | Kbch | Nbch_parity | Kldpc (=Nbch) | Nldpc | Nldpc_parity | code rate | Qldpc |
|---|---|---|---|---|---|---|---|---|
| PLS1 | 342 | 1020 | 60 | 1080 | 4320 | 3240 | 1/4 | 36 |
| PLS2 | <1021 >1020 | 2100 | | 2160 | 7200 | 5040 | 3/10 | 56 |

The LDPC parity puncturing block can perform puncturing on the PLS1 data and PLS 2 data.

When shortening is applied to the PLS1 data protection, some LDPC parity bits are punctured after LDPC encoding. Also, for the PLS2 data protection, the LDPC parity bits of PLS2 are punctured after LDPC encoding. These punctured bits are not transmitted.

The bit interleaver 6010 can interleave the each shortened and punctured PLS1 data and PLS2 data.

The constellation mapper 6020 can map the bit ineterlaeved PLS1 data and PLS2 data onto constellations.

The time interleaver 6030 can interleave the mapped PLS1 data and PLS2 data.

The above-described blocks may be omitted or replaced by blocks having similar or identical functions.

FIG. 7 illustrates a frame building block according to one embodiment of the present invention.

The frame building block illustrated in FIG. 7 corresponds to an embodiment of the frame building block 1020 described with reference to FIG. 1.

Referring to FIG. 7, the frame building block can include a delay compensation block 7000, a cell mapper 7010 and a frequency interleaver 7020. Description will be given of each block of the frame building block.

The delay compensation block 7000 can adjust the timing between the data pipes and the corresponding PLS data to ensure that they are co-timed at the transmitter end. The PLS data is delayed by the same amount as data pipes are by addressing the delays of data pipes caused by the Input Formatting block and BICM block. The delay of the BICM block is mainly due to the time interleaver 5050. In-band signaling data carries information of the next TI group so that they are carried one frame ahead of the DPs to be signaled. The Delay Compensating block delays in-band signaling data accordingly.

The cell mapper 7010 can map PLS, EAC, FIC, DPs, auxiliary streams and dummy cells into the active carriers of the OFDM symbols in the frame. The basic function of the cell mapper 7010 is to map data cells produced by the TIs for each of the DPs, PLS cells, and EAC/FIC cells, if any, into arrays of active OFDM cells corresponding to each of the OFDM symbols within a frame. Service signaling data (such as PSI (program specific information)/SI) can be separately gathered and sent by a data pipe. The Cell Mapper operates according to the dynamic information produced by the scheduler and the configuration of the frame structure. Details of the frame will be described later.

The frequency interleaver 7020 can randomly interleave data cells received from the cell mapper 7010 to provide frequency diversity. Also, the frequency interleaver 7020 can operate on very OFDM symbol pair comprised of two sequential OFDM symbols using a different interleaving-seed order to get maximum interleaving gain in a single frame. Details of operations of the frequency interleaver 7020 will be described later.

The above-described blocks may be omitted or replaced by blocks having similar or identical functions.

FIG. 8 illustrates an OFMD generation block according to an embodiment of the present invention.

The OFMD generation block illustrated in FIG. 8 corresponds to an embodiment of the OFMD generation block 1030 described with reference to FIG. 1.

The OFDM generation block modulates the OFDM carriers by the cells produced by the Frame Building block, inserts the pilots, and produces the time domain signal for transmission. Also, this block subsequently inserts guard intervals, and applies PAPR (Peak-to-Average Power Radio) reduction processing to produce the final RF signal.

Referring to FIG. 8, the frame building block can include a pilot and reserved tone insertion block 8000, a 2D-eSFN encoding block 8010, an IFFT (Inverse Fast Fourier Transform) block 8020, a PAPR reduction block 8030, a guard interval insertion block 8040, a preamble insertion block 8050, other system insertion block 8060 and a DAC block 8070. Description will be given of each block of the frame building block.

The pilot and reserved tone insertion block 8000 can insert pilots and the reserved tone.

Various cells within the OFDM symbol are modulated with reference information, known as pilots, which have transmitted values known a priori in the receiver. The information of pilot cells is made up of scattered pilots (SP), continual pilots (CP), edge pilots (EP), FSS (frame signaling symbol) pilots and FES (frame edge symbol) pilots. Each pilot is transmitted at a particular boosted power level according to pilot type and pilot pattern. The value of the pilot information is derived from a reference sequence, which is a series of values, one for each transmitted carrier on any given symbol. The pilots can be used for frame synchronization, frequency synchronization, time synchronization, channel estimation, and transmission mode identification, and also can be used to follow the phase noise.

Reference information, taken from the reference sequence, is transmitted in scattered pilot cells in every symbol except the preamble, FSS and FES of the frame. Continual pilots are inserted in every symbol of the frame. The number and location of continual pilots depends on both the FFT size and the scattered pilot pattern. The edge carriers are edge pilots in every symbol except for the preamble symbol. They are inserted in order to allow frequency interpolation up to the edge of the spectrum. FSS pilots are inserted in FSS(s) and FES pilots are inserted in FES. They are inserted in order to allow time interpolation up to the edge of the frame.

The system according to an embodiment of the present invention supports the SFN network, where distributed MISO scheme is optionally used to support very robust transmission mode. The 2D-eSFN is a distributed MISO scheme that uses multiple TX antennas, each of which is located in the different transmitter site in the SFN network.

The 2D-eSFN encoding block 8010 can process a 2D-eSFN processing to distorts the phase of the signals transmitted from multiple transmitters, in order to create both time and frequency diversity in the SFN configuration. Hence, burst errors due to low flat fading or deep-fading for a long time can be mitigated.

The IFFT block 8020 can modulate the output from the 2D-eSFN encoding block 8010 using OFDM modulation scheme. Any cell in the data symbols which has not been designated as a pilot (or as a reserved tone) carries one of the data cells from the frequency interleaver. The cells are mapped to OFDM carriers.

The PAPR reduction block 8030 can perform a PAPR reduction on input signal using various PAPR reduction algorithm in the time domain.

The guard interval insertion block 8040 can insert guard intervals and the preamble insertion block 8050 can insert preamble in front of the signal. Details of a structure of the preamble will be described later. The other system insertion block 8060 can multiplex signals of a plurality of broadcast transmission/reception systems in the time domain such that data of two or more different broadcast transmission/reception systems providing broadcast services can be simultaneously transmitted in the same RF signal bandwidth. In this case, the two or more different broadcast transmission/reception systems refer to systems providing different broadcast services. The different broadcast services may refer to a terrestrial broadcast service, mobile broadcast service, etc. Data related to respective broadcast services can be transmitted through different frames.

The DAC block 8070 can convert an input digital signal into an analog signal and output the analog signal. The signal output from the DAC block 7800 can be transmitted through multiple output antennas according to the physical layer profiles. A Tx antenna according to an embodiment of the present invention can have vertical or horizontal polarity.

The above-described blocks may be omitted or replaced by blocks having similar or identical functions according to design.

FIG. 9 illustrates a structure of an apparatus for receiving broadcast signals for future broadcast services according to an embodiment of the present invention.

The apparatus for receiving broadcast signals for future broadcast services according to an embodiment of the present invention can correspond to the apparatus for transmitting broadcast signals for future broadcast services, described with reference to FIG. 1.

The apparatus for receiving broadcast signals for future broadcast services according to an embodiment of the present invention can include a synchronization & demodulation module 9000, a frame parsing module 9010, a demapping & decoding module 9020, an output processor 9030 and a signaling decoding module 9040. A description will be given of operation of each module of the apparatus for receiving broadcast signals.

The synchronization & demodulation module 9000 can receive input signals through m Rx antennas, perform signal detection and synchronization with respect to a system corresponding to the apparatus for receiving broadcast signals and carry out demodulation corresponding to a reverse procedure of the procedure performed by the apparatus for transmitting broadcast signals.

The frame parsing module 9010 can parse input signal frames and extract data through which a service selected by a user is transmitted. If the apparatus for transmitting broadcast signals performs interleaving, the frame parsing module 9010 can carry out deinterleaving corresponding to a reverse procedure of interleaving. In this case, the positions of a signal and data that need to be extracted can be obtained by decoding data output from the signaling decoding module 9400 to restore scheduling information generated by the apparatus for transmitting broadcast signals.

The demapping & decoding module 9020 can convert the input signals into bit domain data and then deinterleave the same as necessary. The demapping & decoding module 9200 can perform demapping for mapping applied for transmission efficiency and correct an error generated on a transmission channel through decoding. In this case, the demapping & decoding module 9020 can obtain transmission parameters necessary for demapping and decoding by decoding the data output from the signaling decoding module 9040.

The output processor 9030 can perform reverse procedures of various compression/signal processing procedures which are applied by the apparatus for transmitting broadcast signals to improve transmission efficiency. In this case, the output processor 9030 can acquire necessary control information from data output from the signaling decoding module 9040. The output of the output processor 9030 corresponds to a signal input to the apparatus for transmitting broadcast signals and may be MPEG-TSs, IP streams (v4 or v6) and generic streams.

The signaling decoding module 9040 can obtain PLS information from the signal demodulated by the synchronization & demodulation module 9000. As described above, the frame parsing module 9010, demapping & decoding module 9020 and output processor 9030 can execute functions thereof using the data output from the signaling decoding module 9040.

FIG. 10 illustrates a frame structure according to an embodiment of the present invention.

FIG. 10 shows an example configuration of the frame types and FRUs in a super-frame. (a) shows a super frame according to an embodiment of the present invention, (b) shows FRU (Frame Repetition Unit) according to an embodiment of the present invention, (c) shows frames of variable PHY profiles in the FRU and (d) shows a structure of a frame.

A super-frame may be composed of eight FRUs. The FRU is a basic multiplexing unit for TDM of the frames, and is repeated eight times in a super-frame.

Each frame in the FRU belongs to one of the PHY profiles, (base, handheld, advanced) or FEF. The maximum allowed number of the frames in the FRU is four and a given PHY profile can appear any number of times from zero times to four times in the FRU (e.g., base, base, handheld, advanced). PHY profile definitions can be extended using reserved values of the PHY_PROFILE in the preamble, if required.

The FEF part is inserted at the end of the FRU, if included. When the FEF is included in the FRU, the minimum number of FEFs is 8 in a super-frame. It is not recommended that FEF parts be adjacent to each other.

One frame is further divided into a number of OFDM symbols and a preamble. As shown in (d), the frame comprises a preamble, one or more frame signaling symbols (FSS), normal data symbols and a frame edge symbol (FES).

The preamble is a special symbol that enables fast Futurecast UTB system signal detection and provides a set of basic transmission parameters for efficient transmission and reception of the signal. The detailed description of the preamble will be will be described later.

The main purpose of the FSS(s) is to carry the PLS data. For fast synchronization and channel estimation, and hence fast decoding of PLS data, the FSS has more dense pilot pattern than the normal data symbol. The FES has exactly the same pilots as the FSS, which enables frequency-only interpolation within the FES and temporal interpolation, without extrapolation, for symbols immediately preceding the FES.

FIG. 11 illustrates a signaling hierarchy structure of the frame according to an embodiment of the present invention.

FIG. 11 illustrates the signaling hierarchy structure, which is split into three main parts: the preamble signaling data 11000, the PLS1 data 11010 and the PLS2 data 11020. The purpose of the preamble, which is carried by the preamble symbol in every frame, is to indicate the transmission type and basic transmission parameters of that frame. The PLS1 enables the receiver to access and decode the PLS2 data, which contains the parameters to access the DP of interest. The PLS2 is carried in every frame and split into two main parts: PLS2-STAT data and PLS2-DYN data. The static and dynamic portion of PLS2 data is followed by padding, if necessary.

FIG. 12 illustrates preamble signaling data according to an embodiment of the present invention.

Preamble signaling data carries 21 bits of information that are needed to enable the receiver to access PLS data and trace DPs within the frame structure. Details of the preamble signaling data are as follows:

PHY_PROFILE: This 3-bit field indicates the PHY profile type of the current frame. The mapping of different PHY profile types is given in below table 5.

TABLE 5

| Value | PHY profile |
|---|---|
| 000 | Base profile |
| 001 | Handheld profile |
| 010 | Advanced profiled |
| 011~110 | Reserved |
| 111 | FEF |

FFT_SIZE: This 2 bit field indicates the FFT size of the current frame within a frame-group, as described in below table 6.

TABLE 6

| Value | FFT size |
|---|---|
| 00 | 8K FFT |
| 01 | 16K FFT |
| 10 | 32K FFT |
| 11 | Reserved |

GI_FRACTION: This 3 bit field indicates the guard interval fraction value in the current super-frame, as described in below table 7.

TABLE 7

| Value | GI_FRACTION |
|---|---|
| 000 | 1/5 |
| 001 | 1/10 |
| 010 | 1/20 |
| 011 | 1/40 |
| 100 | 1/80 |
| 101 | 1/160 |
| 110~111 | Reserved |

EAC_FLAG: This 1 bit field indicates whether the EAC is provided in the current frame. If this field is set to '1', emergency alert service (EAS) is provided in the current frame. If this field set to '0', EAS is not carried in the current frame. This field can be switched dynamically within a super-frame.

PILOT_MODE: This 1-bit field indicates whether the pilot mode is mobile mode or fixed mode for the current frame in the current frame-group. If this field is set to '0', mobile pilot mode is used. If the field is set to '1', the fixed pilot mode is used.

PAPR_FLAG: This 1-bit field indicates whether PAPR reduction is used for the current frame in the current frame-group. If this field is set to value '1', tone reservation is used for PAPR reduction. If this field is set to '0', PAPR reduction is not used.

FRU_CONFIGURE: This 3-bit field indicates the PHY profile type configurations of the frame repetition units (FRU) that are present in the current super-frame. All profile types conveyed in the current super-frame are identified in this field in all preambles in the current super-frame. The 3-bit field has a different definition for each profile, as show in below table 8.

TABLE 8

| | Current PHY_PRO-FILE = '000' (base) | Current PHY_PRO-FILE = '001' (handheld) | Current PHY_PRO-FILE = '010' (advanced) | Current PHY_PRO-FILE = '000' (FEF) |
|---|---|---|---|---|
| FRU_CON-FIGURE = 000 | Only base profile present | Only handheld profile present | Only advanced profile present | Only FEF present |
| FRU_CON-FIGURE = 1XX | Handheld profile present | Base profile present | Base profile present | Base profile present |
| FRU_CON-FIGURE = X1X | Advanced profile present | Advanced profile present | Handheld profile present | Handheld profile present |
| FRU_CON-FIGURE = XX1 | FEF present | FEF present | FEF present | Advanced profile present |

RESERVED: This 7-bit field is reserved for future use.

FIG. 13 illustrates PLS1 data according to an embodiment of the present invention.

PLS1 data provides basic transmission parameters including parameters required to enable the reception and decoding of the PLS2. As above mentioned, the PLS1 data remain unchanged for the entire duration of one frame-group. The detailed definition of the signaling fields of the PLS1 data are as follows:

PREAMBLE DATA: This 20-bit field is a copy of the preamble signaling data excluding the EAC_FLAG NUM_FRAME_FRU: This 2-bit field indicates the number of the frames per FRU.

PAYLOAD_TYPE: This 3-bit field indicates the format of the payload data carried in the frame-group. PAYLOAD_TYPE is signaled as shown in table 9.

TABLE 9

| Value | Payload type |
|---|---|
| 1XX | TS stream is transmitted |
| X1X | IP stream is transmitted |
| XX1 | GS stream is transmitted |

NUM_FSS: This 2-bit field indicates the number of FSS symbols in the current frame.

SYSTEM_VERSION: This 8-bit field indicates the version of the transmitted signal format. The SYSTEM_VERSION is divided into two 4-bit fields, which are a major version and a minor version.

Major version: The MSB four bits of SYSTEM_VERSION field indicate major version information. A change in the major version field indicates a non-backward-compatible change. The default value is '0000'. For the version described in this standard, the value is set to '0000'.

Minor version: The LSB four bits of SYSTEM_VERSION field indicate minor version information. A change in the minor version field is backward-compatible.

CELL_ID: This is a 16-bit field which uniquely identifies a geographic cell in an ATSC network. An ATSC cell coverage area may consist of one or more frequencies, depending on the number of frequencies used per Futurecast UTB system. If the value of the CELL_ID is not known or unspecified, this field is set to '0'.

NETWORK_ID: This is a 16-bit field which uniquely identifies the current ATSC network.

SYSTEM_ID: This 16-bit field uniquely identifies the Futurecast UTB system within the ATSC network. The Futurecast UTB system is the terrestrial broadcast system whose input is one or more input streams (TS, IP, GS) and whose output is an RF signal. The Futurecast UTB system carries one or more PHY profiles and FEF, if any. The same Futurecast UTB system may carry different input streams and use different RF frequencies in different geographical areas, allowing local service insertion. The frame structure and scheduling is controlled in one place and is identical for all transmissions within a Futurecast UTB system. One or more Futurecast UTB systems may have the same SYSTEM_ID meaning that they all have the same physical layer structure and configuration.

The following loop consists of FRU_PHY_PROFILE, FRU_FRAME_LENGTH, FRU_GI_FRACTION, and RESERVED which are used to indicate the FRU configuration and the length of each frame type. The loop size is fixed so that four PHY profiles (including a FEF) are signaled within the FRU. If NUM_FRAME_FRU is less than 4, the unused fields are filled with zeros.

FRU_PHY_PROFILE: This 3-bit field indicates the PHY profile type of the (i+1)th (i is the loop index) frame of the associated FRU. This field uses the same signaling format as shown in the table 8.

FRU_FRAME_LENGTH: This 2-bit field indicates the length of the (i+1)th frame of the associated FRU. Using FRU_FRAME_LENGTH together with FRU_GI_FRACTION, the exact value of the frame duration can be obtained.

FRU_GI_FRACTION: This 3-bit field indicates the guard interval fraction value of the (i+1)th frame of the associated FRU. FRU_GI_FRACTION is signaled according to the table 7.

RESERVED: This 4-bit field is reserved for future use.

The following fields provide parameters for decoding the PLS2 data.

PLS2_FEC_TYPE: This 2-bit field indicates the FEC type used by the PLS2 protection. The FEC type is signaled according to table 10. The details of the LDPC codes will be described later.

TABLE 10

| Contents | PLS2 FEC type |
| --- | --- |
| 00 | 4K-1/4 and 7K-3/10 LDPC codes |
| 01~11 | Reserved |

PLS2_MOD: This 3-bit field indicates the modulation type used by the PLS2. The modulation type is signaled according to table 11.

TABLE 11

| Value | PLS2_MODE |
| --- | --- |
| 000 | BPSK |
| 001 | QPSK |
| 010 | QAM-16 |
| 011 | NUQ-64 |
| 100~111 | Reserved |

PLS2_SIZE_CELL: This 15-bit field indicates Ctotal_partial block, the size (specified as the number of QAM cells) of the collection of full coded blocks for PLS2 that is carried in the current frame-group. This value is constant during the entire duration of the current frame-group.

PLS2_STAT_SIZE_BIT: This 14-bit field indicates the size, in bits, of the PLS2-STAT for the current frame-group. This value is constant during the entire duration of the current frame-group.

PLS2_DYN_SIZE_BIT: This 14-bit field indicates the size, in bits, of the PLS2-DYN for the current frame-group. This value is constant during the entire duration of the current frame-group.

PLS2_REP_FLAG: This 1-bit flag indicates whether the PLS2 repetition mode is used in the current frame-group. When this field is set to value '1', the PLS2 repetition mode is activated. When this field is set to value '0', the PLS2 repetition mode is deactivated.

PLS2_REP_SIZE_CELL: This 15-bit field indicates Ctotal_partial block, the size (specified as the number of QAM cells) of the collection of partial coded blocks for PLS2 carried in every frame of the current frame-group, when PLS2 repetition is used. If repetition is not used, the value of this field is equal to 0. This value is constant during the entire duration of the current frame-group.

PLS2_NEXT_FEC_TYPE: This 2-bit field indicates the FEC type used for PLS2 that is carried in every frame of the next frame-group. The FEC type is signaled according to the table 10.

PLS2_NEXT_MOD: This 3-bit field indicates the modulation type used for PLS2 that is carried in every frame of the next frame-group. The modulation type is signaled according to the table 11.

PLS2_NEXT_REP_FLAG: This 1-bit flag indicates whether the PLS2 repetition mode is used in the next frame-group. When this field is set to value '1', the PLS2 repetition mode is activated. When this field is set to value '0', the PLS2 repetition mode is deactivated.

PLS2_NEXT_REP_SIZE_CELL: This 15-bit field indicates Ctotal_full_block, The size (specified as the number of QAM cells) of the collection of full coded blocks for PLS2 that is carried in every frame of the next frame-group, when PLS2 repetition is used. If repetition is not used in the next frame-group, the value of this field is equal to 0. This value is constant during the entire duration of the current frame-group.

PLS2_NEXT_REP_STAT_SIZE_BIT: This 14-bit field indicates the size, in bits, of the PLS2-STAT for the next frame-group. This value is constant in the current frame-group.

PLS2_NEXT_REP_DYN_SIZE_BIT: This 14-bit field indicates the size, in bits, of the PLS2-DYN for the next frame-group. This value is constant in the current frame-group.

PLS2_AP_MODE: This 2-bit field indicates whether additional parity is provided for PLS2 in the current frame-group. This value is constant during the entire duration of the current frame-group. The below table 12 gives the values of this field. When this field is set to '00', additional parity is not used for the PLS2 in the current frame-group.

TABLE 12

| Value | PLS2-AP mode |
| --- | --- |
| 00 | AP is not provided |
| 01 | AP1 mode |
| 10~11 | Reserved |

PLS2_AP_SIZE_CELL: This 15-bit field indicates the size (specified as the number of QAM cells) of the additional parity bits of the PLS2. This value is constant during the entire duration of the current frame-group.

PLS2_NEXT_AP_MODE: This 2-bit field indicates whether additional parity is provided for PLS2 signaling in every frame of next frame-group. This value is constant during the entire duration of the current frame-group. The table 12 defines the values of this field PLS2_NEXT_AP_SIZE_CELL: This 15-bit field indicates the size (specified as the number of QAM cells) of the additional parity bits of the PLS2 in every frame of the next frame-group. This value is constant during the entire duration of the current frame-group.

RESERVED: This 32-bit field is reserved for future use.

CRC_32: A 32-bit error detection code, which is applied to the entire PLS1 signaling.

FIG. 14 illustrates PLS2 data according to an embodiment of the present invention.

FIG. 14 illustrates PLS2-STAT data of the PLS2 data. The PLS2-STAT data are the same within a frame-group, while the PLS2-DYN data provide information that is specific for the current frame.

The details of fields of the PLS2-STAT data are as follows:

FIC_FLAG: This 1-bit field indicates whether the FIC is used in the current frame-group. If this field is set to '1', the FIC is provided in the current frame. If this field set to '0', the FIC is not carried in the current frame. This value is constant during the entire duration of the current frame-group.

AUX_FLAG: This 1-bit field indicates whether the auxiliary stream(s) is used in the current frame-group. If this field is set to '1', the auxiliary stream is provided in the current frame. If this field set to '0', the auxiliary stream is not carried in the current frame. This value is constant during the entire duration of current frame-group.

NUM_DP: This 6-bit field indicates the number of DPs carried within the current frame. The value of this field ranges from 1 to 64, and the number of DPs is NUM_DP+1.

DP_ID: This 6-bit field identifies uniquely a DP within a PHY profile.

DP_TYPE: This 3-bit field indicates the type of the DP. This is signaled according to the below table 13.

TABLE 13

| Value | DP Type |
| --- | --- |
| 000 | DP Type 1 |
| 001 | DP Type 2 |
| 010~111 | reserved |

DP_GROUP_ID: This 8-bit field identifies the DP group with which the current DP is associated. This can be used by a receiver to access the DPs of the service components associated with a particular service, which will have the same DP_GROUP_ID.

BASE_DP_ID: This 6-bit field indicates the DP carrying service signaling data (such as PSI/SI) used in the Management layer. The DP indicated by BASE_DP_ID may be either a normal DP carrying the service signaling data along with the service data or a dedicated DP carrying only the service signaling data.

DP_FEC_TYPE: This 2-bit field indicates the FEC type used by the associated DP. The FEC type is signaled according to the below table 14.

TABLE 14

| Value | FEC_TYPE |
| --- | --- |
| 00 | 16K LDPC |
| 01 | 64K LDPC |
| 10~11 | Reserved |

DP_COD: This 4-bit field indicates the code rate used by the associated DP. The code rate is signaled according to the below table 15.

TABLE 15

| Value | Code rate |
| --- | --- |
| 0000 | 5/15 |
| 0001 | 6/15 |
| 0010 | 7/15 |
| 0011 | 8/15 |
| 0100 | 9/15 |
| 0101 | 10/15 |
| 0110 | 11/15 |
| 0111 | 12/15 |
| 1000 | 13/15 |
| 1001~1111 | Reserved |

DP_MOD: This 4-bit field indicates the modulation used by the associated DP. The modulation is signaled according to the below table 16.

TABLE 16

| Value | Modulation |
| --- | --- |
| 0000 | QPSK |
| 0001 | QAM-16 |
| 0010 | NUQ-64 |
| 0011 | NUQ-256 |
| 0100 | NUQ-1024 |
| 0101 | NUC-16 |
| 0110 | NUC-64 |
| 0111 | NUC-256 |
| 1000 | NUC-1024 |
| 1001~1111 | reserved |

DP_SSD_FLAG: This 1-bit field indicates whether the SSD mode is used in the associated DP. If this field is set to value '1', SSD is used. If this field is set to value '0', SSD is not used.

The following field appears only if PHY_PROFILE is equal to '010', which indicates the advanced profile:

DP_MIMO: This 3-bit field indicates which type of MIMO encoding process is applied to the associated DP. The type of MIMO encoding process is signaled according to the table 17.

TABLE 17

| Value | MIMO encoding |
| --- | --- |
| 000 | FR-SM |
| 001 | FRFD-SM |
| 010~111 | reserved |

DP_TI_TYPE: This 1-bit field indicates the type of time-interleaving. A value of '0' indicates that one TI group corresponds to one frame and contains one or more TI-blocks. A value of '1' indicates that one TI group is carried in more than one frame and contains only one TI-block.

DP_TI_LENGTH: The use of this 2-bit field (the allowed values are only 1, 2, 4, 8) is determined by the values set within the DP_TI_TYPE field as follows:

If the DP_TI_TYPE is set to the value '1', this field indicates PI, the number of the frames to which each TI group is mapped, and there is one TI-block per TI group (NTI=1). The allowed PI values with 2-bit field are defined in the below table 18.

If the DP_TI_TYPE is set to the value '0', this field indicates the number of TI-blocks NTI per TI group, and there is one TI group per frame (Pi=1). The allowed PI values with 2-bit field are defined in the below table 18.

TABLE 18

| 2-bit field | PI | NTT |
|---|---|---|
| 00 | 1 | 1 |
| 01 | 2 | 2 |
| 10 | 4 | 3 |
| 11 | 8 | 4 |

DP_FRAME_INTERVAL: This 2-bit field indicates the frame interval (IJUMP) within the frame-group for the associated DP and the allowed values are 1, 2, 4, 8 (the corresponding 2-bit field is '00', '01', '10', or '11', respectively). For DPs that do not appear every frame of the frame-group, the value of this field is equal to the interval between successive frames. For example, if a DP appears on the frames 1, 5, 9, 13, etc., this field is set to '4'. For DPs that appear in every frame, this field is set to '1'.

DP_TI_BYPASS: This 1-bit field determines the availability of time interleaver 5050. If time interleaving is not used for a DP, it is set to '1'. Whereas if time interleaving is used it is set to '0'.

DP_FIRST_FRAME_IDX: This 5-bit field indicates the index of the first frame of the super-frame in which the current DP occurs. The value of DP_FIRST_FRAME_IDX ranges from 0 to 31.

DP_NUM_BLOCK_MAX: This 10-bit field indicates the maximum value of DP_NUM_BLOCKS for this DP. The value of this field has the same range as DP_NUM_BLOCKS.

DP_PAYLOAD_TYPE: This 2-bit field indicates the type of the payload data carried by the given DP. DP_PAYLOAD_TYPE is signaled according to the below table 19.

TABLE 19

| Value | Payload Type |
|---|---|
| 00 | TS. |
| 01 | IP |
| 10 | GS |
| 11 | reserved |

DP_INBAND_MODE: This 2-bit field indicates whether the current DP carries in-band signaling information. The in-band signaling type is signaled according to the below table 20.

TABLE 20

| Value | In-band mode |
|---|---|
| 00 | In-band signaling is not carried. |
| 01 | INBAND-PLS is carried only |
| 10 | INBAND-ISSY is carried only |
| 11 | INBAND-PLS and INBAND-ISSY are carried |

DP_PROTOCOL_TYPE: This 2-bit field indicates the protocol type of the payload carried by the given DP. It is signaled according to the below table 21 when input payload types are selected.

TABLE 21

| Value | If DP_PAYLOAD_TYPE Is TS | If DP_PAYLOAD_TYPE Is IP | If DP_PAYLOAD_TYPE Is GS |
|---|---|---|---|
| 00 | MPEG2-TS | IPv4 | (Note) |
| 01 | Reserved | IPv6 | Reserved |
| 10 | Reserved | Reserved | Reserved |
| 11 | Reserved | Reserved | Reserved |

DP_CRC_MODE: This 2-bit field indicates whether CRC encoding is used in the Input Formatting block. The CRC mode is signaled according to the below table 22.

TABLE 22

| Value | CRC mode |
|---|---|
| 00 | Not used |
| 01 | CRC-8 |
| 10 | CRC-16 |
| 11 | CRC-32 |

DNP_MODE: This 2-bit field indicates the null-packet deletion mode used by the associated DP when DP_PAYLOAD_TYPE is set to TS ('00'). DNP_MODE is signaled according to the below table 23. If DP_PAYLOAD_TYPE is not TS ('00'), DNP_MODE is set to the value '00'.

TABLE 23

| Value | Null-packet deletion mode |
|---|---|
| 00 | Not used |
| 01 | DNP-NORMAL |
| 10 | DNP-OFFSET |
| 11 | reserved |

ISSY_MODE: This 2-bit field indicates the ISSY mode used by the associated DP when DP_PAYLOAD_TYPE is set to TS ('00'). The ISSY_MODE is signaled according to the below table 24 If DP_PAYLOAD_TYPE is not TS ('00'), ISSY_MODE is set to the value '00'.

TABLE 24

| Value | ISSY mode |
|---|---|
| 00 | Not used |
| 01 | ISSY-UP |
| 10 | ISSY-BBF |
| 11 | reserved |

HC_MODE_TS: This 2-bit field indicates the TS header compression mode used by the associated DP when DP_PAYLOAD_TYPE is set to TS ('00'). The HC_MODE_TS is signaled according to the below table 25.

TABLE 25

| Value | Header compression mode |
|---|---|
| 00 | HC_MODE_TS 1 |
| 01 | HC_MODE_TS 2 |
| 10 | HC_MODE_TS 3 |
| 11 | HC_MODE_TS 4 |

HC_MODE_IP: This 2-bit field indicates the IP header compression mode when DP_PAYLOAD_TYPE is set to IP ('01'). The HC_MODE_IP is signaled according to the below table 26.

TABLE 26

| Value | Header compression mode |
|---|---|
| 00 | No compression |
| 01 | HC_MODE_IP 1 |
| 10~11 | reserved |

PID: This 13-bit field indicates the PID number for TS header compression when DP_PAYLOAD_TYPE is set to TS ('00') and HC_MODE_TS is set to '01' or '10'.

RESERVED: This 8-bit field is reserved for future use.

The following field appears only if FIC_FLAG is equal to '1':

FIC_VERSION: This 8-bit field indicates the version number of the FIC.

FIC_LENGTH_BYTE: This 13-bit field indicates the length, in bytes, of the FIC.

RESERVED: This 8-bit field is reserved for future use.

The following field appears only if AUX_FLAG is equal to '1':

NUM_AUX: This 4-bit field indicates the number of auxiliary streams. Zero means no auxiliary streams are used.

AUX_CONFIG_RFU: This 8-bit field is reserved for future use.

AUX_STREAM_TYPE: This 4-bit is reserved for future use for indicating the type of the current auxiliary stream.

AUX_PRIVATE_CONFIG: This 28-bit field is reserved for future use for signaling auxiliary streams.

FIG. 15 illustrates PLS2 data according to another embodiment of the present invention.

FIG. 15 illustrates PLS2-DYN data of the PLS2 data. The values of the PLS2-DYN data may change during the duration of one frame-group, while the size of fields remains constant.

The details of fields of the PLS2-DYN data are as follows:

FRAME_INDEX: This 5-bit field indicates the frame index of the current frame within the super-frame. The index of the first frame of the super-frame is set to '0'.

PLS_CHANGE_COUNTER: This 4-bit field indicates the number of super-frames ahead where the configuration will change. The next super-frame with changes in the configuration is indicated by the value signaled within this field. If this field is set to the value '0000', it means that no scheduled change is foreseen: e.g., value '1' indicates that there is a change in the next super-frame.

FIC_CHANGE_COUNTER: This 4-bit field indicates the number of super-frames ahead where the configuration (i.e., the contents of the FIC) will change. The next super-frame with changes in the configuration is indicated by the value signaled within this field. If this field is set to the value '0000', it means that no scheduled change is foreseen: e.g. value '0001' indicates that there is a change in the next super-frame.

RESERVED: This 16-bit field is reserved for future use.

The following fields appear in the loop over NUM_DP, which describe the parameters associated with the DP carried in the current frame.

DP_ID: This 6-bit field indicates uniquely the DP within a PHY profile.

DP_START: This 15-bit (or 13-bit) field indicates the start position of the first of the DPs using the DPU addressing scheme. The DP_START field has differing length according to the PHY profile and FFT size as shown in the below table 27.

TABLE 27

| | DP_START field size | |
|---|---|---|
| PHY profile | 64K | 16K |
| Base | 13 bits | 15 bits |
| Handheld | — | 13 bits |
| Advanced | 13 bits | 15 bits |

DP_NUM_BLOCK: This 10-bit field indicates the number of FEC blocks in the current TI group for the current DP. The value of DP_NUM_BLOCK ranges from 0 to 1023.

RESERVED: This 8-bit field is reserved for future use.

The following fields indicate the FIC parameters associated with the EAC.

EAC_FLAG: This 1-bit field indicates the existence of the EAC in the current frame. This bit is the same value as the EAC_FLAG in the preamble.

EAS_WAKE_UP_VERSION_NUM: This 8-bit field indicates the version number of a wake-up indication.

If the EAC_FLAG field is equal to '1', the following 12 bits are allocated for EAC_LENGTH_BYTE field. If the EAC_FLAG field is equal to '0', the following 12 bits are allocated for EAC_COUNTER.

EAC_LENGTH_BYTE: This 12-bit field indicates the length, in byte, of the EAC.

EAC_COUNTER: This 12-bit field indicates the number of the frames before the frame where the EAC arrives.

The following field appears only if the AUX_FLAG field is equal to '1':

AUX_PRIVATE_DYN: This 48-bit field is reserved for future use for signaling auxiliary streams. The meaning of this field depends on the value of AUX_STREAM_TYPE in the configurable PLS2-STAT.

CRC_32: A 32-bit error detection code, which is applied to the entire PLS2.

FIG. 16 illustrates a logical structure of a frame according to an embodiment of the present invention.

As above mentioned, the PLS, EAC, FIC, DPs, auxiliary streams and dummy cells are mapped into the active carriers of the OFDM symbols in the frame. The PLS1 and PLS2 are first mapped into one or more FSS(s). After that, EAC cells, if any, are mapped immediately following the PLS field, followed next by FIC cells, if any. The DPs are mapped next after the PLS or EAC, FIC, if any. Type 1 DPs follows first, and Type 2 DPs next. The details of a type of the DP will be described later. In some case, DPs may carry some special data for EAS or service signaling data. The auxiliary stream or streams, if any, follow the DPs, which in turn are followed by dummy cells. Mapping them all together in the above mentioned order, i.e. PLS, EAC, FIC, DPs, auxiliary streams and dummy data cells exactly fill the cell capacity in the frame.

FIG. 17 illustrates PLS mapping according to an embodiment of the present invention.

PLS cells are mapped to the active carriers of FSS(s). Depending on the number of cells occupied by PLS, one or more symbols are designated as FSS(s), and the number of FSS(s) N FSS is signaled by NUM_FSS in PLS1. The FSS is a special symbol for carrying PLS cells. Since robustness and latency are critical issues in the PLS, the FSS(s) has higher density of pilots allowing fast synchronization and frequency-only interpolation within the FSS.

PLS cells are mapped to active carriers of the NFSS FSS(s) in a top-down manner as shown in an example in FIG. 17. The PLS 1 cells are mapped first from the first cell of the first FSS in an increasing order of the cell index. The PLS2 cells follow immediately after the last cell of the PLS1 and mapping continues downward until the last cell index of the first FSS. If the total number of required PLS cells exceeds the number of active carriers of one FSS, mapping proceeds to the next FSS and continues in exactly the same manner as the first FSS.

After PLS mapping is completed, DPs are carried next. If EAC, FIC or both are present in the current frame, they are placed between PLS and "normal" DPs.

FIG. 18 illustrates EAC mapping according to an embodiment of the present invention.

EAC is a dedicated channel for carrying EAS messages and links to the DPs for EAS. EAS support is provided but EAC itself may or may not be present in every frame. EAC, if any, is mapped immediately after the PLS2 cells. EAC is not preceded by any of the FIC, DPs, auxiliary streams or dummy cells other than the PLS cells. The procedure of mapping the EAC cells is exactly the same as that of the PLS.

The EAC cells are mapped from the next cell of the PLS2 in increasing order of the cell index as shown in the example in FIG. 18. Depending on the EAS message size, EAC cells may occupy a few symbols, as shown in FIG. 18.

EAC cells follow immediately after the last cell of the PLS2, and mapping continues downward until the last cell index of the last FSS. If the total number of required EAC cells exceeds the number of remaining active carriers of the last FSS mapping proceeds to the next symbol and continues in exactly the same manner as FSS(s). The next symbol for mapping in this case is the normal data symbol, which has more active carriers than a FSS.

After EAC mapping is completed, the FIC is carried next, if any exists. If FIC is not transmitted (as signaled in the PLS2 field), DPs follow immediately after the last cell of the EAC.

FIG. 19 illustrates FIC mapping according to an embodiment of the present invention.

(a) shows an example mapping of FIC cell without EAC and (b) shows an example mapping of FIC cell with EAC.

FIC is a dedicated channel for carrying cross-layer information to enable fast service acquisition and channel scanning. This information primarily includes channel binding information between DPs and the services of each broadcaster. For fast scan, a receiver can decode FIC and obtain information such as broadcaster ID, number of services, and BASE_DP_ID. For fast service acquisition, in addition to FIC, base DP can be decoded using BASE_DP_ID. Other than the content it carries, a base DP is encoded and mapped to a frame in exactly the same way as a normal DP. Therefore, no additional description is required for a base DP. The FIC data is generated and consumed in the Management Layer. The content of FIC data is as described in the Management Layer specification.

The FIC data is optional and the use of FIC is signaled by the FIC_FLAG parameter in the static part of the PLS2. If FIC is used, FIC_FLAG is set to '1' and the signaling field for FIC is defined in the static part of PLS2. Signaled in this field are FIC_VERSION, and FIC_LENGTH_BYTE. FIC uses the same modulation, coding and time interleaving parameters as PLS2. FIC shares the same signaling parameters such as PLS2_MOD and PLS2_FEC. FIC data, if any, is mapped immediately after PLS2 or EAC if any. FIC is not preceded by any normal DPs, auxiliary streams or dummy cells. The method of mapping FIC cells is exactly the same as that of EAC which is again the same as PLS.

Without EAC after PLS, FIC cells are mapped from the next cell of the PLS2 in an increasing order of the cell index as shown in an example in (a). Depending on the FIC data size, FIC cells may be mapped over a few symbols, as shown in (b).

FIC cells follow immediately after the last cell of the PLS2, and mapping continues downward until the last cell index of the last FSS. If the total number of required FIC cells exceeds the number of remaining active carriers of the last FSS, mapping proceeds to the next symbol and continues in exactly the same manner as FSS(s). The next symbol for mapping in this case is the normal data symbol which has more active carriers than a FSS.

If EAS messages are transmitted in the current frame, EAC precedes FIC, and FIC cells are mapped from the next cell of the EAC in an increasing order of the cell index as shown in (b).

After FIC mapping is completed, one or more DPs are mapped, followed by auxiliary streams, if any, and dummy cells.

FIG. 20 illustrates a type of DP according to an embodiment of the present invention.

shows type 1 DP and (b) shows type 2 DP.

After the preceding channels, i.e., PLS, EAC and FIC, are mapped, cells of the DPs are mapped. A DP is categorized into one of two types according to mapping method:

Type 1 DP: DP is mapped by TDM
Type 2 DP: DP is mapped by FDM

The type of DP is indicated by DP_TYPE field in the static part of PLS2. FIG. 20 illustrates the mapping orders of Type 1 DPs and Type 2 DPs. Type 1 DPs are first mapped in the increasing order of cell index, and then after reaching the last cell index, the symbol index is increased by one. Within the next symbol, the DP continues to be mapped in the increasing order of cell index starting from p=0. With a number of DPs mapped together in one frame, each of the Type 1 DPs are grouped in time, similar to TDM multiplexing of DPs.

Type 2 DPs are first mapped in the increasing order of symbol index, and then after reaching the last OFDM symbol of the frame, the cell index increases by one and the symbol index rolls back to the first available symbol and then increases from that symbol index. After mapping a number of DPs together in one frame, each of the Type 2 DPs are grouped in frequency together, similar to FDM multiplexing of DPs.

Type 1 DPs and Type 2 DPs can coexist in a frame if needed with one restriction; Type 1 DPs always precede Type 2 DPs. The total number of OFDM cells carrying Type 1 and Type 2 DPs cannot exceed the total number of OFDM cells available for transmission of DPs:

$$D_{DP1} + D_{DP2} \leq D_{DP} \qquad \text{[Equation 2]}$$

where DDP1 is the number of OFDM cells occupied by Type 1 DPs, DDP2 is the number of cells occupied by Type 2 DPs. Since PLS, EAC, FIC are all mapped in the same way as Type 1 DP, they all follow "Type 1 mapping rule". Hence, overall, Type 1 mapping always precedes Type 2 mapping.

FIG. 21 illustrates DP mapping according to an embodiment of the present invention.

shows an addressing of OFDM cells for mapping type 1 DPs and (b) shows an addressing of OFDM cells for mapping for type 2 DPs.

Addressing of OFDM cells for mapping Type 1 DPs (0, . . . , DDP1−1) is defined for the active data cells of Type 1 DPs. The addressing scheme defines the order in which the cells from the TIs for each of the Type 1 DPs are allocated to the active data cells. It is also used to signal the locations of the DPs in the dynamic part of the PLS2.

Without EAC and FIC, address 0 refers to the cell immediately following the last cell carrying PLS in the last FSS. If EAC is transmitted and FIC is not in the corresponding frame, address 0 refers to the cell immediately following the last cell carrying EAC. If FIC is transmitted in the corresponding frame, address 0 refers to the cell immediately following the last cell carrying FIC. Address 0 for Type 1 DPs can be calculated considering two different cases as shown in (a). In the example in (a), PLS, EAC and FIC are assumed to be all transmitted. Extension to the cases where either or both of EAC and FIC are omitted is straightforward. If there are remaining cells in the FSS after mapping all the cells up to FIC as shown on the left side of (a).

Addressing of OFDM cells for mapping Type 2 DPs (0, . . . , DDP2-1) is defined for the active data cells of Type 2 DPs. The addressing scheme defines the order in which the cells from the TIs for each of the Type 2 DPs are allocated to the active data cells. It is also used to signal the locations of the DPs in the dynamic part of the PLS2.

Three slightly different cases are possible as shown in (b). For the first case shown on the left side of (b), cells in the last FSS are available for Type 2 DP mapping. For the second case shown in the middle, FIC occupies cells of a normal symbol, but the number of FIC cells on that symbol is not larger than CFSS. The third case, shown on the right side in (b), is the same as the second case except that the number of FIC cells mapped on that symbol exceeds CFSS.

The extension to the case where Type 1 DP(s) precede Type 2 DP(s) is straightforward since PLS, EAC and FIC follow the same "Type 1 mapping rule" as the Type 1 DP(s).

A data pipe unit (DPU) is a basic unit for allocating data cells to a DP in a frame.

A DPU is defined as a signaling unit for locating DPs in a frame. A Cell Mapper 7010 may map the cells produced by the TIs for each of the DPs. A Time interleaver 5050 outputs a series of TI-blocks and each TI-block comprises a variable number of XFECBLOCKs which is in turn composed of a set of cells. The number of cells in an XFECBLOCK, Ncells, is dependent on the FECBLOCK size, Nldpc, and the number of transmitted bits per constellation symbol. A DPU is defined as the greatest common divisor of all possible values of the number of cells in a XFECBLOCK, Ncells, supported in a given PHY profile. The length of a DPU in cells is defined as LDPU. Since each PHY profile supports different combinations of FECBLOCK size and a different number of bits per constellation symbol, LDPU is defined on a PHY profile basis.

FIG. 22 illustrates an FEC structure according to an embodiment of the present invention.

FIG. 22 illustrates an FEC structure according to an embodiment of the present invention before bit interleaving. As above mentioned, Data FEC encoder may perform the FEC encoding on the input BBF to generate FECBLOCK procedure using outer coding (BCH), and inner coding (LDPC). The illustrated FEC structure corresponds to the FECBLOCK. Also, the FECBLOCK and the FEC structure have same value corresponding to a length of LDPC codeword.

The BCH encoding is applied to each BBF (Kbch bits), and then LDPC encoding is applied to BCH-encoded BBF (Kldpc bits=Nbch bits) as illustrated in FIG. 22.

The value of Nldpc is either 64800 bits (long FECBLOCK) or 16200 bits (short FECBLOCK).

The below table 28 and table 29 show FEC encoding parameters for a long FECBLOCK and a short FECBLOCK, respectively.

TABLE 28

| LDPC Rate | Nldpc | Kldpc | Kbch | BCH error correction capability | Nbch-Kbch |
|---|---|---|---|---|---|
| 5/15 | 64800 | 21600 | 21408 | 12 | 192 |
| 6/15 |  | 25920 | 25728 |  |  |
| 7/15 |  | 30240 | 30048 |  |  |
| 8/15 |  | 34560 | 34368 |  |  |
| 9/15 |  | 38880 | 38688 |  |  |
| 10/15 |  | 43200 | 43008 |  |  |
| 11/15 |  | 47520 | 47328 |  |  |
| 12/15 |  | 51840 | 51648 |  |  |
| 13/15 |  | 56160 | 55968 |  |  |

TABLE 29

| LDPC Rate | Nldpc | Kldpc | Kbch | BCH error correction capability | Nbch-Kbch |
|---|---|---|---|---|---|
| 5/15 | 16200 | 5400 | 5232 | 12 | 168 |
| 6/15 |  | 6480 | 6312 |  |  |
| 7/15 |  | 7560 | 7392 |  |  |
| 8/15 |  | 8640 | 8472 |  |  |
| 9/15 |  | 9720 | 9552 |  |  |
| 10/15 |  | 10800 | 10632 |  |  |
| 11/15 |  | 11880 | 11712 |  |  |
| 12/15 |  | 12960 | 12792 |  |  |
| 13/15 |  | 14040 | 13872 |  |  |

The details of operations of the BCH encoding and LDPC encoding are as follows:

A 12-error correcting BCH code is used for outer encoding of the BBF. The BCH generator polynomial for short FECBLOCK and long FECBLOCK are obtained by multiplying together all polynomials.

LDPC code is used to encode the output of the outer BCH encoding. To generate a completed Bldpc (FECBLOCK), Pldpc (parity bits) is encoded systematically from each Ildpc (BCH-encoded BBF), and appended to Ildpc. The completed Bldpc (FECBLOCK) are expressed as follow Equation.

$$B_{ldpc} = [I_{ldpc} P_{ldpc}] = [i_0, i_1, \ldots, i_{K_{ldpc}-1}, p_0, p_1, \ldots, p_{N_{ldpc}-K_{ldpc}-1}] \quad \text{[Equation 3]}$$

The parameters for long FECBLOCK and short FECBLOCK are given in the above table 28 and 29, respectively.

The detailed procedure to calculate Nldpc Kldpc parity bits for long FECBLOCK, is as follows:

1) Initialize the parity bits, $$p_0 = p_1 = p_2 = \ldots = p_{N_{ldpc}-K_{ldpc}-1} = 0 \quad \text{[Equation 4]}$$

2) Accumulate the first information bit—i0, at parity bit addresses specified in the first row of an addresses of parity check matrix. The details of addresses of parity check matrix will be described later. For example, for rate 13/15:

$$p_{983} = p_{983} \oplus i_0 \quad \text{[Equation 5]}$$
$$p_{2815} = p_{2815} \oplus i_0$$
$$p_{4837} = p_{4837} \oplus i_0$$
$$p_{4989} = p_{4989} \oplus i_0$$
$$p_{6138} = p_{6138} \oplus i_0$$
$$p_{6458} = p_{6458} \oplus i_0$$
$$p_{6921} = p_{6921} \oplus i_0$$

-continued $$p_{6974} = p_{6974} \oplus i_0$$

$$p_{7572} = p_{7572} \oplus i_0$$

$$p_{8260} = p_{8260} \oplus i_0$$

$$p_{8496} = p_{8496} \oplus i_0$$

3) For the next 359 information bits, is, s=1, 2, ..., 359 accumulate is at parity bit addresses using following Equation.

$$\{x+(s \bmod 360) \times Q_{ldpc}\} \bmod (N_{ldpc}-K_{ldpc}) \qquad \text{[Equation 6]}$$

where x denotes the address of the parity bit accumulator corresponding to the first bit i0, and Qldpc is a code rate dependent constant specified in the addresses of parity check matrix. Continuing with the example, Qldpc=24 for rate 13/15, so for information bit i1, the following operations are performed:

$$p_{1007} = p_{1007} \oplus i_1 \qquad \text{[Equation 7]}$$

$$p_{2839} = p_{2839} \oplus i_1$$

$$p_{4861} = p_{4861} \oplus i_1$$

$$p_{5013} = p_{5013} \oplus i_1$$

$$p_{6162} = p_{6162} \oplus i_1$$

$$p_{6482} = p_{6482} \oplus i_1$$

$$p_{6945} = p_{6945} \oplus i_1$$

$$p_{6998} = p_{6998} \oplus i_1$$

$$p_{7596} = p_{7596} \oplus i_1$$

$$p_{8284} = p_{8284} \oplus i_1$$

$$p_{8520} = p_{8520} \oplus i_1$$

4) For the 361st information bit i360, the addresses of the parity bit accumulators are given in the second row of the addresses of parity check matrix. In a similar manner the addresses of the parity bit accumulators for the following 359 information bits is, s=361, 362, ..., 719 are obtained using the Equation 6, where x denotes the address of the parity bit accumulator corresponding to the information bit i360, i.e., the entries in the second row of the addresses of parity check matrix.

5) In a similar manner, for every group of 360 new information bits, a new row from addresses of parity check matrixes used to find the addresses of the parity bit accumulators.

After all of the information bits are exhausted, the final parity bits are obtained as follows:

6) Sequentially perform the following operations starting with i=1.

$$p_i = p_i \oplus p_{i-1}, i=1,2,\ldots,N_{ldpc}-K_{ldpc}-1 \qquad \text{[Equation 8]}$$

where final content of pi, i=0, 1, ... Nldpc−Kldpc−1 is equal to the parity bit pi.

TABLE 30

| Code Rate | Qldpc |
|---|---|
| 5/15 | 120 |
| 6/15 | 108 |

TABLE 30-continued

| Code Rate | Qldpc |
|---|---|
| 7/15 | 96 |
| 8/15 | 84 |
| 9/15 | 72 |
| 10/15 | 60 |
| 11/15 | 48 |
| 12/15 | 36 |
| 13/15 | 24 |

This LDPC encoding procedure for a short FECBLOCK is in accordance with t LDPC encoding procedure for the long FECBLOCK, except replacing the table 30 with table 31, and replacing the addresses of parity check matrix for the long FECBLOCK with the addresses of parity check matrix for the short FECBLOCK.

TABLE 31

| Code Rate | Qldpc |
|---|---|
| 5/15 | 30 |
| 6/15 | 27 |
| 7/15 | 24 |
| 8/15 | 21 |
| 9/15 | 18 |
| 10/15 | 15 |
| 11/15 | 12 |
| 12/15 | 9 |
| 13/15 | 6 |

FIG. 23 illustrates a bit interleaving according to an embodiment of the present invention.

The outputs of the LDPC encoder are bit-interleaved, which consists of parity interleaving followed by Quasi-Cyclic Block (QCB) interleaving and inner-group interleaving.

shows Quasi-Cyclic Block (QCB) interleaving and (b) shows inner-group interleaving.

The FECBLOCK may be parity interleaved. At the output of the parity interleaving, the LDPC codeword consists of 180 adjacent QC blocks in a long FECBLOCK and 45 adjacent QC blocks in a short FECBLOCK. Each QC block in either a long or short FECBLOCK consists of 360 bits. The parity interleaved LDPC codeword is interleaved by QCB interleaving. The unit of QCB interleaving is a QC block. The QC blocks at the output of parity interleaving are permutated by QCB interleaving as illustrated in FIG. 23, where Ncells=64800/η mod or 16200/η mod according to the FECBLOCK length. The QCB interleaving pattern is unique to each combination of modulation type and LDPC code rate.

After QCB interleaving, inner-group interleaving is performed according to modulation type and order (η mod) which is defined in the below table 32. The number of QC blocks for one inner-group, NQCB_IG, is also defined.

TABLE 32

| Modulation type | ηmod | NQCB_IG |
|---|---|---|
| QAM-16 | 4 | 2 |
| NUC-16 | 4 | 4 |
| NUQ-64 | 6 | 3 |
| NUC-64 | 6 | 6 |
| NUQ-256 | 8 | 4 |
| NUC-256 | 8 | 8 |
| NUQ-1024 | 10 | 5 |
| NUC-1024 | 10 | 10 |

The inner-group interleaving process is performed with NQCB_IG QC blocks of the QCB interleaving output. Inner-group interleaving has a process of writing and reading the bits of the inner-group using 360 columns and NQCB_IG rows. In the write operation, the bits from the QCB interleaving output are written row-wise. The read operation is performed column-wise to read out m bits from each row, where m is equal to 1 for NUC and 2 for NUQ.

FIG. 24 illustrates a cell-word demultiplexing according to an embodiment of the present invention.

shows a cell-word demultiplexing for 8 and 12 bpcu MIMO and (b) shows a cell-word demultiplexing for 10 bpcu MIMO.

Each cell word (c0,1, c1,1, . . . , cη mod−1,1) of the bit interleaving output is demultiplexed into (d1,0,m, d1,1,m . . . , d1,η mod−1,m) and (d2,0,m, d2,1,m . . . , d2,η mod−1,m) as shown in (a), which describes the cell-word demultiplexing process for one XFECBLOCK.

For the 10 bpcu MIMO case using different types of NUQ for MIMO encoding, the Bit Interleaver for NUQ-1024 is re-used. Each cell word (c0,1, c1,1, . . . , c9,1) of the Bit Interleaver output is demultiplexed into (d1,0,m, d1,1,m . . . , d1,3,m) and (d2,0,m, d2,1,m . . . , d2,5,m), as shown in (b).

FIG. 25 illustrates a time interleaving according to an embodiment of the present invention.

(a) to (c) show examples of TI mode.

The time interleaver operates at the DP level. The parameters of time interleaving (TI) may be set differently for each DP.

The following parameters, which appear in part of the PLS2-STAT data, configure the TI:

DP_TI_TYPE (allowed values: 0 or 1): Represents the TI mode; '0' indicates the mode with multiple TI blocks (more than one TI block) per TI group. In this case, one TI group is directly mapped to one frame (no inter-frame interleaving). '1' indicates the mode with only one TI block per TI group. In this case, the TI block may be spread over more than one frame (inter-frame interleaving).

DP_TI_LENGTH: If DP_TI_TYPE='0', this parameter is the number of TI blocks NTI per TI group. For DP_TI_TYPE='1', this parameter is the number of frames PI spread from one TI group.

DP_NUM_BLOCK_MAX (allowed values: 0 to 1023): Represents the maximum number of XFECBLOCKs per TI group.

DP_FRAME_INTERVAL (allowed values: 1, 2, 4, 8): Represents the number of the frames IJUMP between two successive frames carrying the same DP of a given PHY profile.

DP_TI_BYPASS (allowed values: 0 or 1): If time interleaving is not used for a DP, this parameter is set to '1'. It is set to '0' if time interleaving is used.

Additionally, the parameter DP_NUM_BLOCK from the PLS2-DYN data is used to represent the number of XFECBLOCKs carried by one TI group of the DP.

When time interleaving is not used for a DP, the following TI group, time interleaving operation, and TI mode are not considered. However, the Delay Compensation block for the dynamic configuration information from the scheduler will still be required. In each DP, the XFECBLOCKs received from the SSD/MIMO encoding are grouped into TI groups. That is, each TI group is a set of an integer number of XFECBLOCKs and will contain a dynamically variable number of XFECBLOCKs. The number of XFECBLOCKs in the TI group of index n is denoted by NxBLOCK_Group(n) and is signaled as DP_NUM_BLOCK in the PLS2-DYN data. Note that NxBLOCK_Group(n) may vary from the minimum value of 0 to the maximum value NxBLOCK_Group_MAX (corresponding to DP_NUM_BLOCK_MAX) of which the largest value is 1023.

Each TI group is either mapped directly onto one frame or spread over PI frames. Each TI group is also divided into more than one TI blocks (NTI), where each TI block corresponds to one usage of time interleaver memory. The TI blocks within the TI group may contain slightly different numbers of XFECBLOCKs. If the TI group is divided into multiple TI blocks, it is directly mapped to only one frame. There are three options for time interleaving (except the extra option of skipping the time interleaving) as shown in the below table 33.

TABLE 33

| Mode | Description |
| --- | --- |
| Option-1 | Each TI group contains one TI block and is mapped directly to one frame as shown in (a). This option is signaled in the PLS2-STAT by DP_TI_TYPE = '0' and DP_TI_LENGTH = '1'($N_{TI}$ = 1). |
| Option-2 | Each TI group contains one TI block and is mapped to more than one frame. (b) shows an example, where one TI group is mapped to two frames, i.e., DP_TI_LENGTH = '2' ($P_I$ = 2) and DP_FRAME_INTERVAL ($I_{JUMP}$ = 2). This provides greater time diversity for low data-rate services. This option is signaled in the PLS2-STAT by DP_TI_TYPE = '1'. |
| Option-3 | Each TI group is divided into multiple TI blocks and is mapped directly to one frame as shown in (c). Each TI block may use full TI memory, so as to provide the maximum bit-rate for a DP. This option is signaled in the PLS2-STAT signaling by DP_TI_TYPE = '0' and DP_TI_LENGTH = NTI, while $P_I$ = 1. |

In each DP, the TI memory stores the input XFECBLOCKs (output XFECBLOCKs from the SSD/MIMO encoding block). Assume that input XFECBLOCKs are defined as $$(d_{n,s,0,0}, d_{n,s,0,1}, \ldots, d_{n,s,0,N_{cells}-1}, d_{n,s,1,0}, \ldots,$$
$$d_{n,s,N_{xBLOCK\_TI}(n,s)-1,0}, \ldots, d_{n,s,N_{xBLOCK\_TI}(n,s)-1,N_{cells}-1}),$$

where $d_{n,s,r,q}$ is the qth cell of the rth XFECBLOCK in the sth TI block of the nth TI group and represents the outputs of SSD and MIMO encodings as follows $$d_{n,s,r,q} = \begin{cases} f_{n,s,r,q}, & \text{the output of } SSD \ldots \text{encoding} \\ g_{n,s,r,q}, & \text{the output of } MIMO \text{ encoding} \end{cases}.$$

In addition, assume that output XFECBLOCKs from the time interleaver 5050 are defined as $$(h_{n,s,0}, h_{n,s,0}, \ldots, h_{n,s,i}, \ldots, h_{n,s,N_{xBLOCK\_TI}(n,s) \times N_{cells}-1}),$$

where $h_{n,s,i}$ is the ith output cell (for i=0, . . . , $N_{xBLOCK\_TI}$(n,s)×$N_{cells}$−1) in the sth TI block of the nth TI group.

Typically, the time interleaver will also act as a buffer for DP data prior to the process of frame building. This is achieved by means of two memory banks for each DP. The first TI-block is written to the first bank. The second TI-block is written to the second bank while the first bank is being read from and so on.

The TI is a twisted row-column block interleaver. For the sth TI block of the nth TI group, the number of rows $N_r$ of a TI memory is equal to the number of cells $N_{cells}$, i.e., $N_r = N_{cells}$ while the number of columns $N_c$ is equal to the number $N_{xBLOCK\_TI}(n, s)$.

FIG. 26 illustrates a basic operation of a twisted row-column block interleaver according to an exemplary embodiment of the present invention.

FIG. 26A illustrates a writing operation in a time interleaver and FIG. 26B illustrates a reading operation in the time interleaver. As illustrated in FIG. 26A, a first XFEC-BLOCK is written in a first column of a time interleaving memory in a column direction and a second XFECBLOCK is written in a next column, and such an operation is continued. In addition, in an interleaving array, a cell is read in a diagonal direction. As illustrated in FIG. 26B, while the diagonal reading is in progress from a first row (to a right side along the row starting from a leftmost column) to a last row, $N_r$ cells are read. In detail, when it is assumed that $z_{n,s,i}$ (i=0, ..., $N_r N_c$) is a time interleaving memory cell position to be sequentially read, the reading operation in the interleaving array is executed by calculating a row index $R_{n,s,i}$, a column index $C_{n,s,i}$, and associated twist parameter $T_{n,s,i}$ as shown in an equation given below.

$$\text{GENERATE}(R_{n,s,i}, C_{n,s,i}) = \qquad \text{[Equation 9]}$$
$$\{$$
$$R_{n,s,i} = \mod(i, N_r),$$
$$T_{n,s,i} = \mod(S_{shift} \times R_{n,s,i}, N_c),$$
$$C_{n,s,i} = \mod\left(T_{n,s,i} + \left\lfloor \frac{i}{N_r} \right\rfloor, N_c\right)$$
$$\}$$

Where, $S_{shift}$ is a common shift value for a diagonal reading process regardless of $N_{xBLOCK\_TI}(n,s)$ and the shift value is decided by $N_{xBLOCK\_TI\_MAX}$ given in PLS2-STAT as shown in an equation given below.

$$\text{for} \begin{cases} N'_{xBLOCK\_TI\_MAX} = \\ N_{xBLOCK\_TI\_MAX} + 1, & \text{if } N_{xBLOCK\_TI\_MAX} \bmod 2 = 0 \\ N'_{xBLOCK\_TI\_MAX} = \\ N_{xBLOCK\_TI\_MAX}, & \text{if } N_{xBLOCK\_TI\_MAX} \bmod 2 = 1 \end{cases}, \quad \text{[Equation 10]}$$

$$S_{shift} = \frac{N'_{xBLOCK\_TI\_MAX} - 1}{2}$$

Consequently, the cell position to be read is calculated by a coordinate $z_{n,s,i} = N_r C_{n,s,i} + R_{n,s,i}$.

FIG. 27 illustrates an operation of a twisted row-column block interleaver according to another exemplary embodiment of the present invention.

In more detail, FIG. 27 illustrates an interleaving array in the time interleaving memory for respective time interleaving groups including a virtual XFECBLOCK when $N_{xBLOCK\_TI}(0,0)=3$, $N_{xBLOCK\_TI}(1,0)=6$, and $N_{xBLOCK\_TI}(2,0)=5$.

A variable $N_{xBLOCK\_TI}(n,s)=N_r$ will be equal to or smaller than $N_{xBLOCK\_TI\_MAX}$. Accordingly, in order for a receiver to achieve single memory interleaving regardless of $N_{xBLOCK\_TI}(n,s)$, the size of the interleaving array for the twisted row-column block interleaver is set to a size of $N_r \times N_c = N_{cells} \times N'_{xBLOCK\_TI\_MAX}$ by inserting the virtual XFECBLOCK into the time interleaving memory and a reading process is achieved as shown in an equation given below.

$$p = 0; \qquad \text{[Equation 11]}$$
$$\text{for } i = 0; i < N_{cells} N'_{xBLOCK\_TI\_MAX}; i = i + 1$$
$$\{\text{GENERATE}(R_{n,s,i}, C_{n,s,i});$$
$$V_i = N_r C_{n,s,j} + R_{n,s,j}$$
$$\text{if } V_1 < N_{cells} N_{xBLOCK\_TI}(n, s)$$
$$\{$$
$$Z_{n,s,p} = V_i; p = p + 1;$$
$$\}$$
$$\}$$

The number of the time interleaving groups is set to 3. An option of the time interleaver is signaled in the PLS2-STAT by DP_TI_TYPE='0', DP_FRAME_INTERVAL='1', and DP_TI_LENGTH='1', that is, NTI=1, IJUMP=1, and PI=1. The number of respective XFECBLOCKs per time interleaving group, of which Ncells=30 is signaled in PLS2-DYN data by NxBLOCK_TI(0,0)=3, NxBLOCK_TI(1,0)=6, and NxBLOCK_TI(2,0)=5 of the respective XFEC-BLOCKs. The maximum number of XFECBLOCKs is signaled in the PLS2-STAT data by NxBLOCK_Group_MAX and this is continued to $\lfloor N_{xBLOCK\_Group\_MAX}/N_{TI} \rfloor = N_{xBLOCK\_TI\_MAX} = 6$.

FIG. 28 illustrates a diagonal reading pattern of the twisted row-column block interleaver according to the exemplary embodiment of the present invention.

In more detail, FIG. 28 illustrates a diagonal reading pattern from respective interleaving arrays having parameters $N_{xBLOCK\_TI\_MAX}'=7$ and Sshift=(7−1)/2=3. In this case, during a reading process expressed by a pseudo code given above, when $V_i \geq N_{cells} N_{xBLOCK\_TI}(n,s)$, a value of Vi is omitted and a next calculation value of Vi is used.

Figure 29:
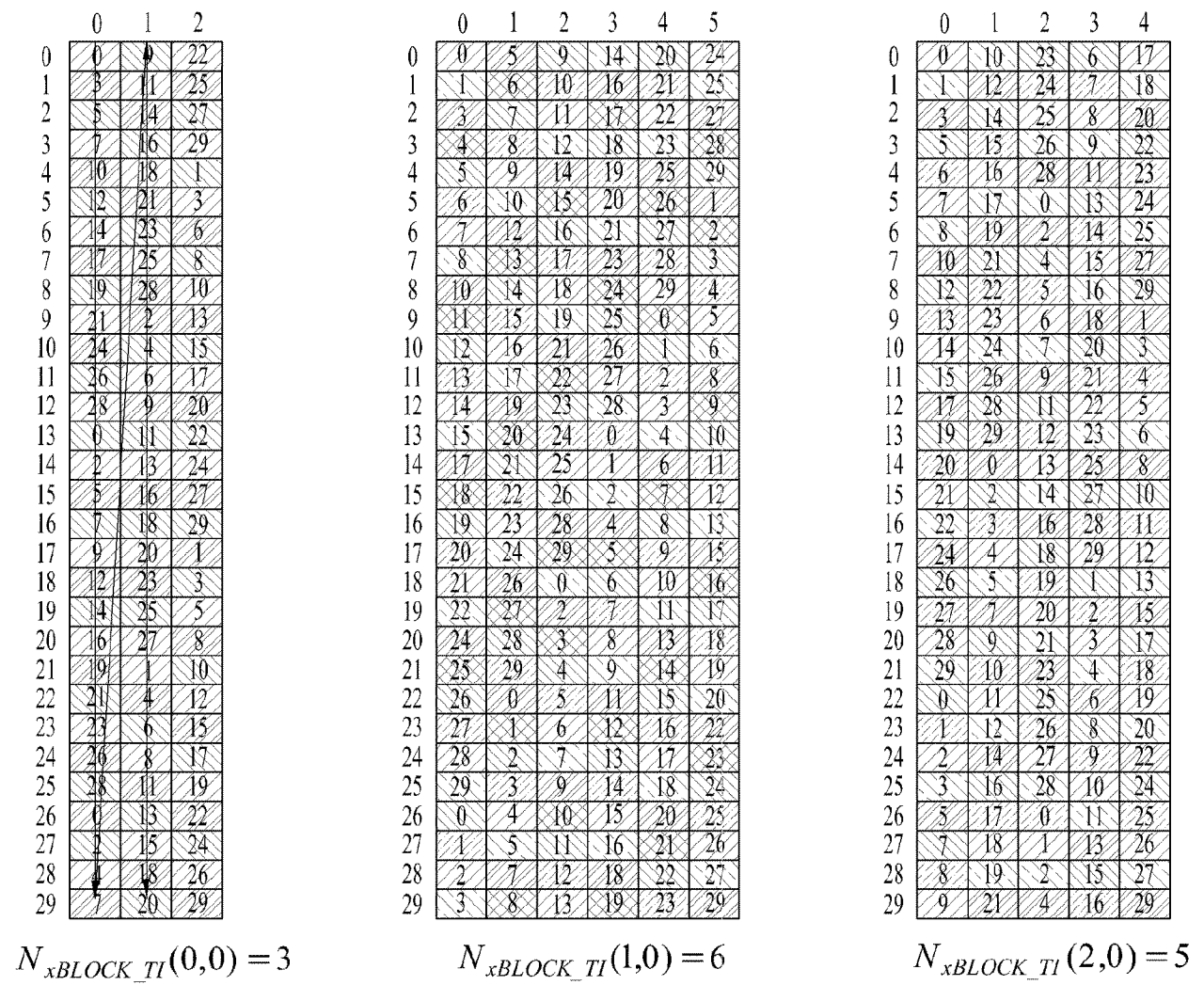

FIG. 29 illustrates XFECBLOCK interleaved from each interleaving array according to an exemplary embodiment of the present invention.

FIG. 29 illustrates XFECBLOCK interleaved from each interleaving array having parameters $N_{xBLOCK\_TI\_MAX}'=7$ and Sshift=3 according to an exemplary embodiment of the present invention.

In this specification, the DP may also be designated as a Physical Layer Pipe (PLP), and the PLS information may also be designated as Layer 1 (L1) information or L1 signaling information. The PLS1 information may also be designated as L1 static information or L1 basic information, and the PLS2 information may also be designated as L1 dynamic information or L1 detail information. In this specification, if specific information/data is signaled, it may mean that the information/data is transmitted and received through the L1 signaling information.

FIG. 30 shows a detailed block diagram of a BICM block according to another embodiment of the present invention.

A description of the detailed blocks of FIG. 30, which is the same as the aforementioned description, is omitted in order to avoid redundancy.

A constellation mapper 30010 may assign/map input bit words to a single constellation. In this case, rotation & Q delay may be additionally applied to the constellation. That is, the constellation mapper 30010 may rotate received constellations at a rotation angle, may divide the constellations into an in-phase component and a quadrature-phase component, and may delay only the quadrature-phase component by a specific value. Thereafter, the constellation mapper 30010 may perform remapping in a new constellation using an in-phase component and a quadrature-phase component which have been newly paired.

A cell interleaver 30020 randomly mixes cells corresponding to a single FEC block and outputs the mixed cells. The cell interleaver 30020 outputs cells corresponding to each FEC block in different order for each FEC block.

A time interleaver 30030 may mix cells belonging to a plurality of FEC blocks and output the mixed cells. Accordingly, the cells of each FEC block may be dispersed within a section corresponding to a time interleaving depth and transmitted, thereby being capable of obtaining an additional diversity gain.

FIG. 31 shows a time interleaver according to an embodiment of the present invention.

As described above, the broadcast system may process a single PLP (S-PLP) or process multiple PLPs (M-PLP). In FIG. 31, a cell interleaver 31010 corresponds to a block, such as the cell interleaver of FIG. 30.

In the case of multiple PLP mode (M-PLP mode), the broadcast signal transmitter may perform time interleaving using a twisted Block Interleaver (BI) 31040 and a convolutional interleaver (CI) 31050. In the case of single PLP mode (S-PLP mode), the block interleaver 31040 is off, and the broadcast signal transmitter may perform time interleaving using a convolutional interleaver 31030. Time interleaving units used in M-PLP mode may also be called a hybrid interleaver or a time interleaver. In this case, the convolutional interleaver 31030 in M-PLP mode may be an interleaver using a convolutional delay-line, and the convolutional interleaver 31050 in S-PLP mode may be a specific convolutional interleaver. The convolutional interleaver in S-PLP mode may also be called a sheer convolutional interleaver. In this case, an interleaver using a convolutional delay-line may also be called a convolutional interleaver or a convolutional delay-line (unit/module). The cell interleaver 31010 may be applied to both S-PLP mode and M-PLP mode or may be applied to only M-PLP mode.

As shown in FIG. 31, the time interleaving unit includes a cell grouping block 31020. The broadcast signal transmitter may use memory more efficiently and increase an interleaving depth when performing time interleaving using the cell grouping block 31020. Cell grouping may be performed in a single wise grouping or pairwise grouping manner. In the single wise grouping method, a single data cell is mapped to a single Memory Unit (MU). In the pairwise grouping method, two consecutive cells included in the same PLP are mapped to a single MU. The cell grouping block 31020 performing such an operation may also be called a cell coupling block or a cell-MU mapper.

The time interleaver may perform time interleaving on a baseline layer signal or a Layered Division Multiplexing (LDM) signal. The LDM signal may be interleaved in S-PLP mode or M-PLP mode.

A Layered Division Multiplexing (LDM) technology is described below. LDM refers to a constellation overlap technology for combining a plurality of data streams into a single RF channel in different power levels. Hereinafter, embodiments in which two data streams are LDM-processed are chiefly described below, but the number of data streams that are LDM-processed may be 3 or more.

Different modulation/channel coding schemes may be applied to two data streams. If the number of combined data streams is two, the two combined data streams may be called the data/signal of an upper layer and the data/signal of a lower layer. The upper layer and the lower layer may also be called a core layer and an enhanced layer, respectively.

FIG. 32 shows the configuration of a broadcast signal transmitter according to an embodiment of the present invention.

The broadcast signal transmitter of FIG. 32 may include an input formatting block 32010, a Bit Interleaved and Coded Modulation (BICM) block 32020, an LDM injection block 32030, a framing & interleaving block 32040, and a waveform generation block 32050. The framing & interleaving block 32040 of FIG. 32 may correspond to the framing building block of FIG. 1, and the waveform generation block 32050 may correspond to the OFDM generation block of FIG. 1.

Unlike in the aforementioned embodiments, in the embodiment of FIG. 32, the framing building block 1020 includes a time interleaving block. Accordingly, the framing building block 1020 may also be called the framing & interleaving block 32040. In other words, the framing & interleaving block 32040 may include the time interleaving block, a framing block, and a frequency interleaving block. The framing & interleaving block 32040 may perform time interleaving on data using such subblocks, may generate a signal frame by mapping the data, and may perform frequency interleaving.

The LDM injection block 32030 performs LDM on data processed by the input formatting block 32010-1 and BICM block 32020-1 of an upper layer and data processed by the input formatting block 32010-2 and BICM block 32020-2 of a lower layer and outputs a single stream. In an embodiment of this specification, the two layers may be called a core layer and an enhanced layer, respectively, and an upper layer and a lower layer, respectively. That is, the core layer may also be called an upper layer, and the enhanced layer may also be called a lower layer.

Same or more robust ModCod comnonation should be used for the core layer data than the enhanced layer data. The two layers may use the same FEC coding/constellation mapping, but may use different types of FEC coding/constellation mapping. Furthermore, when performing LDM processing, the LDM injection block 32030 distributes greater/more power to the core layer data compared to the enhanced layer.

The remaining descriptions other than the movement of the time interleaving block from the BICM block 32020 to the framing & interleaving block 32030 are the same as those described above. The waveform generation block 32050 is the same block as the OFDM generation block 1030 of FIG. 1, but has a name different from the name of the OFDM generation block 1030.

As described above, on the broadcast signal receiver side, the time interleaving block may be included in the frame parsing block 9010 from the demapping/decoding block 9020 of FIG. 9, and the frame parsing block 9010 may also be called a frame parsing/deinterleaving block.

FIG. 33 shows the configuration of part of the broadcast signal transmitter according to an embodiment of the present invention.

FIG. 33 is a detailed diagram showing part of the broadcast signal transmitter of FIG. 32. The LDM injection block 32030 of FIG. 32 shown as a single block further includes three blocks of FIG. 33. In other words, the LDM injection block of FIG. 32 includes an injection level controller 33020, a layer combiner 33030, and a power normalizer 33040 of FIG. 33.

FIG. 33 shows the broadcast signal transmitter for processing PLP data through three paths, including a Future Extension (FE) layer, an upper layer (or core layer), and a lower layer (or enhanced layer). The transmitter include respective BICM blocks 33010-0-2 for processing the PLP data of the layers. The FE layer is used for a future service addition, and may correspond to the extended layer of the core layer.

The coding and modulation structure of the core layer is similar to the enhanced layer, but the LDPC code rate of the core layer may be set to be relatively lower than the LDPC code rate of the enhanced layer.

The injection level controller 33020 may control a power ratio of the core layer and the enhanced layer. The injection level controller 33020 may relatively reduce power of the enhanced layer compared to the core layer and output required transmission energy to each layer.

The layer combiner 33030 may add the upper layer data and the enhanced layer data and determine an FEC block ratio of the upper layer and the enhanced layer. Such an operation is for performing time interleaving/deinterleaving more efficiently. As shown, layer combining may be performed prior to cell interleaving.

The power normalizer 33040 normalizes the sum of the transmission power of the core layer and the transmission power of the enhanced layer so that the sum becomes 1. In other words, the power normalizer 33040 normalizes total power of combined signals into unity.

The LDM signal of the core layer signal and the enhanced layer signal combined as described above may be transmitted through the framing & interleaving block and the waveform generation block. The framing block forms a frame, including the PLP of an upper layer and the PLP of a lower layer as payload. A frame or a subframe may include at least one upper layer PLP and at least one lower layer PLP.

A relationship between the PLP of an upper layer and the PLP of a lower layer within a frame, a method of applying time interleaving, and a method of signaling LDM-related parameters are described below.

Furthermore, if all pieces of information about the PLP of the upper layer and the PLP of the lower layer are signaled, a lot of signaling overhead may be caused. Accordingly, the configuration of an LDM-processed frame and a method capable of performing LDM processing while optimizing signaling information are described below.

Time interleaving may be performed by PLP unit. If time interleaving is performed on an LDM-processed signal and the PLP of an upper layer and the PLP of a lower layer within a frame is matched in a 1:1 way, the time interleaving may be performed on the PLP of the upper layer and the PLP of the lower layer as the same time interleaving group. Still, the configuration of the Time Interleaving (TI) group needs to be taken into consideration depending on a frame configuration.

FIG. 34 shows an embodiment of an LDM-processed signal frame according to an embodiment of the present invention.

FIG. 34 shows an embodiment in which the number of PLPs of the upper layer and the number of PLPs of the lower layer are N:1. In FIG. 34, an S-PLP denotes a signaling PLP.

In FIG. 34, the upper layer of a frame includes two PLPs R-Aud and Mobile, and the lower layer of the frame includes a single PLP. In this case, the broadcast signal transmitter may configure a TI block based on the upper layer and apply a TI block size to the lower layer according to the upper layer.

In an embodiment of the present invention, a TI configuration for LDM may be based on an upper layer. Furthermore, hybrid TI mode may be applied to a plurality of PLPs, and sheer Convolutional Interleaving (CI) mode may be applied to a single PLP.

FIG. 35 shows an embodiment of an LDM-processed signal frame according to another embodiment of the present invention.

FIG. 35 shows an embodiment in which the ratio between the number of the upper layer PLPs and the number of the lower layer PLPs is 1:N. In FIG. 35 and other figures, an S-PLP denotes a signaling PLP. The signaling PLP may be included in the signal frame and transmitted as a preamble.

FIG. 35(a) shows an embodiment in which the upper layer includes a single TI block and the lower layer includes multiple PLPs. FIG. 35(b) shows an embodiment in which the upper layer includes multiple TI blocks and the lower layer includes multiple PLPs.

In FIG. 35, the TI block is defined based on the upper layer. The TI block comprises an integer number of Forward Error Correction (FEC) blocks. The TI block is a basic unit on which the time interleaver (i.e., the cell interleaver, the twisted block interleaver, and the convolutional interleaver) operates. The number of single/multiple TI groups of a signal frame may be defined depending on the number of the PLP of the upper layer. In the case of the lower layer, a plurality of PLPs may be concatenated to become a TI group, such as the upper layer. That is, the PLPs of the lower layer may be concatenated and combined with the PLPs of the upper layer. In this case, there may be a need for a method of the FEC block synchronization for the upper layer and the lower layer.

FIG. 36 shows an embodiment of an LDM-processed signal frame according to another embodiment of the present invention.

FIG. 36 shows an embodiment in which the ratio between the number of the upper layer PLPs and the number of the lower layer PLPs is M:N. In FIG. 36, an S-PLP denotes a signaling PLP.

Likewise, in the embodiment of FIG. 36, a TI group is defined based of the PLP unit of the upper layer. In this case, in the case of FIG. 36, the single PLP (PLP3) of the lower layer may be split and combined with one or more PLPs (PLP0 and PLP1) of the upper layer. PLP3 may be split after power injection. Furthermore, part of PLP3 and part of PLP4 are merged and combined with PLP1.

In the embodiment of FIG. 36, the synchronization of FEC blocks between PLP3 and PLP0/PLP1 and between PLP4 and PLP1/PLP2 may be required. Furthermore, a method of effectively signaling such a frame configuration is described below.

FIG. 37 shows an embodiment of an LDM-processed signal frame according to another embodiment of the present invention.

FIG. 37 shows an embodiment in which the number of PLPs of the upper layer and the number of PLPs of the lower layer are M:N. In FIG. 37, an S-PLP denotes a signaling PLP.

If a signal frame is configured as in FIG. 37, the broadcast system may define the following signaling parameters and transmit/receive the signaling parameters through a preamble or the S-PLP. The signaling parameters may also be called fields or information.

NUM_TIGROUP: the number of time-divided groups of a current frame.

NUM_LAYER: the number of layers within a time-divided group.

NUM_PLPinLAYER: the number of PLPs within a layer.
PLP_LDM_TYPE: Indicate whether a PLP is an upper layer or a lower layer.
PLP_START: indicate the start of an PLP (by cell unit) in a current frame.
LDM_GROUP_ID: indicator for the same content of the same layer (i.e., an indicator for the same content in the same layer). The LDM_GROUP_ID information may have to be defined in every PLP. For example, in FIG. 35, only L-PLP3 and L-PLP4 are required, but fields are wasted in U-PLP1/U PLP2/U PLP3 and L-PLP1/L-PLP2.

FIG. 38 shows an embodiment of an LDM-processed signal frame according to an embodiment of the present invention.

FIG. 38 shows an embodiment in which the number of PLPs of the upper layer and the number of PLPs of the lower layer are N:1. In FIG. 38, an S-PLP denotes a signaling PLP.

As described with reference to FIG. 38, the LDM_GROOUP_ID information may be required if the same content is divided into a plurality of time interleaver groups within a layer. However, to classify the same content, such as L-PLP3 and L-PLP4, into different PLPs is not suitable for the PLP concept of the broadcast system according to an embodiment of the present invention. In this case, unnecessary LDM_GROUP_ID information has to be defined in each PLP, and signaling overhead is generated.

Accordingly, as in the embodiment of FIG. 38, the broadcast system may send and signal L-PLP3 through the single PLP without splitting L-PLP3 into a plurality of PLPs. The length of decoded L-PLP3 may be obtained based on PLP_START information and NUM_BLOCK information. L_PLP3 is twice defined in TI-Group0 and TI-Group1, but may be set as the same value.

If a signal frame is configured and signaled using the method of FIG. 38, the aforementioned LDM_GROUP_ID information may not be used.

FIG. 39 shows a signaling loop according to an embodiment of the present invention.

As described above, NUM_PLPinLAYER information indicating how many PLPs are included in a single layer and PLP_LDM_TYPE information indicating whether a corresponding PLP is the upper layer or the lower layer are used. LDM_GROUP_ID information corresponds to an embodiment in which it is omitted. TI_MODE information indicates a parameter related to a time interleaving operation. The parameter related to the time interleaving operation may be defined by TI group unit.

FIG. 40 shows a signaling loop according to another embodiment of the present invention.

In FIG. 40, a "TI_parameters" field indicates parameter information about a Time Interleaver (TI) operation. A "NUM_PLP" field indicates the number of PLP_MAINs. PLP_MAIN may indicate the PLP of the upper layer. A "NUM_SEGMENT field indicates how many PLPs are included in a single layer. A "PLP_ID_LAYER" field indicates whether a corresponding PLP is the upper layer or the lower layer. In an embodiment, if the value of the "PLP_ID_LAYER" field is 0, it may indicate that a PLP is the upper layer. In addition, the "PLP_ID_LAYER" field may indicate the sub-ID of a PLP.

FIG. 41 shows a signaling loop according to another embodiment of the present invention.

In FIG. 41, a "TI parameters" field indicates a parameter for a Time Interleaver (TI) operation. A "NUM_PLP LAYER (or NUM_LAYER)" field indicates the number of PLP_MAINs. PLP MAIN indicates the PLP of the upper layer. A "PLP_ID_LAYER" field indicates whether a corresponding PLP is the upper layer or the lower layer. In an embodiment, if the value of the "PLP_ID_LAYER" field is 0, it may indicate that a PLP is the upper layer. In addition, the "PLP_ID_LAYER" field may indicate the sub-ID of a PLP.

A "PLP_START_OFFSET" field may indicate an offset from PLP_MAIN to PLP_START. That is, the "PLP_START_OFFSET" field may indicate an offset from the start of the PLP of the upper layer to the start of the PLP of the lower layer. For example, in FIG. 37, the "PLP_START_OFFSET" field may indicate an offset from the start of U-PLP1 to the start of L-PLP2. In an embodiment, the "PLP_START_OFFSET" field may be calculated based on combinations of PLP start values. Accordingly, the "PLP_START_OFFSET" field may be omitted.

As in the embodiment of FIG. 41, a "PLP_SIZE" field may be signaled. The "PLP size" field indicates the data size of a corresponding PLP. The PLP_SIZE information may be calculated based on a MODCOD value and the value of a "PLP_NUM_FECBLOCK" field.

FIG. 42 shows a signaling loop according to another embodiment of the present invention.

FIG. 42 is the same as FIG. 41 except that the syntax of "if (j>0)" has changed to "if(PLP_ID_LAYER/=0)."

A broadcast system may signal a TI parameter for a corresponding PLP of the "PLP_ID_LAYER" field is 0. Furthermore, if the "PLP_ID_LAYER" field is 1, that is, if a corresponding PLP is not the upper layer, as in FIG. 40, the broadcast system may signal power injection information EL_INJECTION_LEVEL. In other words, if a corresponding PLP is only the PLP of the lower layer, the broadcast signal transmitter may signal the power injection level information of the corresponding PLP.

FIG. 43 shows an embodiment of an LDM-processed signal frame according to another embodiment of the present invention.

As shown in FIG. 43, the broadcast system may not separately number the PLPs of the upper layer and the lower layer, but may number PLPs included in the LDM data of a signal frame. That is, in FIG. 43, the broadcast system may number the two PLPs of the upper layer, included in the LDM data, and the three PLPs of the lower layer, included in the LDM data, as PLP_ID_MAIN #0-#5 and may identify whether the PLPs are the upper layer or the lower layer using the aforementioned PLP_ID_LAYER information. That is, a PLP may be numbered based on an LTDMed PLP not based on a TDMed PLP for each layer.

The broadcast signal receiver may identify the configuration of PLPs included in LDM data using information about the starting position of the PLPs. PLP numbers are not separately assigned to the upper layer and the lower layer, but it may be seen from FIG. 41 that PLP #0 and PLP #2 are overlapped PLPs because they start at the same position. That is, the broadcast signal receiver may check the frame configuration of LDM data using PLP_ID_LAYER information, information about the starting position of a PLP, and PLP size information.

In FIG. 43, the broadcast signal receiver may identify that PLP #0 and PLP #1 are the PLPs of the upper layer and PLP #2 and PLP #3 and PLP #4 are the PLPs of the lower layer based on PLP_ID_LAYER information of each PLP. Furthermore, the broadcast signal receiver may identify a frame configuration, such as the positions of the PLPs of the upper layer and the PLPs of the lower layer and an overlap relation between the PLPs of the upper layer and the PLPs of the lower layer, based on information about the starting position of the PLPs and size information and may decode data based on the checked frame configuration.

As described above, a TI group is determined based on the PLP of the upper layer. Accordingly, the broadcast signal receiver may decode the PLP of the upper layer by performing time deinterleaving based on the PLP of the upper layer. In order to decode the PLP of the lower layer, for example, PLP #4, the broadcast signal receiver may perform time deinterleaving on LDM data corresponding to PLP #0 and PLP #1 based on their position relation, may extract PLP #4, and may decode the PLP of the lower layer. A method of decoding, by the broadcast signal receiver, LDM data is described later.

In the embodiment of FIG. 43, in order for the broadcast signal receiver to check a signal frame configuration, PLP_ID_MAIN information (information about the ID of a PLP), PLP_SIZE information, PLP TYPE information, and STARTING_POSITION information need to be signaled for each LTDMed PLP.

In an embodiment, signaling information may include PLP_NUM_BLOCK information instead of information PLP_SIZE. The PLP_NUM_BLOCK information indicates the number of FEC codewords included in a corresponding PLP. In order for the broadcast signal receiver to perform time deinterleaving, the number of FEC codewords is required. When PLP_SIZE information (by cell unit) is signaled, the broadcast signal receiver has to calculate the number of FEC codewords based on the PLP_SIZE information. Accordingly, an operation may become complicated. Furthermore, the required number of signaling bits may be reduced compared to the case where the PLP_SIZE information is signaled.

FIG. 44 shows a signaling loop according to another embodiment of the present invention.

FIG. 44 may show part of a signaling information configuration showing a signal frame configuration, such as FIG. 43. In FIG. 44, signaling fields included in a "for" loop may be included in signaling information of a preamble. FIG. 44 shows such signaling information and also shows how such signaling information is configured and processed. In FIG. 44, corresponding signaling information is applied to each of a specific number of PLPs (NUM_PLP).

The signaling information includes PLP_ID_MAIN information about each PLP. The PLP_ID_MAIN information identifies PLPs, included in signals without distinguishing between the layers as described above. Furthermore, STARTING_POSITION information, PLP_ID_LAYER information, and PLP_SIZE information about each PLP are signaled, thus indicating the LDM configuration of a signal frame.

The broadcast signal receiver may decode PLPL_ID_MAIN information, PLP_SIZE information, STARTING_POSITION information, and PLP_ID_LAYER information about each PLP. The PLPL_ID_MAIN information may also be called PLP ID information, and the STARTING_POSITION information may also be called PLP starting information. Accordingly, the broadcast signal receiver may check whether a received signal includes LDM data and check the PLP configuration of LDM data if a received signal includes LDM data.

If a PLP is the core layer (if (PLP_ID_LAYER==0)), signaling information includes time interleaving parameter information. In FIG. 42, the time interleaving parameter information includes time interleaver type information and time interleaver depth information. The broadcast signal transmitter sends time interleaving parameter information only for the Core layer plp.

The time interleaving parameter information is signaled only if a PLP is the core layer because time interleaving is performed based on the Core layer plp as described above. Accordingly, signaling overhead for the enhanced layer can be reduced.

When LDM processing is performed, injection level information indicating a power distribution for the core layer and the enhanced layer is signaled only if a PLP is the enhanced layer (i.e., "elseif (PLP_ID_LAYER>0)"). The broadcast signal receiver may first decode the Core layer plp and then obtain the enhanced layer data by removing the decoded core layer data from LDM data. When the broadcast signal receiver removes the core layer data, the injection level information is required. Accordingly, signaling overhead can be reduced because the injection level information is signaled only for the Enhanced layer plp.

The time interleaver may perform time interleaving based on a TI block including an integer number of FEC blocks. In this case, if the PLPs of the upper layer and the lower layer are configured to be M:N as described above and the PLPs of the upper layer and the PLPs of the lower layer do not have the same start/end positions, an FEC synchronization problem may be generated. A method of synchronizing the FEC blocks of the upper layer and the lower layer may be performed as follows.

FIG. 45 shows a first embodiment of the synchronization of FEC blocks.

FIG. 45 shows a method of not setting a constraint to synchronization.

For example, in FIG. 45, all the time interleaving boundaries of L-PLP1 and L-PLP2 are not synchronized with the FEC block of the upper layer. Accordingly, information for FEC block synchronization may be signaled in 4 bits.

The broadcast signal receiver requires additional memory for storing the remainder of L-PLP1 and L-PLP2. In an embodiment, maximum 32400 cell memory may be required per L-PLP. Furthermore, a maximum of 32400 cell memory corresponding to the number of PLPs of the lower layer may be required.

FIG. 46 shows a second embodiment of the synchronization of FEC blocks.

FIG. 46 shows a partial synchronization method. The number of FEC blocks of L-PLP1 is an integer unit, and the FEC blocks of L-PLP1 are synchronized with the FEC blocks of the upper layer. Furthermore, with respect to the synchronization of L-PLP2, a 4-bit signaling method is used. The lower layer configures a frame so that only the last PLP is flexibly mapped and the remaining PLPs are synchronized with the FEC blocks of the upper layer by integer. The broadcast signal receiver may store the remainder not matched with an FEC block unit with respect to the last PLP of the lower layer.

FIG. 47 shows a third embodiment of the synchronization of FEC blocks.

FIG. 47 shows a method of synchronizing all the FEC blocks of PLPs between the upper layer and the lower layer in an M:N configuration. In FIG. 47, the number of FEC blocks of L-PLP1 and L-PLP2 is an integer unit, and the FEC blocks of L-PLP1 and L-PLP2 are synchronized with the FEC blocks of the upper layer. Accordingly, separate signaling for the FEC block synchronization of the lower layer is not required, and the broadcast signal receiver can be simply implemented.

FIGS. 48 and 49 show LDM schedulers according to embodiments of the present invention and shows part of the configurations of broadcast signal transmitters according to the LDM schedulers.

If the aforementioned LDM frame of M:N is to be configured, the splitting and merging of PLPs may be required. As shown in FIG. 48, LPLP0 of a lower layer may be split based on the length of UPLP0 of an upper layer according to the upper layer, a portion A may be subjected to LDM with UPLP0, and a portion B and LPLP1 may be subjected to LDM with UPLP1. Furthermore, in FIG. 49, the LDM scheduler of FIG. 46 may be disposed behind the BICM chains on the transmission side, so the broadcast signal transmitter may generate a signal frame having a flexible LDM configuration. In FIG. 49, order in which the power injection block and LDM scheduler of the lower layer are disposed may be changed.

FIG. 50 shows a detailed block diagram of the demapping/decoding block of a broadcast signal receiver according to an embodiment of the present invention.

The demapping/decoding module of FIG. 50 corresponds to an embodiment of the demapping and decoding module 9020 of FIG. 9.

As described above, the coding & modulation module of the broadcast signal transmitter according to an embodiment of the present invention may process received PLPs by independently applying SISO, MISO, and MIMO methods to the PLPs for each path. Accordingly, the demapping/decoding module of FIG. 50 may include blocks for performing SISO, MISO, and MIMO processing on data output by the frame parser in accordance with the broadcast signal transmitter.

As shown in FIG. 50, the demapping and decoding module according to an embodiment of the present invention may include a first block for the SISO method, a second block for the MISO method, a third block for the MIMO method, and a fourth block for processing PLS pre/post information.

The first block for performing SISO processing on a received PLP may include a time deinterleaver block 50010, a cell deinterleaver block 50020, a constellation demapper block 50030, a cell-bit demultiplexer block 50040, a bit deinterleaver block 50050, and an FEC decoder block 50060.

The time deinterleaver block 50010 may perform the inverse process of the time interleaver block. That is, the time deinterleaver block 50010 may deinterleave an input symbol, interleaved in a time domain, into the original position.

The cell deinterleaver block 50020 may perform the inverse process of the cell interleaver block. That is, the cell deinterleaver block 50020 may deinterleave the positions of cells, spread in a single FEC block, into the original positions.

The constellation demapper block 50030 may perform the inverse process of the constellation mapper block. That is, the constellation demapper block 50030 may demap an input signal of a symbol domain to data of a bit domain. Furthermore, the constellation demapper block 50030 may output bit data determined by making a hard decision and may output the Log-Likelihood Ratio (LLR) of each bit corresponding to a soft decision value or a probabilistic value. If a rotated constellation is adopted by a transmission stage in order to obtain an additional diversity gain, the constellation demapping block 32030 may perform 2-dimensional LLR demapping corresponding to the rotated constellation. The constellation demapper block 50030 may calculate the LLR so that the delay value of an I or Q component is compensated for in the broadcast signal transmitter.

The cell-bit multiplexer block 50040 may perform the inverse process of the bit-cell demultiplexer (or bit to cell demux) block. That is, the cell-bit multiplexer block 50040 may restore bit data, mapped by the bit-cell demultiplexer block, in the original bit stream form.

The bit deinterleaver block 50050 may perform the inverse process of the bit interleaver block. That is, the bit deinterleaver block 50050 may deinterleave bit streams, output by the cell-bit multiplexer block 50040, in the original order.

The FEC decoder block 50060 may perform the inverse process of the FEC encoder block. That is, the FEC decoder block 50060 may correct an error generated in a signal received through a transmission channel by performing LDPC decoding and BCH decoding.

Only additional blocks not described in the signal processing of SISO mode are described below.

An MISO decoder block 50070 may perform the inverse process of the MISO processing block. If a broadcast transmission/reception system according to an embodiment of the present invention uses STBC, the MISO decoder block 50070 may perform Alamouti decoding.

An MIMO decoding block 50080 may receive the output data of the cell deinterleaver with respect to m reception antenna input signals and may perform MIMO decoding as the inverse process of the MIMO processing block. In order to obtain the best decoding performance, the MIMO decoding block 50080 may perform maximum likelihood decoding or may perform sphere decoding having reduced complexity. In some embodiments, the MIMO decoding block 50080 may secure improved decoding performance by performing MMSE detection or combining and performing MMSE detection and iterative decoding.

FEC decoder blocks 50090-1 and 50090-2 for processing signaling information, that is, shortened/punctured FEC decoders, may perform the inverse processes of the shortened/punctured FEC encoder blocks. That is, the shortened/punctured FEC decoder 50090 may additionally perform de-shortening and de-puncturing on data which has been shortened/punctured based on the length of PLS data and received and may then perform FEC decoding on the data. In this case, separate FEC decoder hardware for a PLS is not required because the FEC decoder used in a data pipe can be used in a PLS without a change. Accordingly, there are advantages in that the system design is facilitated and efficient coding can be performed.

The aforementioned blocks may be omitted depending on a designer's intention or may be replaced with other blocks having similar or the same functions.

In this case, the time deinterleaver block may be placed from the position of the demapping/decoding block in FIG. 50 to the position of the frame parsing block in the same manner in which the time interleaver block is placed from the position of the BICM block to the position of the framing building block or interleaving/framing block in the broadcast signal transmitter as described above. In this case, in FIG. 9, the frame parser may also be called a frame parser/deinterleaver.

The receiving side's time deinterleaver includes a convolutional deinterleaver (performs the inverse processing of the convolutional delay line), a twisted block deinterleaver, and a cell deinterleaver and may perform the inverse process of the transmitting side's time interleaver.

FIG. 51 shows the configuration of part of a broadcast signal receiver according to an embodiment of the present invention.

FIG. 51 shows the configuration of a broadcast signal receiver for performing Layered Division Demultiplixing (LDD) on an LDM signal. The broadcast signal receiver may first restore the signal of a core layer and then restore the signal of an enhanced layer that is left after subtracting the restored signal of the core layer from the LDM signal. First, when a broadcast signal is received, the broadcast signal receiver may know whether the broadcast signal includes LDM data based on signaling information. FIG. 51 shows the configuration of a broadcast signal receiver for processing a received signal if the received signal includes LDM data.

In FIG. 51, a received LDM signal is processed by an MISO decoder 51010, a time deinterleaver 51020, and a cell deinterleaver 51030. The MISO decoder 51010, time deinterleaver 51020, and the cell deinterleaver 51030 are illustrative. The received LDM signal is processed by the synchronization/demodulation unit 9000 and the frame parsing/deinterleaving unit 9010 as shown in FIG. 9 and is then LDD-processed. LDD is described below.

First, the signal of the core layer is decoded/restored by a first demapping/decoding unit 51040-1. The first demapping/decoding unit 51040-1 may also be called a core layer demapping/decoding unit 51040-1. The signal of the enhanced layer is similar to noise from a viewpoint of the first demapping/decoding unit 51040-1. The first demapping/decoding unit 51040-1 may restore a robustly encoded/modulated core layer signal from the LDM signal. Furthermore, the first demapping/decoding unit 51040-1 may obtain the signal of the enhanced layer through interference removal processing and restoration processing.

In FIG. 51, a buffer 51060, a signal divider 51070, and an LDD modulation unit 51050 may be collectively called an interference removal unit. First, the interference removal unit may modulate the signal of the core layer, restored by the LDD modulation unit 51050, as in the transmission unit. The LDD modulation unit 51050 includes a bit interleaver 51080, a bit-cell demultiplexer 51090, a constellation mapper 51100, and an injection level controller 51110. The operations of the bit interleaver 51080, the bit-cell demultiplexer 51090, the constellation mapper 51010, and the injection level controller 51110 are the same as those described with reference to FIGS. 30 to 33. The broadcast signal receiver may obtain injection level information from signaling information and drive the injection level controller 51110 based on the injection level information. The broadcast signal receiver may control power of the core layer data based on the injection level information and obtain the enhanced layer data by subtracting the core layer data from LDM data.

The interference removal unit may buffer the LDM signal received by the buffer 51060 and may divide the signal of the enhanced layer from the LDM signal using the signal divider 51070. The signal divider 51070 may divide the signal of the enhanced layer in such a way as to subtract the modulated signal of the upper layer from the buffered received LDM signal. In other words, the signal divider 51070 performs the inverse process of the operation of the layer combiner on the transmission side.

The broadcast signal receiver may decode/restore the divided signal of the enhanced layer using a second demapping/decoding unit 51040-2. The second demapping/decoding unit 51040-2 may also be called an enhanced layer demapping/decoding unit 51040-1.

FIG. 52 shows a method of transmitting a broadcast signal according to an embodiment of the present invention.

The broadcast signal transmitter may FEC-encode the core layer data using the first BICM unit (S52010). Furthermore, the broadcast signal transmitter may FEC-encode the enhanced layer data using the second BICM unit (S52020).

The broadcast signal transmitter may output LDM data by combining the core layer data and the enhanced layer data using the LDM injection unit (S52030). The broadcast signal transmitter may perform time interleaving on the LDM data using the time interleaver (S52040). Furthermore, the broadcast signal transmitter may generate a signal frame, including a preamble and the LDM data, using the framing unit (S52050). The preamble includes the aforementioned signaling information. Furthermore, the broadcast signal transmitter may perform OFDM modulation on the signal frame and generate a broadcast signal (S52060).

If the broadcast signal transmitter performs LDM processing as described above, more power is distributed to the core layer data than to the enhanced layer data. Furthermore, such a power distribution may be signaled as injection level information.

The LDM data includes a plurality of PLPs, and the plurality of PLPs may be identified based on PLP ID information. The LDM data includes the core layer data and the enhanced layer data. The core layer data includes at least one Core layer plp, and the enhanced layer data includes at least one Enhanced layer plp. The PLPs of the core layer and enhanced layer of the LDM data may be configured as shown in FIGS. 34 to 37. The number of PLPs of the core layer included in the LDM data and the number of PLPs of the enhanced layer included in the LDM data may be 1:1, 1:N, N:1, or N:M. Furthermore, the starting positions and lengths of the PLPs of the core layer and the enhanced layer may be the same or different.

Each of the PLPs of the core layer corresponds to a single time interleaver group. Furthermore, the time interleaver may perform time interleaving on the LDM data based on the Core layer plp. Accordingly, time interleaving parameter information about the time interleaving is signaled with respect to the Core layer plp.

Signaling information includes PLP layer information indicating whether a PLP included in a signal frame is the Core layer plp or the Enhanced layer plp. If the PLP layer information indicates that the PLP is the Core layer plp, the signaling information includes time interleaving parameter information about the PLP. If the PLP layer information indicates that the PLP is the Enhanced layer plp, the signaling information includes injection level information indicating a transmission power distribution between the core layer data and the enhanced layer data. Furthermore, the signaling information further includes PLP ID information identifying the PLP, PLP size information indicating the data size of the PLP, and PLP starting information indicating the starting position of the PLP in the signal frame.

FIG. 53 shows a method of receiving a broadcast signal according to an embodiment of the present invention.

The broadcast signal receiver may perform signal detection and OFDM demodulation on a received signal using the synchronization and demodulation unit (S53010). The received signal may include a preamble and LDM data. The preamble includes signaling information for decoding the received signal. The broadcast signal receiver may obtain the presence and configuration of the LDM data, included in the received signal, by decoding the signaling information. The broadcast signal receiver may parse a signal frame, included in the broadcast signal, using the frame parsing unit (S53020). Furthermore, the broadcast signal receiver may deinterleave the LDM data using the time deinterleaving unit (S53030).

The broadcast signal receiver may obtain the signaling information, included in the preamble, using the frame parsing unit. The broadcast signal receiver may decode the signaling information using a separate demapping/decoding unit for decoding the signaling information. Furthermore, the broadcast signal receiver may control the frame parsing unit and extract a PLP/data corresponding to a required service using the obtained signaling information. Furthermore, if the extracted data is LDM data, the broadcast signal receiver may decode the LDM data by performing LDD processing as described above.

The broadcast signal receiver may obtain the core layer data by demapping and FEC-decoding the LDM data using the first demapping/decoding unit (S53040). Furthermore, the broadcast signal receiver may remove the obtained core layer data from the LDM data using the interference removal unit and output the enhanced layer data (S53050). The broadcast signal receiver may demap and FEC-decode the enhanced layer data using the second demapping/decoding unit (S53060).

As described above, the broadcast signal receiver may buffer the LDM data using the buffer, may control a power ratio of the core layer data and the enhanced layer data using the injection level controller, and may divide the enhanced layer data from the buffered LDM data using the signal divider. The LDM signal processing of the broadcast signal receiver has been described with reference to FIG. 51.

If the broadcast signal transmitter performs LDM processing as described above, more power is distributed to the core layer data than to the enhanced layer data. Such a power distribution is signaled as injection level information.

The LDM data includes a plurality of PLPs, and the plurality of PLPs may be identified based on PLP ID information. The LDM data includes the core layer data and the enhanced layer data. The core layer data includes at least one core layer plp, and the enhanced layer data includes at least one enhanced layer plp. The PLPs of the core layer and enhanced layer of the received LDM data may be configured as shown in FIGS. 34 to 37. The number of PLPs of the core layer included in the LDM data and the number of PLPs of the enhanced layer included in the LDM data may be 1:1, 1:N, N:1, or N:M. Furthermore, the starting positions and lengths of the PLPs of the core layer and the enhanced layer may be the same or different.

Each of the PLPs of the core layer corresponds to a single time interleaver group. Furthermore, the time interleaver of the broadcast signal receiver may perform time interleaving on the LDM data based on the core layer plp. Accordingly, time interleaving parameter information about the time interleaving is signaled with respect to the core layer plp. If a required service is the core layer plp, the broadcast signal receiver may perform deinterleaving using time deinterleaving parameter information of the core layer. If a required service is the enhanced layer plp, the broadcast signal receiver may refer to the configuration of the LDM data. The broadcast signal receiver may perform time deinterleaving on at least one PLP of the upper layer including the PLP region of the enhanced layer and may decode a corresponding enhanced layer plp by extracting the corresponding PLP from the deinterleaved data part.

Signaling information includes PLP layer information indicating whether a PLP included in a signal frame is the core layer plp or the enhanced layer plp. If the PLP layer information indicates that the PLP is the core layer plp, the signaling information includes time interleaving parameter information about the PLP. If the PLP layer information indicates that the PLP is the enhanced layer plp, the signaling information includes injection level information indicating a transmission power distribution between the core layer data and the enhanced layer data. Furthermore, the signaling information further includes PLP ID information identifying the PLP, PLP size information indicating the data size of the PLP, and PLP starting information indicating the starting position of the PLP in the signal frame. The broadcast signal receiver may check the configuration of the LDM data using such signaling information and perform LDD processing and decoding for each PLP.

In accordance with an embodiment of the present invention, an LDM data configuration may be flexibly performed. That is, if the PLPs of the upper layer and the PLPs of a lower layer are not matched in a 1:1 way, but the number of PLPs of the upper layer and the number of PLPs of the lower layer are M:N and if the starting positions and sizes of the PLPs of the upper layer and the PLPs of the lower layer are not matched, a data structure can be transmitted and received through minimum signaling information.

Furthermore, an embodiment of the present invention can simplify a transmission/reception data processing process and reduce the amount of signaling information by performing time interleaving based on only the PLP of the upper layer. The amount of signaling information can be reduced and a transmission and reception process can be further simplified because time interleaving parameters are signaled to only the core layer plp and injection level information according to LDM processing is signaled to only the PLP of an enhanced layer.

Signaling overhead can be minimized and the structure of LDM data can be efficiently transmitted because signaling information for the configurations of the PLP of the upper layer and the PLP of a lower layer are simplified using PLP ID information, PLP size information, and PLP starting information.

Those skilled in the art will understand that the present invention may be changed and modified in various ways without departing from the spirit or range of the present invention. Accordingly, the present invention is intended to include all the changes and modifications provided by the appended claims and equivalents thereof.

In this specification, both the apparatus and the method have been described, and the descriptions of both the apparatus and method may be mutually supplemented and applied.

Various embodiments have been described in the best form for implementing the present invention.

The present invention is used in a series of broadcast signal providing fields.

It is evident to those skilled in the art will understand that the present invention may be changed and modified in various ways without departing from the spirit or range of the present invention. Accordingly, the present invention is intended to include all the changes and modifications provided by the appended claims and equivalents thereof.

What is claimed is:

1. A broadcast signal transmitter, comprising:
a first bit interleaver configured to bit interleave core layer data of at least one core layer Physical Layer Pipe (PLP) for a core layer;
a second bit interleaver configured to bit interleave enhanced layer data of at least one enhanced layer PLP for an enhanced layer;
an injection level controller configured to control a power ratio between the bit-interleaved core layer data and the bit-interleaved enhanced layer data;
a combiner configured to combine the core layer data and the enhanced layer data which the power ratio is controlled and to output Layered Division Multiplexing (LDM) data;

a power normalizer configured to normalize power of the LDM data;

a time interleaver configured to perform time-interleaving on the LDM data which the power is normalized;

a framer configured to generate a signal frame comprising a preamble and the time-interleaved LDM data, the preamble carrying signaling information; and a modulator configured to perform an Orthogonal Frequency Division Multiplexing (OFDM) modulation on the signal frame, wherein the time-interleaving of the LDM data is performed based on the at least one core layer PLP, wherein the signaling information comprises PLP layer information for indicating whether a layer of a PLP is the core layer or the enhanced layer, and wherein when the PLP layer information indicates that the layer of the PLP is the core layer, the signaling information for the PLP comprises time interleaving parameter information, and when the PLP layer information indicates that the layer of the PLP is the enhanced layer, the signaling information for the PLP does not comprise the time interleaving parameter information.

2. The broadcast signal transmitter of claim 1, wherein when the PLP layer information indicates that the layer of the PLP is the enhanced layer, the signaling information for the PLP comprises injection level information for indicating a transmission power distribution between the core layer data and the enhanced layer data, and when the PLP layer information indicates that the layer of the PLP is the core layer, the signaling information for the PLP does not comprise the injection level information.

3. The broadcast signal transmitter of claim 1, wherein when the PLP layer information indicates that the layer of the PLP is the core layer, the signaling information for the PLP further comprises PLP type information for indicating a type of the PLP and when the PLP layer information indicates that the layer of the PLP is the enhanced layer, the signaling information for the PLP does not comprise the PLP type information.

4. The broadcast signal transmitter of claim 1, wherein the at least one core layer PLP corresponds to a single time interleaver group, and wherein the time interleaving of the LDM data is performed based the time interleaving parameter information for the at least one core layer PLP.

5. The broadcast signal transmitter of claim 1, wherein the signaling information further comprises PLP ID information identifying the PLP.

6. A method of transmitting a broadcast signal, the method comprising:

bit interleaving core layer data of at least one core layer Physical Layer Pipe (PLP) for a core layer;

bit interleaving enhanced layer data of at least one enhanced layer PLP for an enhanced layer;

controlling a power ratio between the bit-interleaved core layer data and the bit-interleaved enhanced layer data;

combining the core layer data and the enhanced layer data which the power ratio is controlled and outputting Layered Division Multiplexing (LDM) data;

normalizing power of the LDM data;

time-interleaving the LDM data which the power is normalized;

generating a signal frame comprising a preamble and the time-interleaved LDM data, the preamble carrying signaling information; and performing an Orthogonal Frequency Division Multiplexing (OFDM) modulation on the signal frame, wherein the time-interleaving of the LDM data is performed based on the at least one core layer PLP, wherein the signaling information comprises PLP layer information for indicating whether a layer of a PLP is the core layer or the enhanced layer, and wherein when the PLP layer information indicates that the layer of the PLP is the core layer, the signaling information for the PLP comprises time interleaving parameter information, and when the PLP layer information indicates that the layer of the PLP is the enhanced layer, the signaling information for the PLP does not comprise the time interleaving parameter information.

7. The method of claim 6, wherein when the PLP layer information indicates that the layer of the PLP is the enhanced layer, the signaling information for the PLP comprises injection level information for indicating a transmission power distribution between the core layer data and the enhanced layer data, and when the PLP layer information indicates that the layer of the PLP is the core layer, the signaling information for the PLP does not comprise the injection level information.

8. The method of claim 6, wherein when the PLP layer information indicates that the layer of the PLP is the core layer, the signaling information for the PLP further comprises PLP type information for indicating a type of the PLP and when the PLP layer information indicates that the layer of the PLP is the enhanced layer, the signaling information for the PLP does not comprise the PLP type information.

9. The method of claim 6, wherein the at least one core layer PLP corresponds to a single time interleaver group, and wherein the time-interleaving of the LDM data is performed based the time interleaving parameter information for the at least one core layer PLP.

10. The method of claim 6, wherein the signaling information further comprises PLP ID information identifying the PLP.

11. A broadcast signal receiver, comprising:

a receiver configured to receive a broadcast signal comprising a signal frame, wherein the signal frame comprises a preamble and Layered Division Multiplexing (LDM) data into which core layer data of at least one core layer Physical Layer Pipe (PLP) for a core layer and enhanced layer data of at least one enhanced layer PLP for an enhanced layer are layered division multiplexed, wherein the preamble carries signaling information that comprises PLP layer information for indicating whether a layer of a PLP is the core layer or the enhanced layer, and wherein when the PLP layer information indicates that the layer of the PLP is the core layer, the signaling information for the PLP comprises time interleaving parameter information, and when the PLP layer information indicates that the layer of the PLP is the enhanced layer, the signaling information for the PLP does not comprise the time interleaving parameter information;

a frame parser configured to parse the signal frame in the broadcast signal and to output the LDM data;

a time deinterleaver configured to time de-interleave the LDM data based on the at least one core layer PLP;

a first bit deinterleaver configured to bit de-interleave the core layer data in the LDM data;

a bit interleaver configured to bit interleave the bit-deinterleaved core layer data;

a de-combiner configured to output the enhanced layer data by cancelling the bit interleaved core layer data from the LDM data; and a second bit deinterleaver configured to bit de-interleave the enhanced layer data, wherein a power ratio between the core layer data and the enhanced layer data is controlled based on injection level information included in the signaling information.

12. The broadcast signal receiver of claim 11, wherein when the PLP layer information indicates that the layer of the PLP is the enhanced layer, the signaling information for the PLP comprises the injection level information, and when the PLP layer information indicates that the layer of the PLP is the core layer, the signaling information for the PLP does not comprise the injection level information, and wherein the injection level information indicates a transmission power distribution between the core layer data and the enhanced layer data.

13. The broadcast signal receiver of claim 11, wherein when the PLP layer information indicates that the layer of the PLP is the core layer, the signaling information for the PLP further comprises PLP type information for indicating a type of the PLP and wherein when the PLP layer information indicates that the layer of the PLP is the enhanced layer, the signaling information for the PLP does not comprise the PLP type information.

14. The broadcast signal receiver of claim 11, wherein the signaling information further comprises PLP ID information identifying the PLP.

15. A method of receiving a broadcast signal, the method comprising:

receiving the broadcast signal comprising a signal frame, wherein the signal frame comprises a preamble and Layered Division Multiplexing (LDM) data into which core layer data of at least one core layer Physical Layer Pipe (PLP) for a core layer and enhanced layer data of at least one enhanced layer PLP for an enhanced layer are layered division multiplexed, wherein the preamble carries signaling information that comprises PLP layer information for indicating whether a layer of a PLP is the core layer or the enhanced layer, and wherein when the PLP layer information indicates that the layer of the PLP is the core layer, the signaling information for the PLP comprises time interleaving parameter information, and when the PLP layer information indicates that the layer of the PLP is the enhanced layer, the signaling information for the PLP does not comprise the time interleaving parameter information;

parsing the signal frame in the broadcast signal and outputting the LDM data;

time de-interleaving the LDM data based on the at least one core layer PLP;

bit de-interleaving the core layer data in the LDM data;

bit interleaving the bit-deinterleaved core layer data;

outputting the enhanced layer data by cancelling the bit interleaved core layer data from the LDM data; and bit de-interleaving the enhanced layer data, wherein a power ratio between the core layer data and the enhanced layer data is controlled based on injection level information included in the signaling information.

16. The method of claim 15, wherein when the PLP layer information indicates that the layer of the PLP is the enhanced layer, the signaling information for the PLP comprises the injection level information, and when the PLP layer information indicates that the layer of the PLP is the core layer, the signaling information for the PLP does not comprise the injection level information, and wherein the injection level information indicates a transmission power distribution between the core layer data and the enhanced layer data.

17. The method of claim 15, wherein when the PLP layer information indicates that the layer of the PLP is the core layer, the signaling information for the PLP further comprises PLP type information for indicating a type of the PLP and wherein when the PLP layer information indicates that the layer of the PLP is the enhanced layer, the signaling information for the PLP does not comprise the PLP type information.

18. The method of claim 15, wherein the signaling information further comprises PLP ID information identifying the PLP.

* * * * *